US012776266B2

(12) United States Patent
Liu et al.

(10) Patent No.: US 12,776,266 B2
(45) Date of Patent: Oct. 27, 2026

(54) ARRAY SUBSTRATE AND DISPLAY APPARATUS

(71) Applicants: Chengdu BOE Optoelectronics Technology Co., Ltd., Chengdu (CN); BOE Technology Group Co., Ltd., Beijing (CN)

(72) Inventors: Changchang Liu, Beijing (CN); Yu Wu, Beijing (CN); Yipeng Chen, Beijing (CN); Zhenglong Yan, Beijing (CN); Lang Liu, Beijing (CN)

(73) Assignees: Chengdu BOE Optoelectronics Technology Co., Ltd., Chengdu (CN); BOE Technology Group Co., Ltd., Beijing (CN)

( * ) Notice: Subject to any disclaimer, the term of this patent is extended or adjusted under 35 U.S.C. 154(b) by 279 days.

(21) Appl. No.: 18/693,886

(22) PCT Filed: Jun. 1, 2023

(86) PCT No.: PCT/CN2023/097765

§ 371 (c)(1),
(2) Date: Mar. 20, 2024

(87) PCT Pub. No.: WO2024/243958

PCT Pub. Date: Dec. 5, 2024

(65) Prior Publication Data

US 2026/0065856 A1 Mar. 5, 2026

(51) Int. Cl.
*G09G 3/3233* (2016.01)
*G09G 3/32* (2016.01)

(52) U.S. Cl.
CPC ............ *G09G 3/3233* (2013.01); *G09G 3/32* (2013.01); *G09G 2300/0408* (2013.01);
(Continued)

(58) Field of Classification Search
CPC .................. G09G 3/3233; G09G 3/32; G09G 2300/0408; G09G 2300/0426;
(Continued)

(56) References Cited

U.S. PATENT DOCUMENTS

2020/0143740 A1* 5/2020 Tsuboi ................ G09G 3/3233
2021/0201827 A1* 7/2021 Jang .................... G09G 3/3291
(Continued)

FOREIGN PATENT DOCUMENTS

CN 104200771 A 12/2014
CN 105788529 A 7/2016
(Continued)

OTHER PUBLICATIONS

International Search Report & Written Opinion mailed Feb. 7, 2024, regarding PCT/CN2023/097765.
The Extended European Search Report in the European Patent Application No. 23938947.1, dated Nov. 28, 2025.

*Primary Examiner* — Richard J Hong
(74) *Attorney, Agent, or Firm* — Intellectual Valley Law, P.C.

(57) ABSTRACT

An array substrate includes a plurality of pixel driving circuits and a plurality of third control signal lines. A respective pixel driving circuit includes a data write transistor, a compensating transistor, a third reset transistor, a first capacitor having a first capacitor electrode and a second capacitor electrode, a second capacitor having a third capacitor electrode and a fourth capacitor electrode, and a third node connecting line. A respective third control signal line is configured to provide control signals to a gate electrode of the third reset transistor. The third node connecting line is connected to second electrodes of the compensating transistor and the data write transistor, and to the first capacitor electrode and the fourth capacitor electrode. An orthographic projection of the third node connecting line on a
(Continued)

base substrate at least partially overlaps with an orthographic projection of the respective third control signal line on the base substrate.

19 Claims, 66 Drawing Sheets

(52) U.S. Cl.
CPC ............... *G09G 2300/0426* (2013.01); *G09G 2300/0819* (2013.01); *G09G 2310/08* (2013.01); *G09G 2320/0233* (2013.01)

(58) Field of Classification Search
CPC ....... G09G 2300/0819; G09G 2310/08; G09G 2320/0233; G09G 3/3291; H10K 59/1216; H10K 59/1213; G09F 9/30
See application file for complete search history.

(56) References Cited

U.S. PATENT DOCUMENTS

| | | | | |
|---|---|---|---|---|
| 2021/0210474 | A1* | 7/2021 | Ikeda | G09F 9/30 |
| 2022/0359640 | A1* | 11/2022 | Long | H10K 59/1216 |
| 2022/0398980 | A1 | 12/2022 | Kawachi | |
| 2023/0069447 | A1 | 3/2023 | Kang et al. | |
| 2023/0306906 | A1* | 9/2023 | Yang | G09G 3/3233 |
| 2024/0096282 | A1* | 3/2024 | Park | G09G 3/3233 |
| 2024/0179970 | A1 | 5/2024 | Zhou et al. | |
| 2024/0206226 | A1* | 6/2024 | Han | H10K 59/1213 |

FOREIGN PATENT DOCUMENTS

| | | | |
|---|---|---|---|
| CN | 113066428 | A | 7/2021 |
| CN | 114999382 | A | 9/2022 |
| CN | 115798407 | A | 3/2023 |
| CN | 115911056 | A | 4/2023 |

* cited by examiner

ARRAY SUBSTRATE AND DISPLAY APPARATUS

CROSS-REFERENCE TO RELATED APPLICATION

This application is a national stage application under 35 U.S.C. § 371 of International Application No. PCT/CN2023/097765, filed Jun. 1, 2023, the contents of which are incorporated by reference in the entirety.

TECHNICAL FIELD

The present invention relates to display technology, more particularly, to an array substrate and a display apparatus.

BACKGROUND

Organic Light Emitting Diode (OLED) display is one of the hotspots in the field of flat panel display research today. Unlike Thin Film Transistor-Liquid Crystal Display (TFT-LCD), which uses a stable voltage to control brightness, OLED is driven by a driving current required to be kept constant to control illumination. The OLED display panel includes a plurality of pixel units configured with pixel-driving circuits arranged in multiple rows and columns. Each pixel-driving circuit includes a driving transistor having a gate terminal connected to one gate line per row and a drain terminal connected to one data line per column. When the row in which the pixel unit is gated is turned on, the switching transistor connected to the driving transistor is turned on, and the data voltage is applied from the data line to the driving transistor via the switching transistor, so that the driving transistor outputs a current corresponding to the data voltage to an OLED device. The OLED device is driven to emit light of a corresponding brightness.

SUMMARY

In one aspect, the present disclosure provides an array substrate, comprising a plurality of pixel driving circuits and a plurality of third control signal lines; wherein a respective pixel driving circuit of the plurality of pixel driving circuits comprises a driving transistor, a data write transistor, a compensating transistor, a third reset transistor, a first capacitor having a first capacitor electrode and a second capacitor electrode, a second capacitor having a third capacitor electrode and a fourth capacitor electrode, and a third node connecting line; wherein a respective third control signal line of the plurality of third control signal lines is configured to provide control signals to a gate electrode of the third reset transistor; wherein the third node connecting line is connected to second electrodes of the compensating transistor and the data write transistor, and is connected to the first capacitor electrode and the fourth capacitor electrode; and an orthographic projection of the third node connecting line on a base substrate at least partially overlaps with an orthographic projection of the respective third control signal line on the base substrate.

Optionally, the respective third control signal line comprises multiple branches including a respective third control signal line third branch in a third gate metal layer; and the orthographic projection of the third node connecting line on the base substrate at least partially overlaps with an orthographic projection of the respective third control signal line third branch on the base substrate.

Optionally, the array substrate further comprises a plurality of gate lines, a plurality of light emitting control signal lines, and a plurality of first control signal lines; wherein the respective pixel driving circuit further comprises a light emitting control transistor and a first reset transistor; a respective gate line of the plurality of gate lines is configured to provide gate scanning signals to a gate electrode of the data write transistor; a respective light emitting control signal line of the plurality of light emitting control signal lines is configured to provide light emitting control signals to a gate electrode of the light emitting control transistor; a respective first control signal line of the plurality of first control signal lines is configured to provide control signals to a gate electrode of the first reset transistor; wherein the orthographic projection of the third node connecting line on the base substrate at least partially overlaps with an orthographic projection of at least one of the respective light emitting control signal line, the respective first control signal line, an active layer of the driving transistor, the third capacitor electrode, or a unitary structure comprising the first capacitor electrode and the fourth capacitor electrode on the base substrate.

Optionally, the orthographic projection of the third node connecting line on the base substrate at least partially overlaps with each of orthographic projections of the respective light emitting control signal line, the respective first control signal line, an active layer of the driving transistor, the third capacitor electrode, and a unitary structure comprising the first capacitor electrode and the fourth capacitor electrode on the base substrate.

Optionally, an orthographic projection of any unitary structure comprising the first capacitor electrode and the fourth capacitor electrode on the base substrate at least partially overlaps with the orthographic projection of the respective third control signal line on the base substrate.

Optionally, the unitary structure comprises a main body and an extension extending away from the main body, and the orthographic projection of the respective third control signal line on the base substrate at least partially overlaps with an orthographic projection of the extension on the base substrate, or at least partially overlaps with an orthographic projection of the main body on the base substrate.

Optionally, the array substrate further comprises a plurality of light emitting control signal lines; wherein the respective pixel driving circuit further comprises a light emitting control transistor; a respective light emitting control signal line of the plurality of light emitting control signal lines is configured to provide light emitting control signals to a gate electrode of the light emitting control transistor; and the orthographic projection of the third node connecting line on the base substrate at least partially overlaps with an orthographic projection of the respective light emitting control signal line on the base substrate.

Optionally, the respective light emitting control signal line comprises a first portion and a second portion connected to each other; the first portion has a first average line width; the second portion has a second average line width; the first average line width is greater than the second average line width; an orthographic projection of the first portion on the base substrate at least partially overlaps with an orthographic projection of the third node connecting line on the base substrate; an orthographic projection of the second portion on the base substrate is non-overlapping with the orthographic projection of the third node connecting line on the base substrate; the second portion comprises a gate electrode of the light emitting control transistor; and the first portion does not comprise any portion of the gate electrode of the light emitting control transistor.

Optionally, the array substrate further comprises a plurality of first control signal lines; wherein the respective pixel driving circuit further comprises a first reset transistor; a respective first control signal line of the plurality of first control signal lines is configured to provide control signals to a gate electrode of the first reset transistor; and the orthographic projection of the third node connecting line on the base substrate at least partially overlaps with an orthographic projection of the respective first control signal line on the base substrate.

Optionally, the respective first control signal line comprises multiple branches in different layers; a respective branch of the multiple branches comprises a third portion, a fourth portion, and a fifth portion; the third portion has a third average line width; the fourth portion has a fourth average line width; the fifth portion has a fifth average line width; the third average line width is greater than the fourth average line width; the fifth average line width is greater than the fourth average line width; an orthographic projection of the fourth portion on the base substrate at least partially overlaps with an orthographic projection of the third node connecting line on the base substrate; an orthographic projection of the third portion on the base substrate is non-overlapping with the orthographic projection of the third node connecting line on the base substrate; an orthographic projection of the fifth portion on the base substrate is non-overlapping with the orthographic projection of the third node connecting line on the base substrate; the third portion comprises at least a portion of a gate electrode of the first reset transistor; the fifth portion comprises at least a portion of a gate electrode of the compensating transistor; and the fourth portion does not comprise any portion of the gate electrode of the first reset transistor or the gate electrode of the compensating transistor.

Optionally, the respective pixel driving circuit further comprises a light emitting control transistor and a second node connecting line; a first electrode of the driving transistor and a second electrode of the light emitting control transistor are parts of a unitary structure; a first electrode of the compensating transistor and a second electrode of the third reset transistor are parts of a unitary structure; and the second node connecting line is connected to the second electrode of the light emitting control transistor and the first electrode of the driving transistor through a third via, and connected to the second electrode of the third reset transistor and the first electrode of the compensating transistor through a fourth via.

Optionally, a virtual extension of the third capacitor electrode along a second direction crosses over the second node connecting line; a virtual extension of the second capacitor electrode does not cross over the second node connecting line; and at least a portion of the third node connecting line spaces apart the second node connecting line from the second capacitor electrode.

Optionally, the array substrate further comprises a plurality of first fanout connecting lines extending along a direction substantially parallel to a second direction; a plurality of second fanout connecting lines extending along a direction substantially parallel to a first direction; a plurality of second voltage supply lines extending along a direction substantially parallel to the first direction; and a plurality of data lines extending along a direction substantially parallel to the first direction, wherein two adjacent second fanout connecting lines of the plurality of second fanout connecting lines are between two adjacent data lines of the plurality of data lines configured to provide data signals to two adjacent pixel driving circuits in a same row; and a respective data line of the plurality of data lines is between a second fanout connecting line and a second voltage supply line.

Optionally, the respective data line is connected to a respective first fanout connecting line; an individual data line of the plurality of data lines is connected to a respective first fanout connecting line of the plurality of first fanout connecting lines through a first connecting via, a respective second fanout connecting line of the plurality of second fanout connecting lines is connected to the respective first fanout connecting line through a second connecting via; the respective first fanout connecting line connects the individual data line with the respective second fanout connecting line; and the plurality of second fanout connecting lines are connected to a data driving circuit.

Optionally, the array substrate further comprises a plurality of gate lines; wherein a respective gate line of the plurality of gate lines is configured to provide gate scanning signals to a gate electrode of the data write transistor; the respective pixel driving circuit further comprises a first node connecting line; and an orthographic projection of the respective gate line on the base substrate is substantially non-overlapping with an orthographic projection of the first node connecting line on the base substrate.

Optionally, the orthographic projection of the respective gate line on the base substrate and an orthographic projection of the second capacitor electrode on the base substrate are spaced apart by an orthographic projection of the third capacitor electrode on the base substrate; and the orthographic projection of the second capacitor electrode on the base substrate is substantially non-overlapping with the orthographic projection of the respective gate line on the base substrate, and is substantially non-overlapping with the orthographic projection of the third capacitor electrode on the base substrate.

Optionally, the array substrate further comprises a plurality of light emitting control signal lines; wherein the respective pixel driving circuit further comprises a light emitting control transistor; a respective light emitting control signal line of the plurality of light emitting control signal lines is configured to provide light emitting control signals to a gate electrode of the light emitting control transistor; the orthographic projection of the respective gate line on the base substrate and the orthographic projection of the second capacitor electrode on the base substrate are spaced apart by an orthographic projection of the respective light emitting control signal line on the base substrate; and the orthographic projection of the respective light emitting control signal line on the base substrate is substantially non-overlapping with the orthographic projection of the respective gate line on the base substrate, and is substantially non-overlapping with the orthographic projection of the second capacitor electrode on the base substrate.

Optionally, the respective pixel driving circuit further comprises a first reset transistor; a respective first control signal line of the plurality of first control signal lines is configured to provide control signals to a gate electrode of the first reset transistor; an overlapping area between the orthographic projection of the third node connecting line on the base substrate and the orthographic projection of at least one of the respective light emitting control signal line, the respective first control signal line, the respective third control signal line, the respective gate line on the base substrate is no greater than a third of an area of the orthographic projection of the third node connecting line on the base substrate.

Optionally, the array substrate further comprises a plurality of first reset signal lines; wherein a respective first reset signal line of the plurality of first reset signal lines comprises a plurality of loops arranged along a direction substantially parallel to first direction; and a respective loop of the plurality of loops is connected to first electrodes of two adjacent first reset transistors of two adjacent pixel driving circuits in a same row.

In another aspect, the present disclosure provides a display apparatus, comprising the array substrate described herein, and one or more integrated circuits connected to the array substrate.

BRIEF DESCRIPTION OF THE FIGURES

The following drawings are merely examples for illustrative purposes according to various disclosed embodiments and are not intended to limit the scope of the present invention.

DETAILED DESCRIPTION

The disclosure will now be described more specifically with reference to the following embodiments. It is to be noted that the following descriptions of some embodiments are presented herein for purpose of illustration and description only. It is not intended to be exhaustive or to be limited to the precise form disclosed.

The present disclosure provides, inter alia, an array substrate and a display apparatus that substantially obviate one or more of the problems due to limitations and disadvantages of the related art. In one aspect, the present disclosure provides an array substrate. In some embodiments, the array substrate includes a plurality of pixel driving circuits and a plurality of third control signal lines. Optionally, a respective pixel driving circuit of the plurality of pixel driving circuits comprises a driving transistor, a data write transistor, a compensating transistor, a third reset transistor, a first capacitor having a first capacitor electrode and a second capacitor electrode, a second capacitor having a third capacitor electrode and a fourth capacitor electrode, and a third node connecting line. Optionally, a respective third control signal line of the plurality of third control signal lines is configured to provide control signals to a gate electrode of the third reset transistor. Optionally, the third node connecting line is connected to second electrodes of the compensating transistor and the data write transistor, and is connected to the first capacitor electrode and the fourth capacitor electrode. Optionally, an orthographic projection of the third node connecting line on a base substrate at least partially overlaps with an orthographic projection of the respective third control signal line on the base substrate.

Various appropriate pixel driving circuits may be used in the present array substrate. Examples of appropriate driving circuits include 3T1C, 2T1C, 4T1C, 4T2C, 5T2C, 6T1C, 7T1C, 7T2C, 8T1C, and 8T2C. In some embodiments, the respective one of the plurality of pixel driving circuits is an 7T2C driving circuit. In some embodiments, the respective one of the plurality of pixel driving circuits is an 8T2C driving circuit. Various appropriate light emitting elements may be used in the present array substrate. Examples of appropriate light emitting elements include organic light emitting diodes, quantum dots light emitting diodes and micro light emitting diodes. Optionally, the light emitting element is micro light emitting diode. Optionally, the light emitting element is an organic light emitting diode including an organic light emitting layer.

Figure 1:
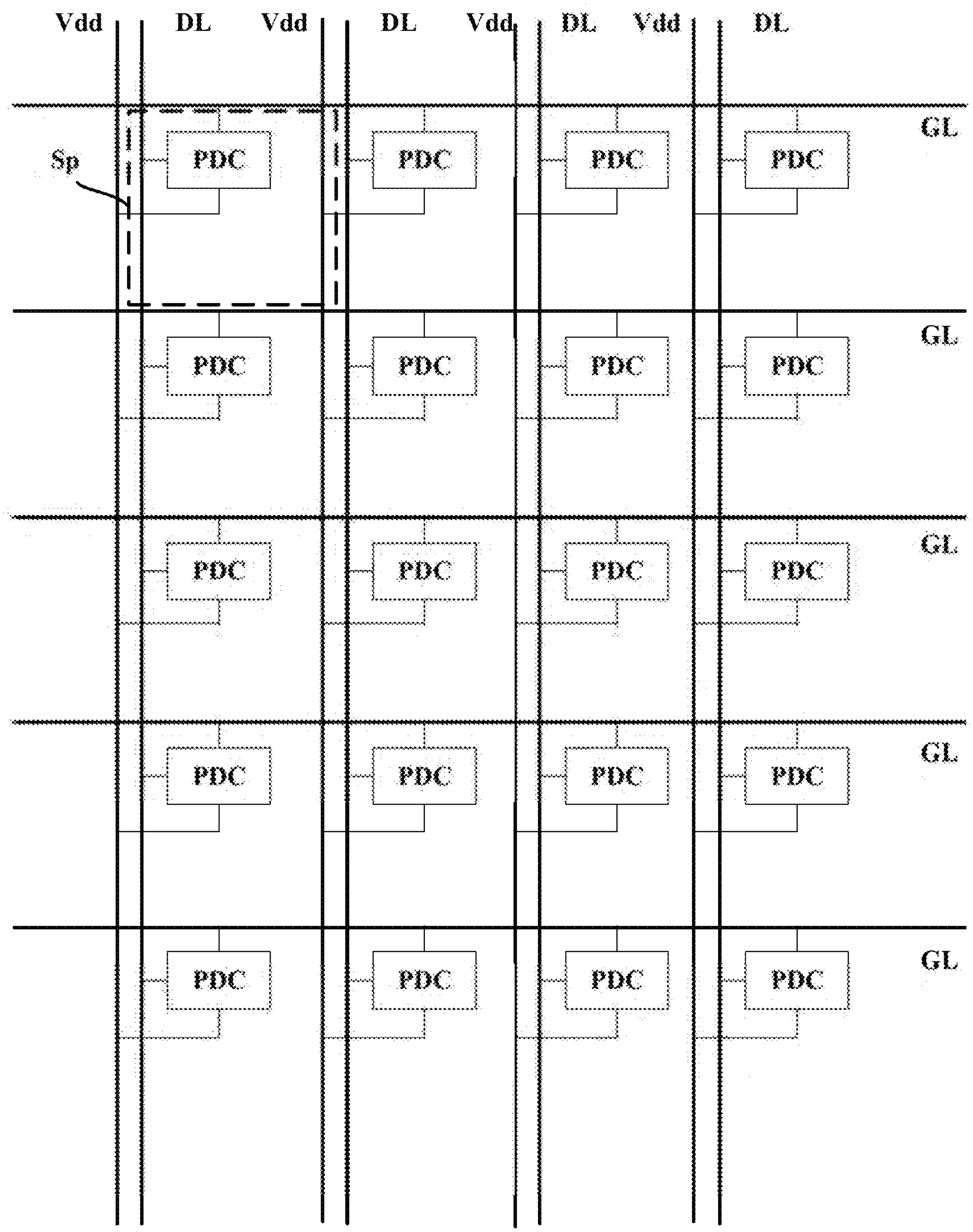
FIG. 1 is a plan view of an array substrate in some embodiments according to the present disclosure.

FIG. 1 is a plan view of an army substrate in some embodiments according to the present disclosure. Referring to FIG. 1, the array substrate includes an array of subpixels Sp. Each subpixel includes an electronic component, e.g., a light emitting element. In one example, the light emitting element is driven by a respective pixel driving circuit PDC. The array substrate includes a plurality of gate lines GL, a plurality of data lines DL, a plurality of voltage supply line Vdd. Light emission in a respective subpixel Sp is driven by a respective pixel driving circuit PDC. In one example, a high voltage signal (e.g., a VDD signal) is input, through a respective voltage supply line of the plurality of voltage supply line Vdd, to the respective pixel driving circuit PDC connected to an anode of the light emitting element; a low voltage signal (e.g., a VSS signal) is input, through a low voltage supply line, to a cathode of the light emitting element. A voltage difference between the high voltage signal (e.g., the VDD signal) and the low voltage signal (e.g., the VSS signal) is a driving voltage ΔV that drives light emission in the light emitting element.

Figure 2A:
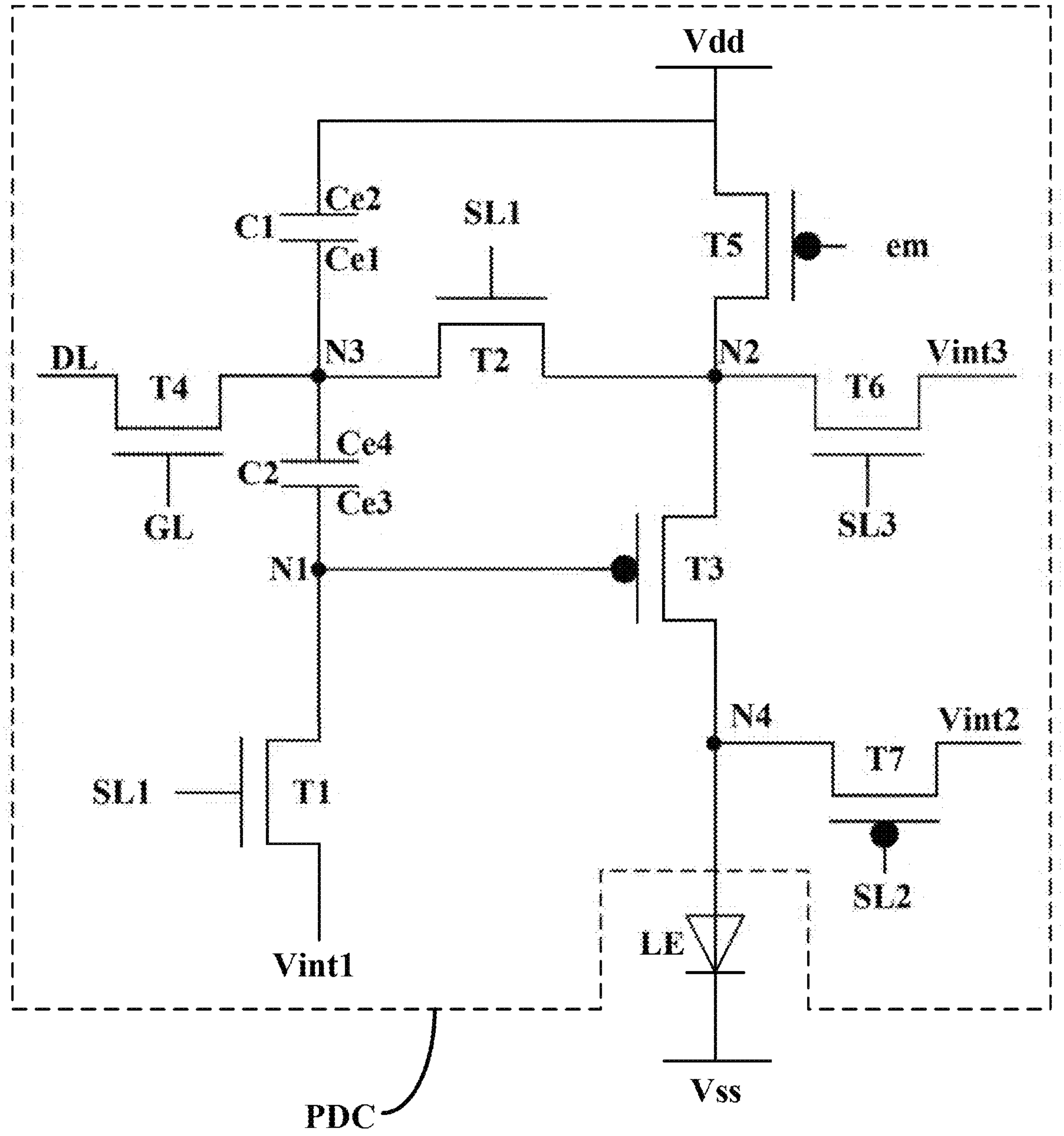
FIG. 2A is a circuit diagram illustrating the structure of a pixel driving circuit in some embodiments according to the present disclosure.

FIG. 2A is a circuit diagram illustrating the structure of a pixel driving circuit in some embodiments according to the present disclosure. Referring to FIG. 2A, the pixel driving circuit includes a driving transistor T3, a first capacitor C1 having a first capacitor electrode Ce1 and a second capacitor electrode Ce2; a second capacitor C2 having a third capacitor electrode Ce3 and a fourth capacitor electrode Ce4; a data write transistor T4 having a gate electrode connected to a respective gate line of a plurality of gate lines GL, a first electrode connected to a respective data line of a plurality of data lines DL, and a second electrode connected to the first capacitor electrode Ce1 and the fourth capacitor electrode Ce4. A gate electrode of the driving transistor T3 is connected to the third capacitor electrode Ce3.

In some embodiments, the pixel driving circuit further includes a compensating transistor T2 having a gate electrode connected to a respective first control signal line of a plurality of first control signal lines SL1; a first electrode connected to a first electrode of the driving transistor T3; and a second electrode connected to the first capacitor electrode Ce1, the fourth capacitor electrode Ce4, and the second electrode of the data write transistor T4.

In some embodiments, the first capacitor electrode Ce1 of the first capacitor C1 is connected to the second electrode of the data write transistor T4, the second electrode of the compensating transistor T2, and the fourth capacitor electrode Ce4. The second capacitor electrode Ce2 of the first capacitor C1 is connected to a respective voltage supply line of a plurality of voltage supply lines Vdd (e.g., a high voltage signal line).

In some embodiments, the fourth capacitor electrode Ce4 of the second capacitor C2 is connected to the second electrode of the data write transistor T4, the second electrode of the compensating transistor T2, and the first capacitor electrode Ce1. The third capacitor electrode Ce3 of the second capacitor C2 is connected to the gate electrode of the driving transistor T3.

In some embodiments, the pixel driving circuit further includes a light emitting control transistor T5 having a gate electrode connected to a respective light emitting control signal line of a plurality of light emitting control signal lines em, a first electrode connected to the respective voltage supply line of the plurality of voltage supply lines Vdd, and a second electrode connected to the first electrode of the driving transistor T3 and the first electrode of the compensating transistor T2.

In some embodiments, the pixel driving circuit further includes at least one reset transistor. In some embodiments, the pixel driving circuit further includes a first reset transistor T1 having a gate electrode connected to the respective first control signal line of the plurality of first control signal lines SL1, a first electrode connected to a respective first reset signal line of a plurality of first reset signal lines Vint1, and a second electrode connected to the gate electrode of the driving transistor T3 and the third capacitor electrode Ce3 of the second capacitor C2.

In some embodiments, the pixel driving circuit further includes a second reset transistor T7 having a gate electrode connected to a respective second control signal line of a plurality of second control signal lines SL2, a first electrode connected to a respective second reset signal line of a plurality of second reset signal lines Vint2, and a second electrode connected to the second electrode of the driving transistor T3 and an anode of a light emitting element LE.

In some embodiments, the pixel driving circuit further includes a third reset transistor T6 having a gate electrode connected to a respective third control signal line of a plurality of third control signal lines SL3; a first electrode connected to a third reset signal line Vint3; and a second electrode connected to the first electrode of the driving transistor T3, the second electrode of the light emitting control transistor T5, and the second electrode of the compensating transistor T2.

The pixel driving circuit further include a first node N1, a second node N2, a third node N3, and a fourth node N4. The first node N1 is connected to the gate electrode of the driving transistor T3, the third capacitor electrode Ce3, and the second electrode of the first reset transistor T1: The second node N2 is connected to the first electrode of the driving transistor T3, the second electrode of the light emitting control transistor T5, the first electrode of the compensating transistor T2, and the second electrode of the third reset transistor T6. The third node N3 is connected to the second electrode of the data write transistor T4, the second electrode of the compensating transistor T2, the first capacitor electrode Ce1, and the fourth capacitor electrode Ce4. The fourth node N4 is connected to the second electrode of the driving transistor T3, the second electrode of the second reset transistor T7, and the anode of the light emitting element LE.

As used herein, a first electrode or a second electrode refers to one of a first terminal and a second terminal of a transistor, the first terminal and the second terminal being connected to an active layer of the transistor, A direction of a current flowing through the transistor may be configured to be from a first electrode to a second electrode, or from a second electrode to a first electrode. Accordingly, depending on the direction of the current flowing through the transistor, in one example, the first electrode is configured to receive an input signal and the second electrode is configured to output an output signal; in another example, the second electrode is configured to receive an input signal and the first electrode is configured to output an output signal.

The present disclosure may be implemented in pixel driving circuit having transistors of various types, including a pixel driving circuit having p-type transistors, a pixel driving circuit having n-type transistors, and a pixel driving circuit having one or more p-type transistors and one or more n-type transistors. Referring to FIG. 2A, the data write transistor T4, the compensating transistor T2, the first reset transistor T1, and the third reset transistor T6 are n-type transistors such as metal oxide transistors, and the driving transistor T3, the light emitting control transistor T5, and the second reset transistor T7 are p-type transistors such as polysilicon transistors. For a p-type transistor, an effective control signal (e.g., a turn-on control signal) is a low voltage signal, and an ineffective control signal (e.g., a turn-off control signal) is a high voltage signal. For an n-type transistor, an effective control signal (e.g., a turn-on control signal) is a high voltage signal, and an ineffective control signal (e.g., a turn-off control signal) is a low voltage signal.

Figure 2B:
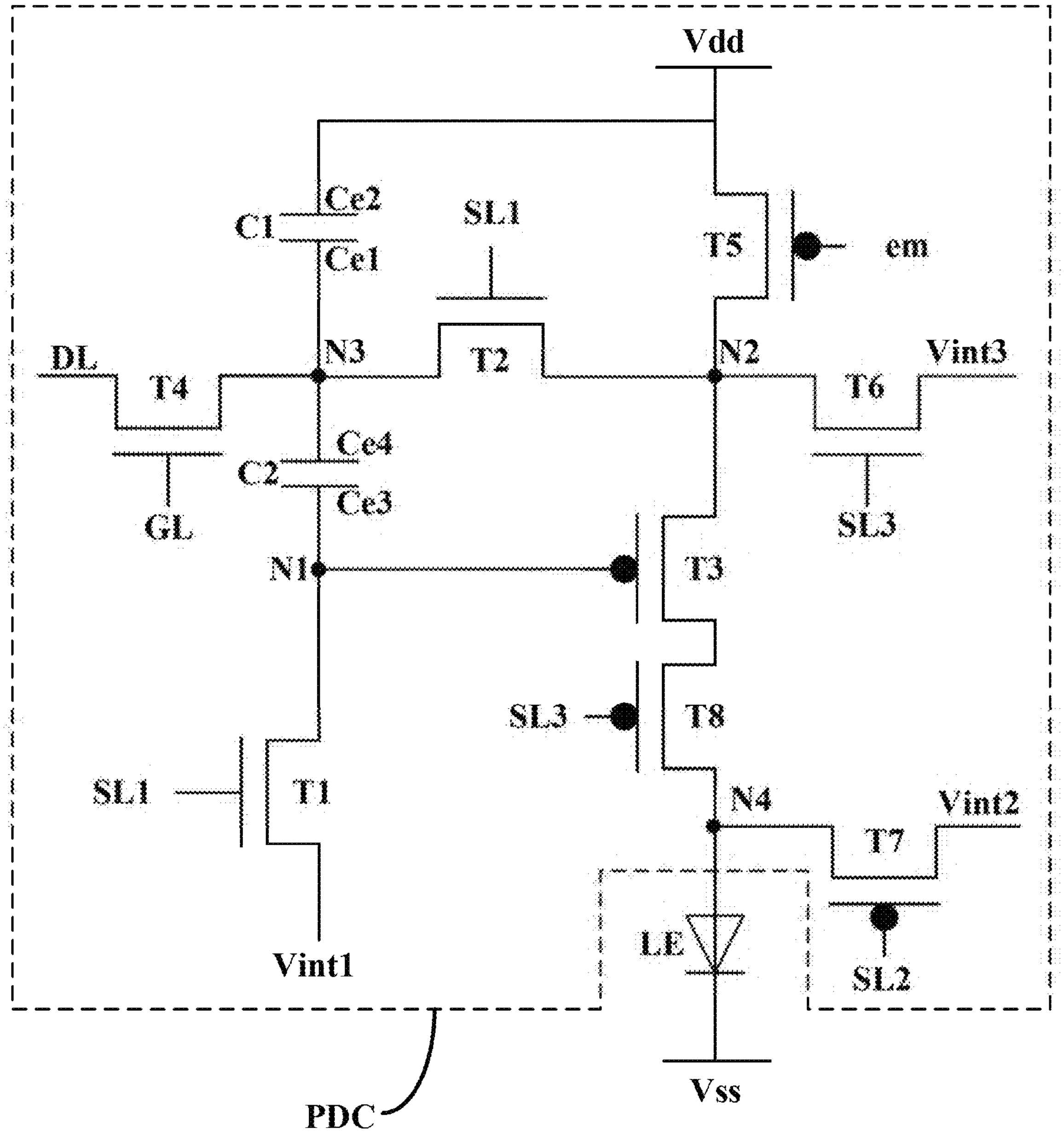
FIG. 2B is a circuit diagram illustrating the structure of a pixel driving circuit in some embodiments according to the present disclosure.

FIG. 2B is a circuit diagram illustrating the structure of a pixel driving circuit in some embodiments according to the present disclosure. Referring to FIG. 2B, the pixel driving circuit includes a driving transistor T3, a first capacitor C1 having a first capacitor electrode Ce1 and a second capacitor electrode Ce2; a second capacitor C2 having a third capacitor electrode Ce3 and a fourth capacitor electrode Ce4; a data write transistor T4 having a gate electrode connected to a respective gate line of a plurality of gate lines GL, a first electrode connected to a respective data line of a plurality of data lines DL, and a second electrode connected to the first capacitor electrode Ce1 and the fourth capacitor electrode Ce4, A gate electrode of the driving transistor T3 is connected to the third capacitor electrode Ce3.

In some embodiments, the pixel driving circuit further includes a compensating transistor T2 having a gate electrode connected to a respective first control signal line of a plurality of first control signal lines SL1; a first electrode connected to a first electrode of the driving transistor T3; and a second electrode connected to the first capacitor electrode Ce1, the fourth capacitor electrode Ce4, and the second electrode of the data write transistor T4.

In some embodiments, the first capacitor electrode Ce1 of the first capacitor C1 is connected to the second electrode of the data write transistor T4, the second electrode of the compensating transistor T2, and the fourth capacitor electrode Ce4. The second capacitor electrode Ce2 of the first capacitor C1 is connected to a respective voltage supply line of a plurality of voltage supply lines Vdd (e.g., a high voltage signal line).

In some embodiments, the fourth capacitor electrode Ce4 of the second capacitor C2 is connected to the second electrode of the data write transistor T4, the second electrode of the compensating transistor T2, and the first capacitor electrode Ce1, The third capacitor electrode Ce3 of the second capacitor C2 is connected to the gate electrode of the driving transistor T3.

In some embodiments, the pixel driving circuit further includes a light emitting control transistor T5 having a gate electrode connected to a respective light emitting control signal line of a plurality of light emitting control signal lines em, a first electrode connected to the respective voltage supply line of the plurality of voltage supply lines Vdd, and a second electrode connected to the first electrode of the driving transistor T3 and the first electrode of the compensating transistor T2.

In some embodiments, the pixel driving circuit further includes at least one reset transistor. In some embodiments, the pixel driving circuit further includes a first reset transistor T1 having a gate electrode connected to the respective first control signal line of the plurality of first control signal lines SL1, a first electrode connected to a respective first reset signal line of a plurality of first reset signal lines Vint1, and a second electrode connected to the gate electrode of the driving transistor T3 and the third capacitor electrode Ce3 of the second capacitor C2.

In some embodiments, the pixel driving circuit further includes a control transistor T8 having a gate electrode connected to a respective third control signal line of a plurality of third control signal lines SL3, a first electrode connected to the second electrode of the driving transistor T3, and a second electrode connected to an anode of a light emitting element LE.

The inventors of the present disclosure discover the issue of leakage through the driving transistor T3 in the pixel driving circuit depicted in FIG. 2A. In one example, the reset signal provided by the respective third reset signal line Vint3 has a voltage level of 6V, and the reset signal provided by the respective first reset signal line Vint1 has a voltage level of −3V. The reset signal provided by the respective third reset signal line Vint3 may flow through the driving transistor T3 and the second reset transistor T7. The inventors of the present disclosure discover that, by having the control transistor T8, the leakage through the driving transistor T3 and the second reset transistor T7 can be prevented or avoided:

In some embodiments, the pixel driving circuit further includes a second reset transistor T7 having a gate electrode connected to a respective second control signal line of a plurality of second control signal lines SL2, a first electrode connected to a respective second reset signal line of a plurality of second reset signal lines Vint2, and a second electrode connected to the second electrode of the control transistor T8 and the anode of a light emitting element LE.

In some embodiments, the pixel driving circuit further includes a third reset transistor T6 having a gate electrode connected to the respective third control signal line of the plurality of third control signal lines SL3; a first electrode connected to a third reset signal line Vint3; and a second electrode connected to the first electrode of the driving transistor T3, the second electrode of the light emitting control transistor T5, and the second electrode of the compensating transistor T2.

The pixel driving circuit further include a first node N1, a second node N2, a third node N3, and a fourth node N4. The first node N1 is connected to the gate electrode of the driving transistor T3, the third capacitor electrode Ce3, and the second electrode of the first reset transistor T1. The second node N2 is connected to the first electrode of the driving transistor T3, the second electrode of the light emitting control transistor T5, the first electrode of the compensating transistor T2, and the second electrode of the third reset transistor T6. The third node N3 is connected to the second electrode of the data write transistor T4, the second electrode of the compensating transistor T2, the first capacitor electrode Ce1, and the fourth capacitor electrode Ce4. The fourth node N4 is connected to the second electrode of the control transistor T8, the second electrode of the second reset transistor T7, and the anode of the light emitting element LE.

The present disclosure may be implemented in pixel driving circuit having transistors of various types, including a pixel driving circuit having p-type transistors, a pixel driving circuit having n-type transistors, and a pixel driving circuit having one or more p-type transistors and one or more n-type transistors. Referring to FIG. 2B, the data write transistor T4, the compensating transistor T2, the first reset transistor T1, and the third reset transistor T6 are n-type transistors such as metal oxide transistors, and the driving transistor T3, the light emitting control transistor T5, the second reset transistor T7, and the control transistor T8 are p-type transistors such as polysilicon transistors. For a p-type transistor, an effective control signal (e.g., a turn-on control signal) is a low voltage signal, and an ineffective control signal (e.g., a turn-off control signal) is a high voltage signal. For an n-type transistor, an effective control signal (e.g., a turn-on control signal) is a high voltage signal, and an ineffective control signal (e.g., a turn-off control signal) is a low voltage signal.

Figure 3:
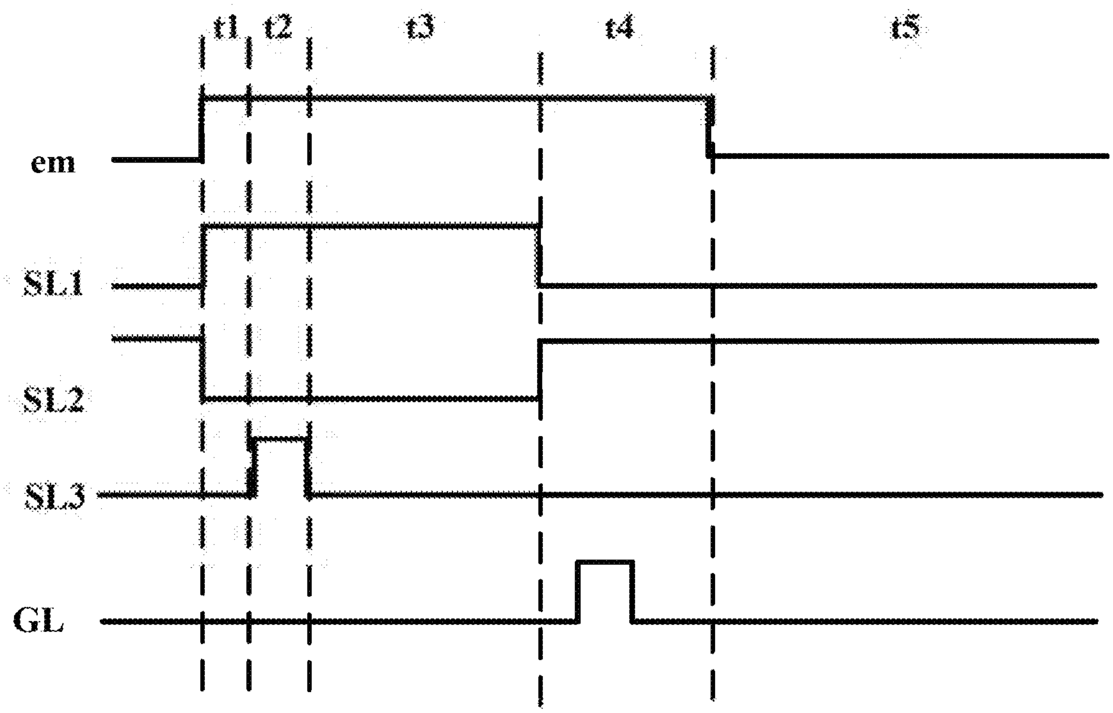
FIG. 3 is a timing diagram illustrating the operation of a pixel driving circuit in some embodiments according to the present disclosure.

FIG. 3 is a timing diagram illustrating the operation of a pixel driving circuit in some embodiments according to the present disclosure, Referring to FIG. 2A, FIG. 2B, and FIG. 3, during one frame of image, the operation of the pixel driving circuit includes a first phase t1, a second phase (2, a third phase t3, a fourth phase 14, and a fifth phase t5.

Figure 4A:
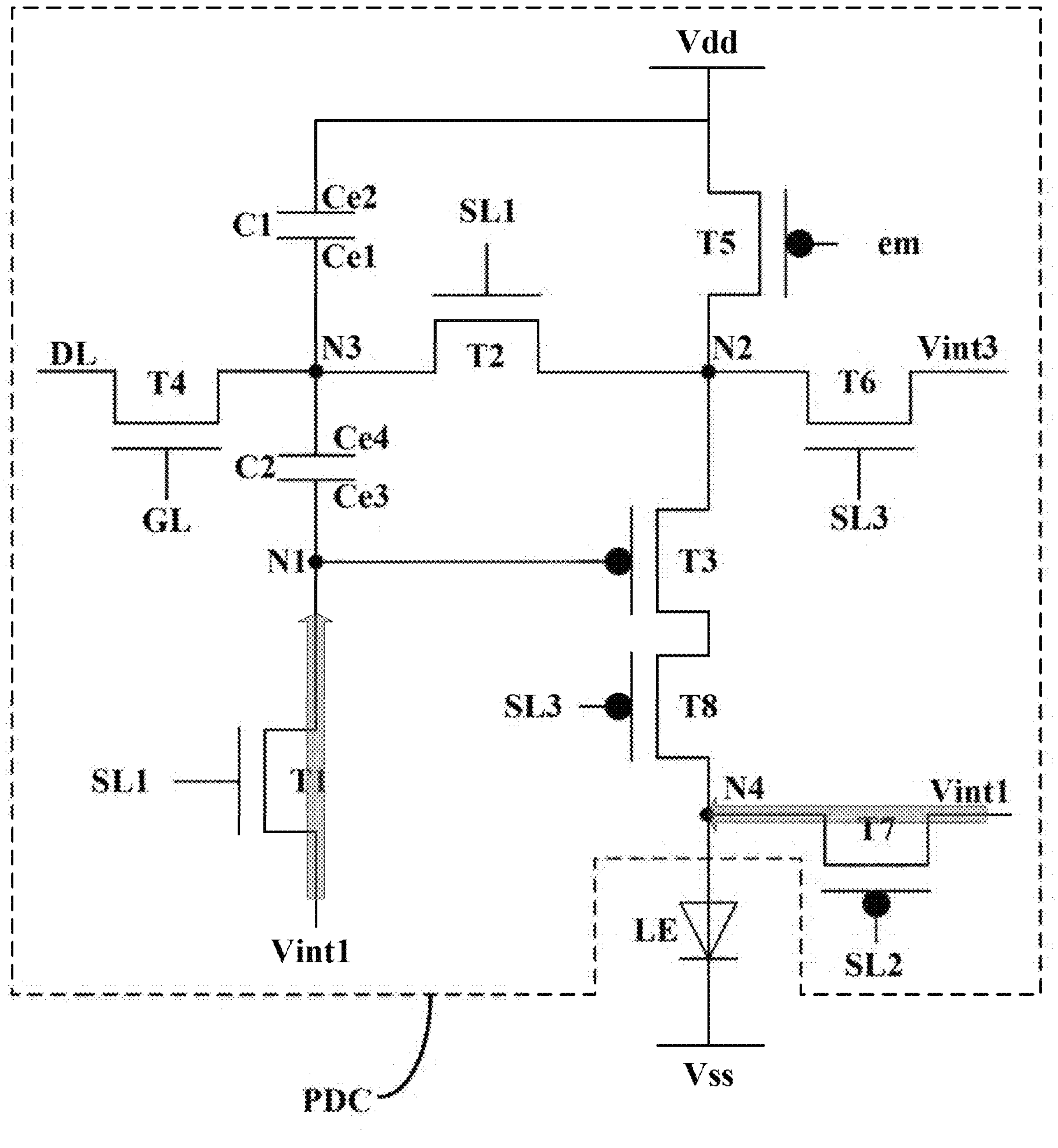
FIG. 4A illustrates a current pathway in a phase t1 of a frame of image in a pixel driving circuit in some embodiments according to the present disclosure.

In the first phase t1, a turning-on control signal is provided through the respective first control signal line of the plurality of first control signal lines SL1 to the gate electrode of the first reset transistor T1 to turn on the first reset transistor T1, allowing a reset signal from the first reset signal line Vint1 to pass from a first electrode of the first reset transistor T1 to a second electrode of the first reset transistor T1, and in turn to the third capacitor electrode Ce3 and the gate electrode of the driving transistor T3. The node N1 (the gate electrode of the driving transistor T3) is reset. The turning-on control signal is also provided through the respective first control signal line of the plurality of first control signal lines SL1 to the gate electrode of the compensating transistor T2 to turn on the compensating transistor T2. A turning-on control signal is provided through the respective second control signal line of the plurality of second control signal lines SL2 to the gate electrode of the second reset transistor T7 to turn on the second reset transistor T7, allowing a reset signal from a respective second reset signal line of the plurality of second reset signal lines Vint2 to pass from a first electrode of the second reset transistor T7 to a second electrode of the second reset transistor T7, and in turn to the anode of the light emitting element LE. The node N4 (the anode of the light emitting element LE) is reset. A turning-off light emitting control signal is provided through the respective light emitting control signal line of the plurality of light emitting control signal lines em to the gate electrode of the light emitting control transistor T5 to turn off the light emitting control transistor T5. A turning-off control signal is provided through the respective third control signal line of the plurality of third control signal lines SL3 to the gate electrode of the third reset transistor T6 to turn off the third reset transistor T6. A turning-off gate signal is provided through the respective gate line of the plurality of gate lines GL to the gate electrode of the data write transistor T4 to turn off the data write transistor T4. FIG. 4A illustrates a current pathway in a phase t1 of a frame of image in a pixel driving circuit in some embodiments according to the present disclosure. The shaded arrows in FIG. 4A indicates a current flow in the phase t1.

Figure 4B:
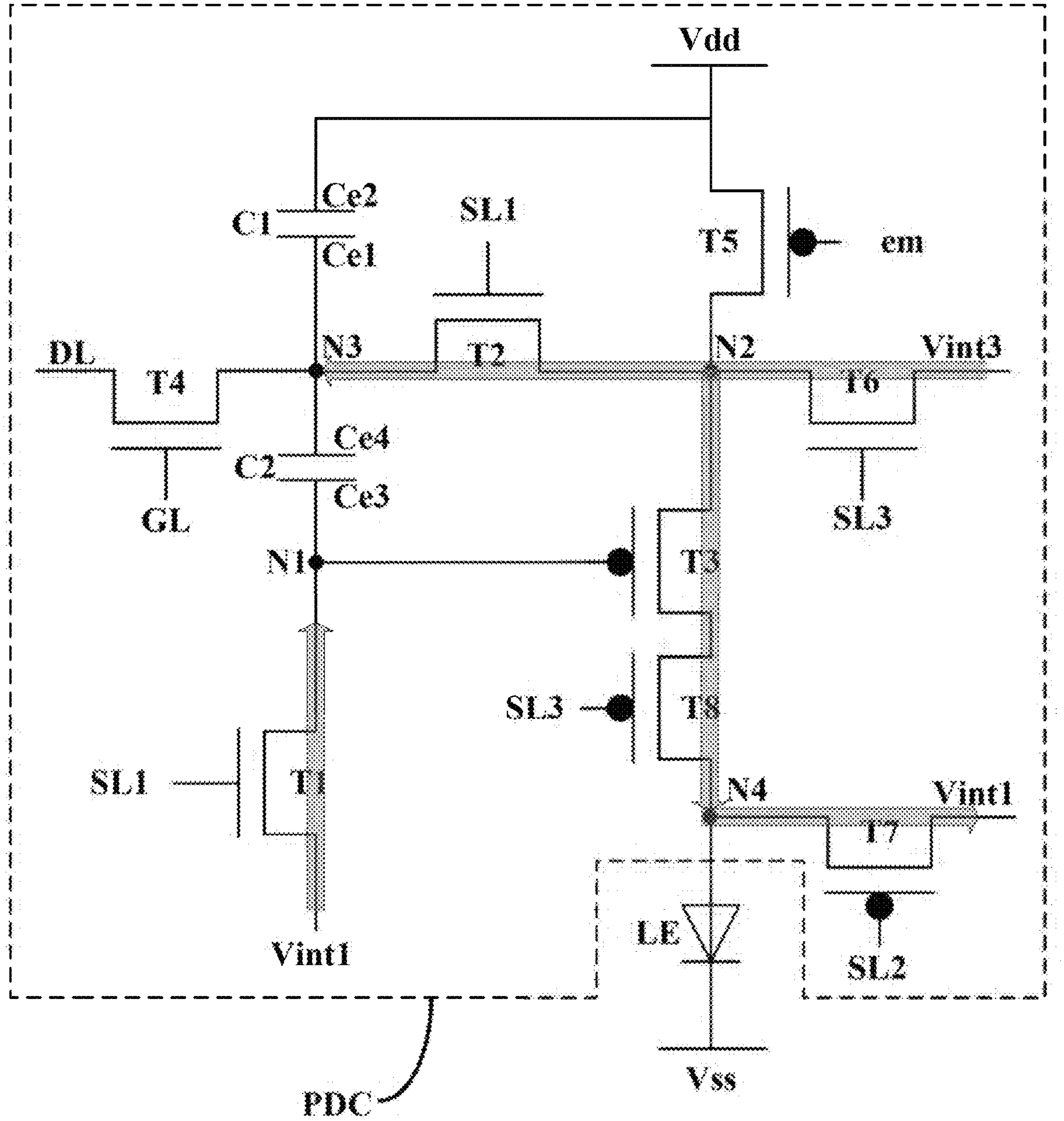
FIG. 4B illustrates a current pathway in a phase t2 of a frame of image in a pixel driving circuit in some embodiments according to the present disclosure.

In the second phase t2, a turning-on control signal is provided through the respective first control signal line of the plurality of first control signal lines SL1 to the gate electrode of the first reset transistor T1 to turn on the first reset transistor T1, and also provided through the respective first control signal line of the plurality of first control signal lines SL1 to the gate electrode of the compensating transistor T2 to turn on the compensating transistor T2. A turning-on control signal is provided through the respective second control signal line of the plurality of second control signal lines SL2 to the gate electrode of the second reset transistor T7 to turn on the second reset transistor T7. A turning-on control signal is provided through the respective third control signal line of the plurality of third control signal lines SL3 to the gate electrode of the third reset transistor T6 to turn on the third reset transistor T6, allowing a reset signal from the respective third reset signal line of the plurality of third reset signal lines Vint3 to pass from a first electrode of the third reset transistor T6 to a second electrode of the third reset transistor T6, and in turn to the first electrode of the driving transistor T3, the second electrode of the light emitting control transistor T5, and the second electrode of the compensating transistor T2. The node N2 (the first electrode of the driving transistor T3) is charged with a voltage of the respective third reset signal line of the plurality of third reset signal lines Vint3. In some embodiments, the voltage of the respective third reset signal line of the plurality of third reset signal lines Vint3 has a high voltage level (e.g., 6V), to ensure Vgs<Vth, thereby ensuring the driving transistor T3 remains in a turning-on state. FIG. 4B illustrates a current pathway in a phase 12 of a frame of image in a pixel driving circuit in some embodiments according to the present disclosure. The shaded arrows in FIG. 4B indicates a current flow in the phase t2.

Figure 4C:
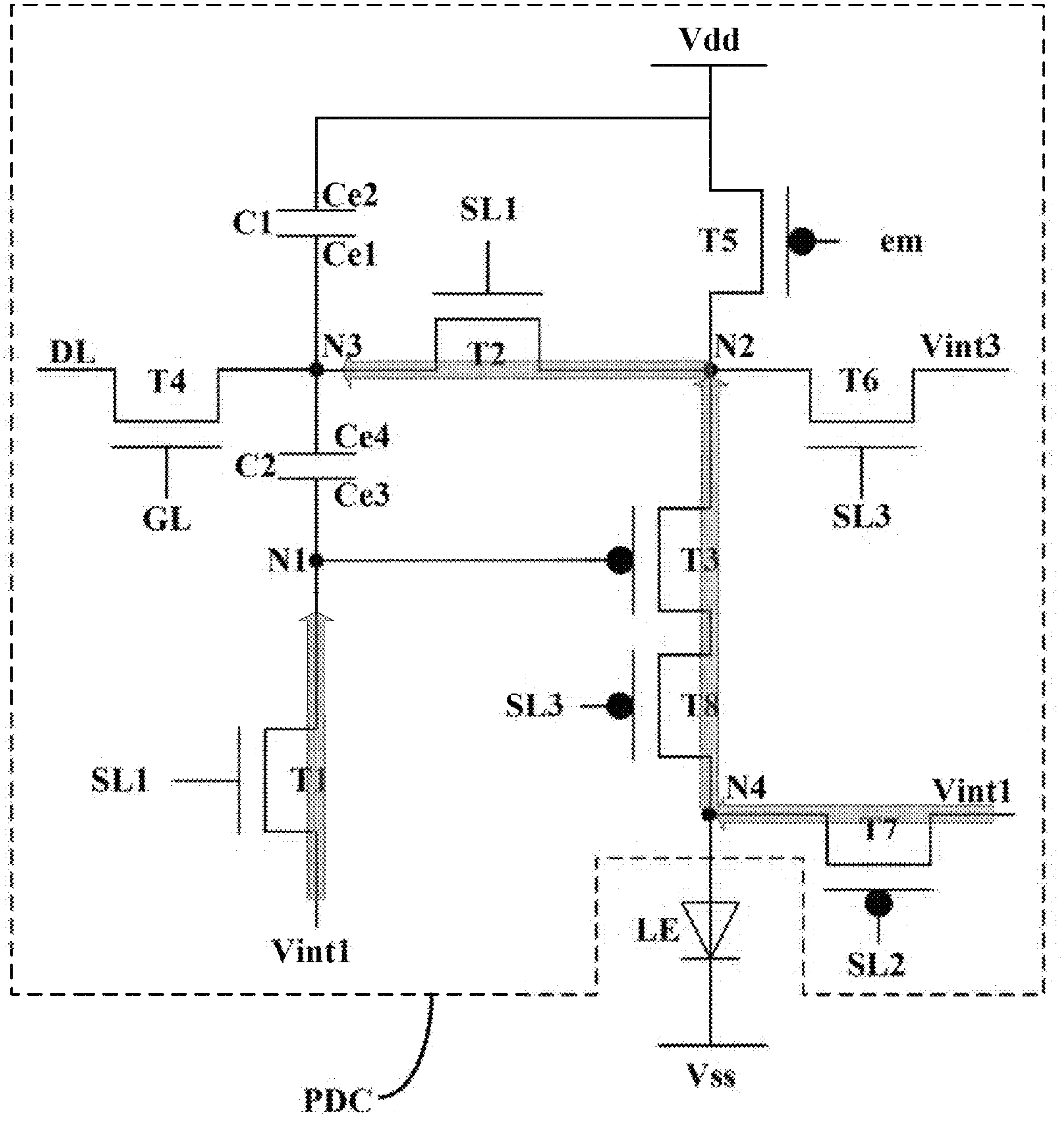
FIG. 4C illustrates a current pathway in a phase t3 of a frame of image in a pixel driving circuit in some embodiments according to the present disclosure.

In the third phase 13 (Vth compensating phase), a turning-off control signal is provided through the respective third control signal line of the plurality of third control signal lines SL3 to the gate electrode of the third reset transistor T6 to turn off the third reset transistor T6. In the third phase 13, the first reset transistor T1, the compensating transistor T2, the driving transistor T3, the second reset transistor T7, and the control transistor T8 remain turning on. A second reset signal is provided through the respective second reset signal line of the plurality of second reset signal lines Vint2, the second reset signal passes through the second reset transistor T7 and the driving transistor T3, charging the node N2 (the first electrode of the driving transistor T3). When the node N2 is charged to a point when Vgs=Vth, the driving transistor T3 is turned off. Vgs=VN1−VN2, wherein VN1 is a voltage level at the node N1, and VN2 is a voltage level at the node N2. In the third phase t3, VN1=a voltage level of the first reset signal provided by the first reset signal line Vint1. Thus, VN2=VN1−Vgs=VN1−Vth, i.e., VN2=Vint1−Vth. Because the compensating transistor T2 is turning on in the third phase 13, VN3=VN2=VN1−Vth, wherein VN3 is a voltage level at the node N3. FIG. 4C illustrates a current pathway in a phase t3 of a frame of image in a pixel driving circuit in some embodiments according to the present disclosure. The shaded arrows in FIG. 4C indicates a current flow in the phase t3.

In some embodiments, the plurality of first reset signal lines Vint1 are configured to provide a first reset signal, the plurality of second reset signal lines Vint2 are configured to provide a second reset signal. In one example, the first reset signal and the second reset signal are a same reset signal. In another example, the plurality of first reset signal lines Vint1 and the plurality of second reset signal lines Vint2 form an interconnected network, thereby configured to provide a same reset signal.

Figure 4D:
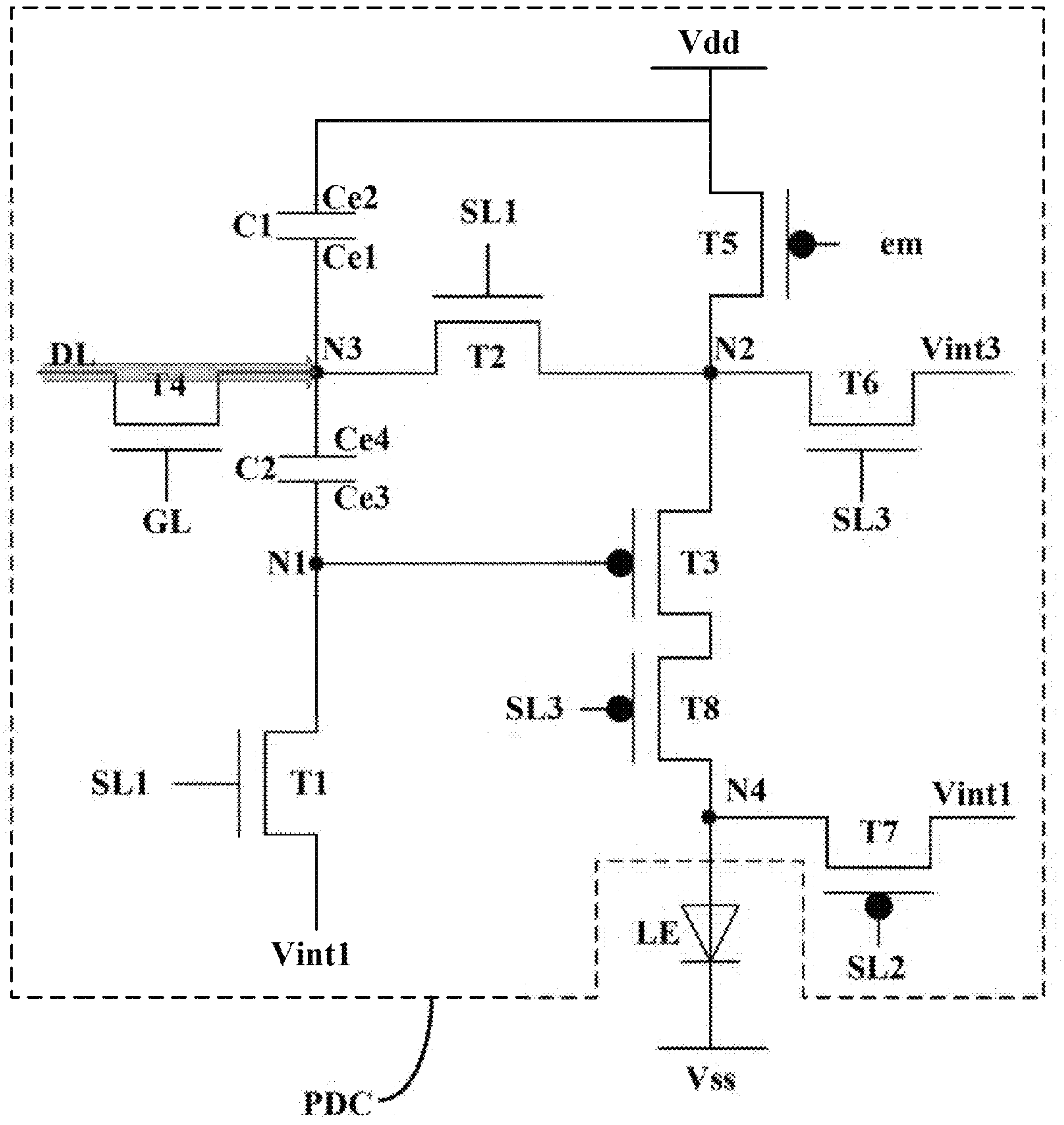
FIG. 4D illustrates a current pathway in a phase t4 of a frame of image in a pixel driving circuit in some embodiments according to the present disclosure.

In the phase 14 (data write phase), a turning-off control signal is provided through the respective first control signal line of the plurality of first control signal lines SL1 to the gate electrode of the first reset transistor T1 to turn off the first reset transistor T1, and also provided through the respective first control signal line of the plurality of first control signal lines SL1 to the gate electrode of the compensating transistor T2 to turn off the compensating transistor T2. A turning-off control signal is provided through the respective second control signal line of the plurality of second control signal lines SL2 to the gate electrode of the second reset transistor T7 to turn off the second reset transistor T7. A turning-on gate signal is provided through the respective gate line of the plurality of gate lines GL to the gate electrode of the data write transistor T4 to turn on the data write transistor T4, allowing a data signal provided through the data line DL to pass from a first electrode of the data write transistor T4 to a second electrode of the data write transistor T4, and in turn to the node N3. In the phase t3, VN1=a voltage level of the first reset signal provided by the first reset signal line Vint1 (denoted as Vre1). In the phase 14, a voltage level at the node N3 changes from (Vre1−Vth) to a voltage level of the data signal Vdata. The change is ΔVN3=Vdata−Vre1+Vth. The second capacitor C2 induces a voltage coupling at the node N1 by & VN3. Due to the voltage coupling, VN1 changes to (Vre1+ΔVN3) =(Vre1+Vdata−Vre1+Vth)=(Vdata+Vth), wherein the Vdata is the voltage level of the data voltage signal, and the Vth is the voltage level of the threshold voltage Th of the PN junction of the driving transistor T3. FIG. 4D illustrates a current pathway in a phase t4 of a frame of image in a pixel driving circuit in some embodiments according to the present disclosure. The shaded arrows in FIG. 4D indicates a current flow in the phase t4.

Figure 4E:
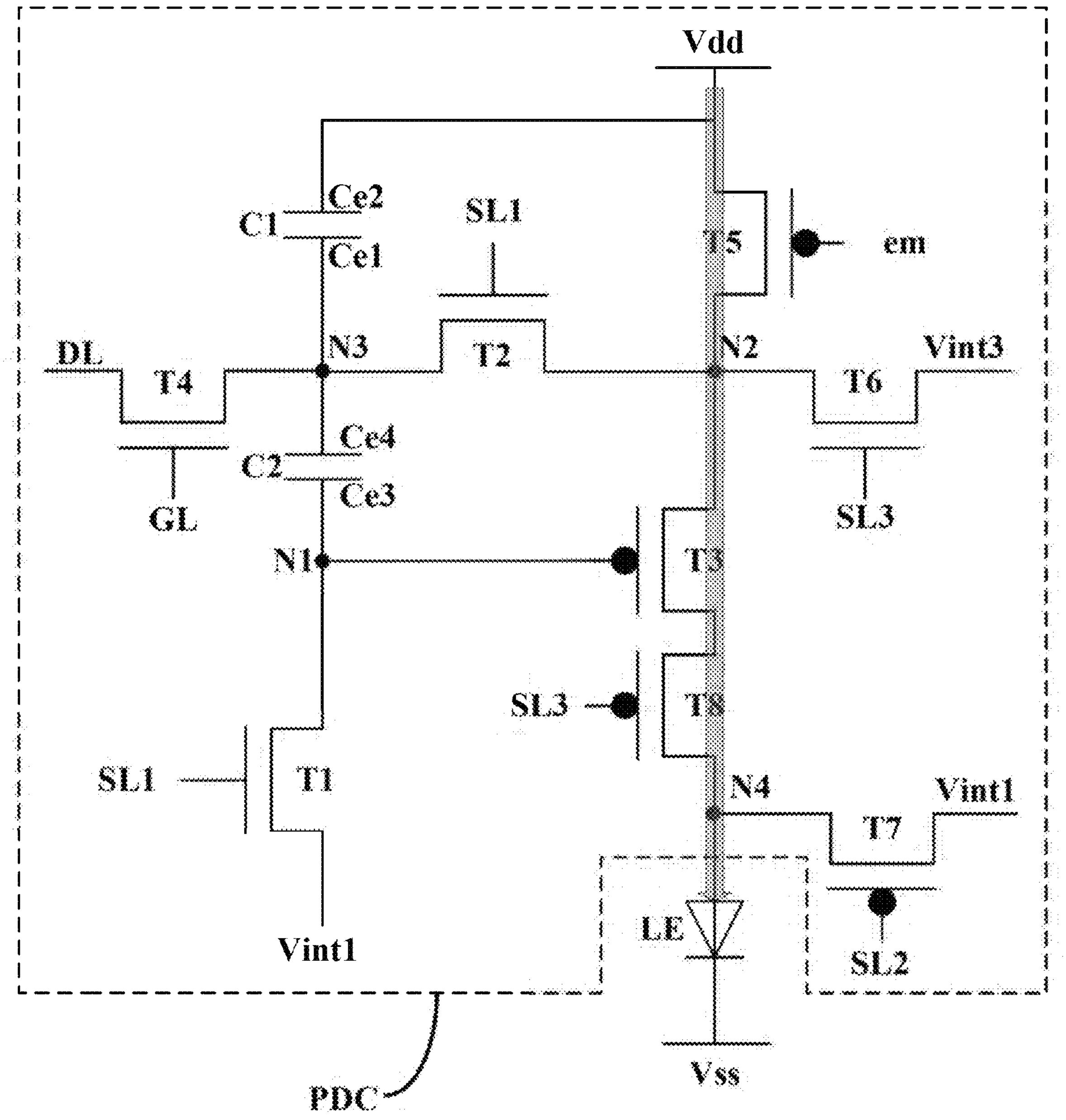
FIG. 4E illustrates a current pathway in a phase t5 of a frame of image in a pixel driving circuit in some embodiments according to the present disclosure.

In the phase t5 (light emission phase), a turning-on light emitting control signal is provided through the respective light emitting control signal line of the plurality of light emitting control signal lines em to the gate electrode of the light emitting control transistor T5 to turn on the light emitting control transistor T5, allowing a voltage supply voltage signal provided through the respective voltage supply line of the plurality of voltage supply lines Vdd to pass from a first electrode of the light emitting control transistor T5 to a second electrode of the light emitting control transistor T5, in turn pass from a first electrode of the driving transistor T3 to a second electrode of the driving transistor T3, in turn pass from a first electrode of the control transistor T8 to a second electrode of the control transistor T8, and to the anode of the light emitting element LE. The light emitting element is configured to emit light. FIG. 4E illustrates a current pathway in a phase t5 of a frame of image in a pixel driving circuit in some embodiments according to the present disclosure. The shaded arrows in FIG. 4E indicates a current flow in the phase t5.

Figure 5A:
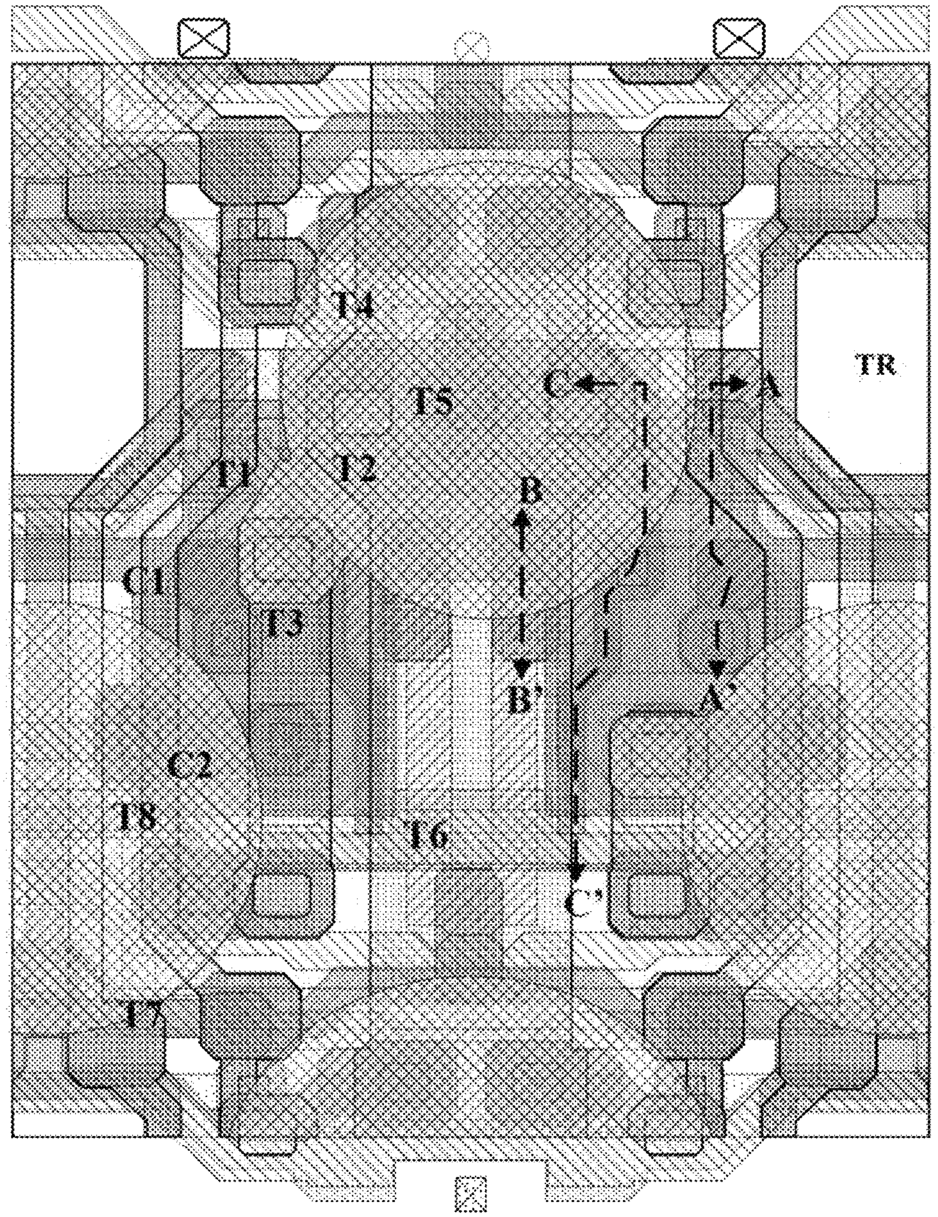
FIG. 5A is a diagram illustrating the structure of pixel driving circuits in an array substrate in some embodiments according to the present disclosure.
Figure 5B:
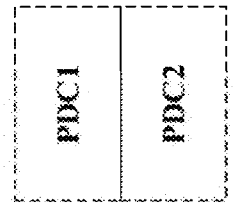
FIG. 5B is a schematic diagram illustrating an arrangement of pixel driving circuits in the array substrate depicted in FIG. 5A.

FIG. 5A is a diagram illustrating the structure of pixel driving circuits in an array substrate in some embodiments according to the present disclosure. FIG. 5B is a schematic diagram illustrating an arrangement of pixel driving circuits in the array substrate depicted in FIG. 5A. FIG. 5A and FIG. 5B depicts a portion of the array substrate having two adjacent pixel driving circuits, including PDC1 and PDC2.

Figure 5C:
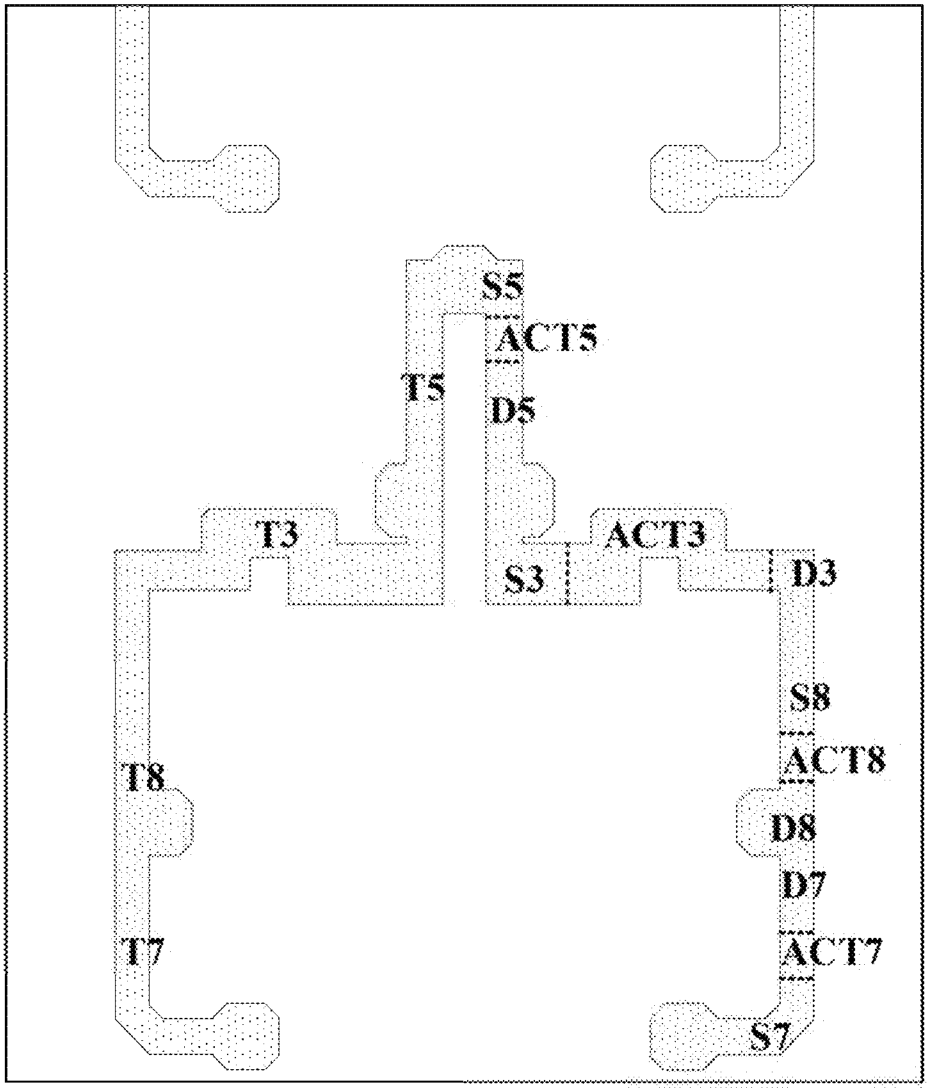
FIG. 5C is a diagram illustrating the structure of a first semiconductor material layer in the array substrate depicted in FIG. 5A.
Figure 5D:
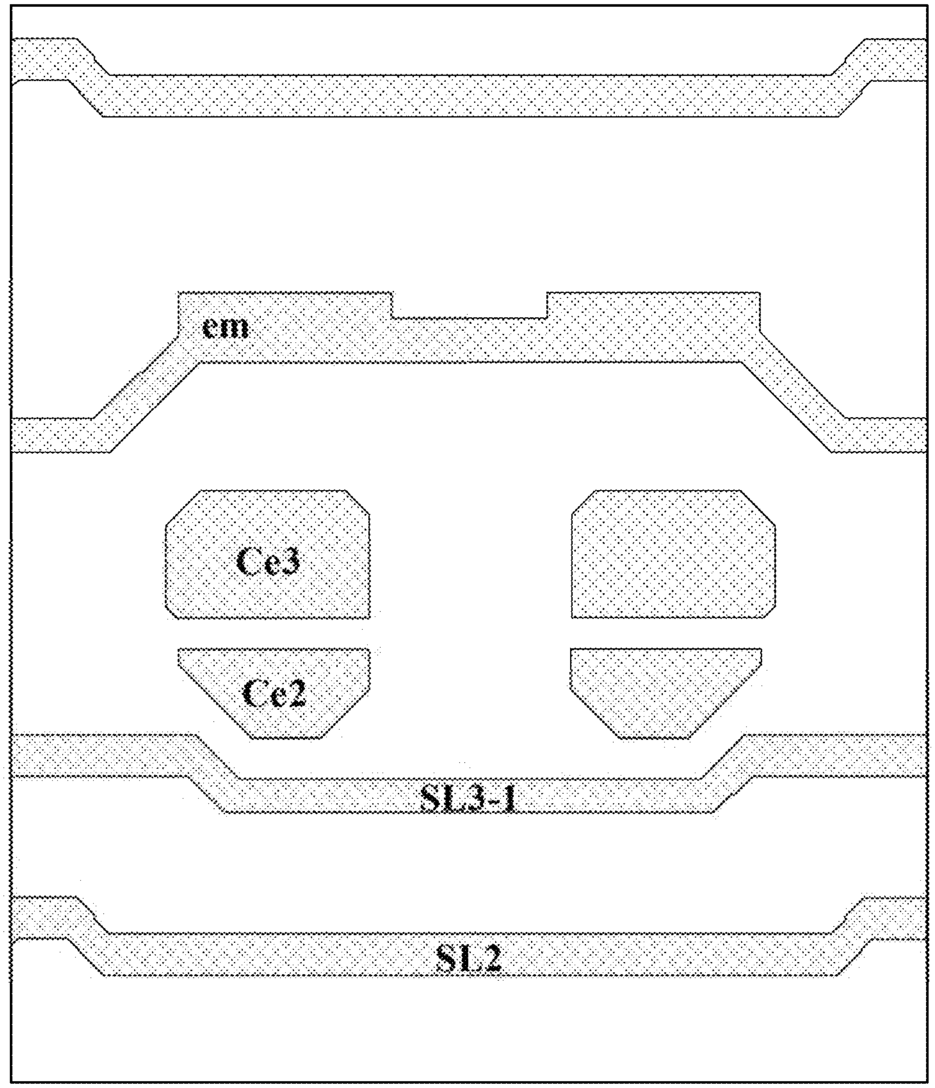
FIG. 5D is a diagram illustrating the structure of a first gate metal layer in the array substrate depicted in FIG. 5A.
Figure 5E:
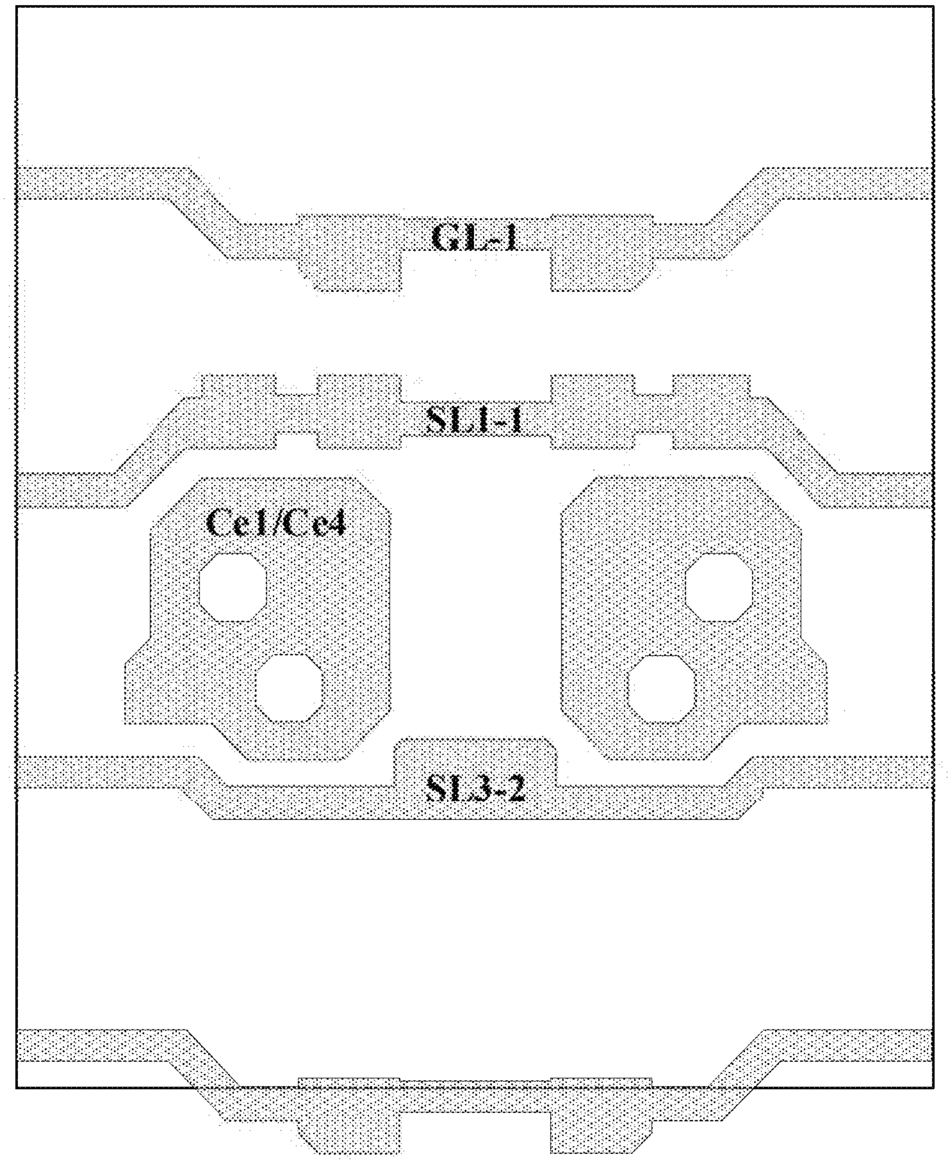
FIG. 5E is a diagram illustrating the structure of a second gate metal layer in the array substrate depicted in FIG. 5A.
Figure 5F:
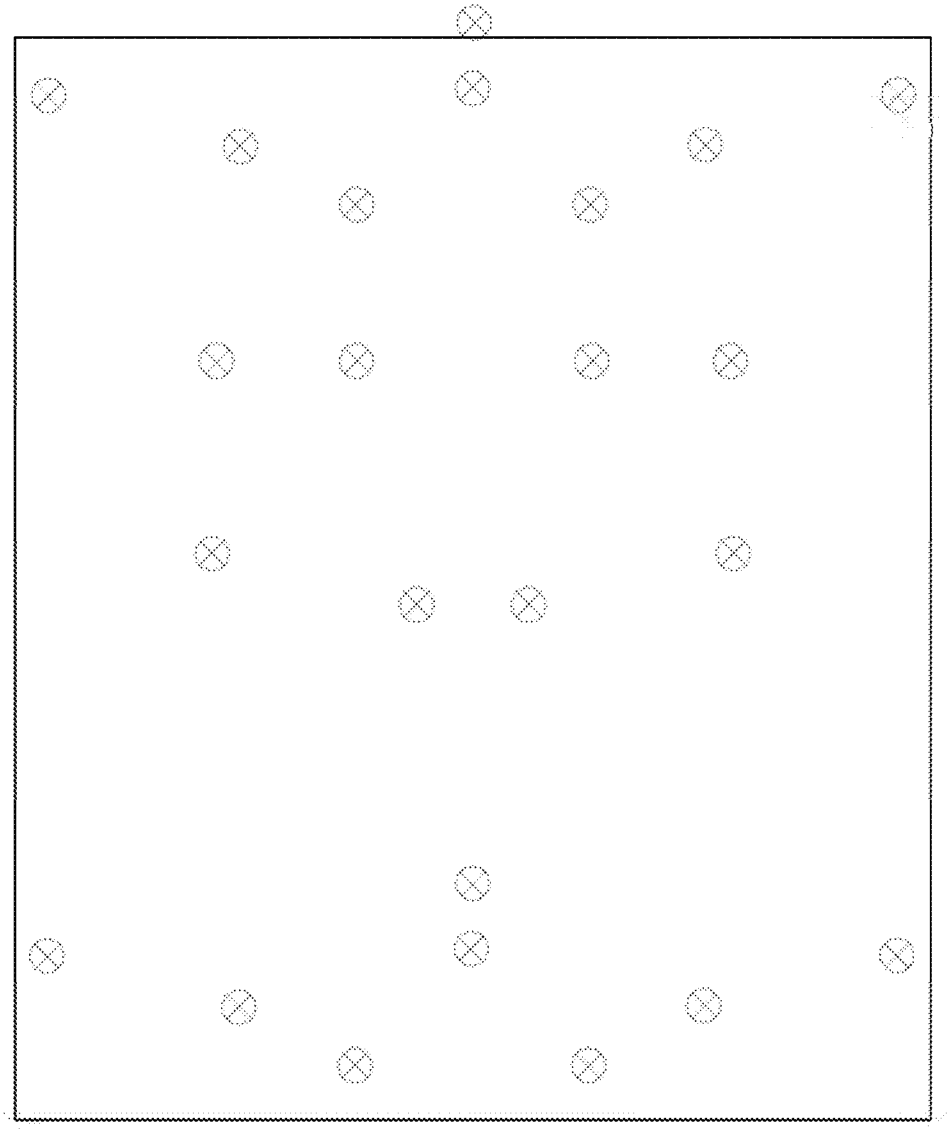
FIG. 5F is a diagram illustrating vias extending through a first inter-layer dielectric layer in the array substrate depicted in FIG. 5A.
Figure 5G:
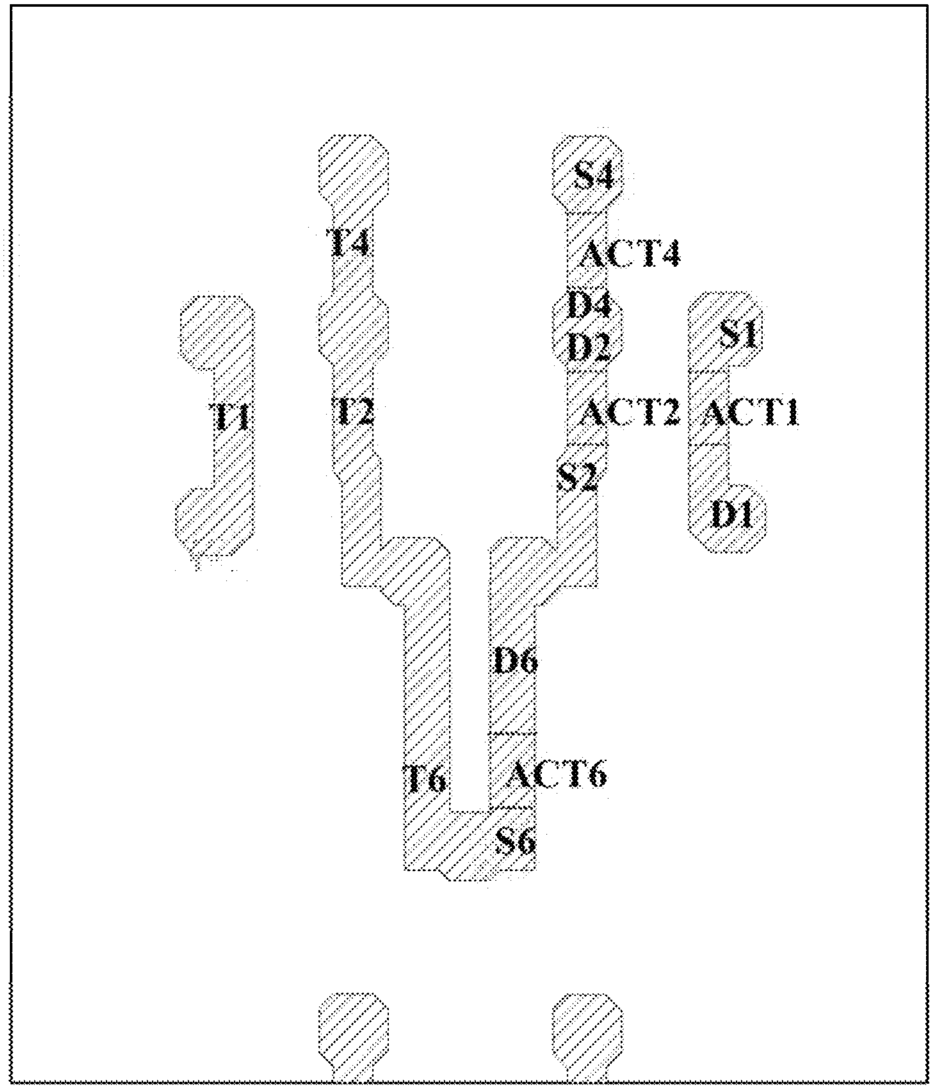
FIG. 5G is a diagram illustrating the structure of a second semiconductor material layer in the array substrate depicted in FIG. 5A.
Figure 5H:
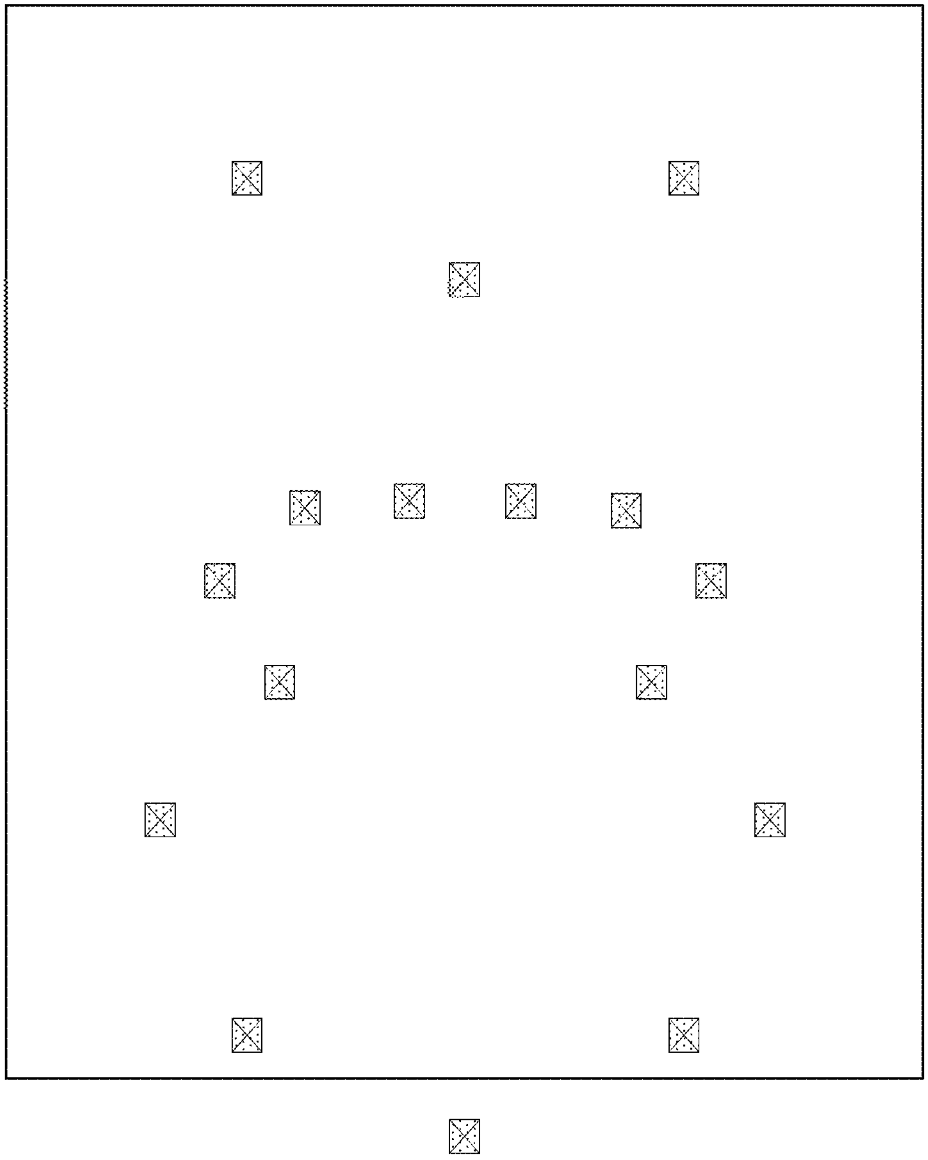
FIG. 5H is a diagram illustrating vias extending through a second inter-layer dielectric layer in the array substrate depicted in FIG. 5A.
Figure 5I:
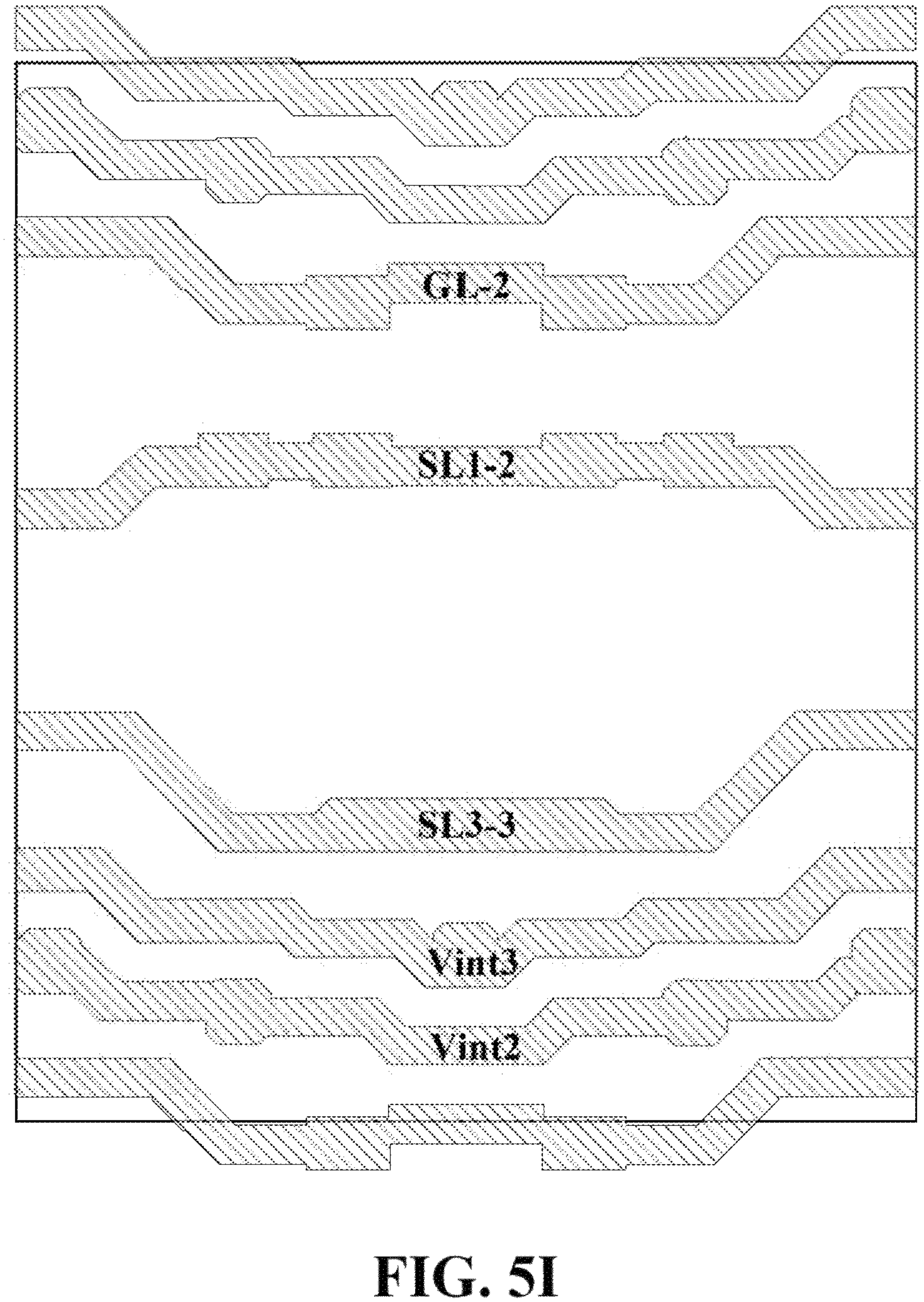
FIG. 5I is a diagram illustrating the structure of a third gate metal layer in the array substrate depicted in FIG. SA.

FIG. 5C is a diagram illustrating the structure of a first semiconductor material layer in the array substrate depicted in FIG. 5A. FIG. 5D is a diagram illustrating the structure of a first gate metal layer in the array substrate depicted in FIG. 5A. FIG. 5E is a diagram illustrating the structure of a second gate metal layer in the array substrate depicted in FIG. 5A. FIG. 5P is a diagram illustrating vias extending through a first inter-layer dielectric layer in the array substrate depicted in FIG. 5A. FIG. 5O is a diagram illustrating the structure of a second semiconductor material layer in the array substrate depicted in FIG. 5A. FIG. 5H is a diagram illustrating vias extending through a second inter-layer dielectric layer in the array substrate depicted in FIG. 5A. FIG. 5I is a diagram illustrating the structure of a third gate metal layer in the array substrate depicted in FIG. 5A. FIG. 5) is a diagram illustrating vias extending through a passivation layer in the array substrate depicted in FIG. 5A. FIG. 5K is a diagram illustrating the structure of a first signal line layer in the array substrate depicted in FIG. 5A. FIG. 5L is a diagram illustrating vias extending through a first planarization layer in the array substrate depicted in FIG. 5A. FIG. 5M is a diagram illustrating the structure of a second signal line layer in the array substrate depicted in FIG. 5A. FIG. 5N is a diagram illustrating vias extending through a second planarization layer in the array substrate depicted in FIG. 5A. FIG. 5O is a diagram illustrating the structure of a third signal line layer in the array substrate depicted in FIG. 5A. FIG. 5P is a diagram illustrating vias extending through a third planarization layer in the array substrate depicted in FIG. 5A. FIG. 5Q is a diagram illustrating the structure of an anode layer in the array substrate depicted in FIG. 5A. FIG. 5R is a diagram illustrating the structure from a first semiconductor material layer to a first signal line layer in the array substrate depicted in FIG. 5A. FIG. 6A is a cross-sectional view along an A-A' line in FIG. 5A. FIG. 6B is a cross-sectional view along a B-B' line in FIG. 5A, FIG. 6C is a cross-sectional view along a C-C' line in FIG. 5A.

Referring to FIG. 5A to FIG. 5R, and FIG. 6A to FIG. 6D, the array substrate in some embodiments includes a base substrate BS, a buffer layer BUF on the base substrate BS, a first semiconductor material layer SML1 on a side of the buffer layer BUF away from the base substrate BS, a gate insulating layer G1 on a side of the first semiconductor material layer SML1 away from the base substrate BS, a first gate metal layer Gate1 on a side of the gate insulating layer G1 away from the first semiconductor material layer SML1, an insulating layer IN on a side of the first gate metal layer Gate1 away from the gate insulating layer G1, a second gate metal layer Gate2 on a side of the insulating layer IN away from the first gate metal layer Gate1, a first inter-layer dielectric layer ILD1 on a side of the second gate metal layer Gate2 away from the insulating layer IN, a second semiconductor material layer SML2 on a side of the first inter-layer dielectric layer ILD1 away from the second gate metal layer Gate2, a second inter-layer dielectric layer ILD2 on a side of the second semiconductor material layer SML2 away from the first inter-layer dielectric layer ILD1, a third gate metal layer Gate3 on a side of the second inter-layer dielectric layer ILD2 away from the second semiconductor material layer SML2, a passivation layer PVX on a side of the third gate metal layer Gate3 away from the second inter-layer dielectric layer ILD2, a first signal line layer SD1 on a side of the passivation layer PVX away from the third gate metal layer Gate3, a first planarization layer PLN1 on a side of the first signal line layer SD1 away from the passivation layer PVX, a second signal line layer SD2 on a side of the first planarization layer PLN1 away from the first signal line layer SD1, a second planarization layer PLN2 on a side of the second signal line layer SD2 away from the first planarization layer PLN1, a third signal line layer SD3 on a side of the second planarization layer PLN2 away from the second signal line layer SD2, a third planarization layer PLN3 on a side of the third signal line layer SD3 away from the second planarization layer PLN2, and an anode layer ADL on a side of the third planarization layer PLN3 away from the third signal line layer SD3.

Referring to FIG. 2B, FIG. 5A, FIG. 5C, FIG. 6A to FIG. 6C, the first semiconductor material layer SML1 in some embodiments includes at least active layers of multiple transistors of the pixel driving circuit, including the driving transistor T3, the light emitting control transistor T5, the second reset transistor T7, and the control transistor T5. Optionally, the first semiconductor material layer SML1 further includes at least respective portions of first electrodes of multiple transistors of the pixel driving circuit, including the driving transistor T3, the light emitting control transistor T5, the second reset transistor T7, and the control transistor T8. Optionally, the first semiconductor material layer SML1 further includes at least respective portions of second electrodes of multiple transistors of the pixel driving circuit, including the driving transistor T3, the light emitting control transistor T5, the second reset transistor T7, and the control transistor T8. Optionally, the first semiconductor material layer SML1 includes active layers, first electrodes, and second electrodes of multiple transistors of the pixel driving circuit, including the driving transistor T3, the light emitting control transistor T5, the second reset transistor T7, and the control transistor T5. Various appropriate semiconductor materials may be used for making the first semiconductor material layer SML1. Examples of the semiconductor materials for making the first semiconductor material layer SML1 include silicon-based semiconductor materials such as polycrystalline silicon, single-crystal silicon, and amorphous silicon.

In FIG. 5C, a pixel driving circuit corresponding to PDC2 in FIG. 5B is annotated with labels indicating components of each of multiple transistors (T3, T5, T7, and T8) in the pixel driving circuit. For example, the driving transistor T3 includes an active layer ACT3, a first electrode S3, and a second electrode D3. The light emitting control transistor T5 includes an active layer ACT5, a first electrode S5, and a second electrode D5. The second reset transistor T7 includes an active layer ACT7, a first electrode S7, and a second electrode D7. The control transistor T8 includes an active layer ACT8, a first electrode S8, and a second electrode D8.

Optionally, the active layers (ACT3, ACT5, ACT7, and ACT8), the first electrodes (S3, S5, S7, and S8), and the second electrodes (D3, D5, D7, and D8) of the respective transistors (T3, T5, T7, and T8) are in a same layer.

In some embodiments, the active layers (ACT3, ACT5, ACT7, and ACT8), at least portions of the first electrodes (S3, S5, S7, and S8), and at least portions of the second electrodes (D3, D5, D7, and D8) of multiple transistors (T3, T5, T7, and T8) in the pixel driving circuit are parts of a unitary structure.

In some embodiments, active layers and at least portions of first electrodes of two adjacent light emitting control transistors in two adjacent pixel driving circuits (e.g., two adjacent pixel driving circuits in a same row) are parts of a unitary structure. Optionally, active layers, at least portions of first electrodes, and at least portions of second electrodes of two adjacent light emitting control transistors in two adjacent pixel driving circuits (e.g., two adjacent pixel driving circuits in a same row) are parts of a unitary structure. Optionally, the first electrodes of the two adjacent light emitting control transistors in the two adjacent pixel driving circuits in the same row are directly connected to each other.

Referring to FIG. 2B, FIG. 5A, FIG. 5D, and FIG. 6A to FIG. 6C, the first gate metal layer Gate1 in some embodiments includes a plurality of light emitting control signal lines em, a plurality of second control signal lines SL2, at least portions of a plurality of third control signal lines (e.g., a respective third control signal line first branch SL3-1), a second capacitor electrode Ce2 of the first capacitor C1, and a third capacitor electrode Ce3 of the second capacitor C2 in the pixel driving circuit.

Various appropriate electrode materials and various appropriate fabricating methods may be used to make the first gate metal layer Gate1. For example, a conductive material may be deposited on the substrate by a plasma-enhanced chemical vapor deposition (PECVD) process and patterned. Examples of appropriate conductive materials for making the first gate metal layer Gate1 include, but are not limited to, aluminum, copper, molybdenum, chromium, aluminum copper alloy, copper molybdenum alloy, molybdenum aluminum alloy, aluminum chromium alloy, copper chromium alloy, molybdenum chromium alloy, copper molybdenum aluminum alloy, and the like. Optionally, the plurality of light emitting control signal lines em, the plurality of second control signal lines SL2, the at least portions of the plurality of third control signal lines (e.g., the respective third control signal line first branch SL3-1), the second capacitor electrode Ce2 of the first capacitor C1, and the third capacitor electrode Ce3 of the second capacitor C2 in the pixel driving circuit are in a same layer.

As used herein, the term "same layer" refers to the relationship between the layers simultaneously formed in the same step. In one example, the plurality of light emitting control signal lines em and the second capacitor electrode Ce2 are in a same layer when they are formed as a result of one or more steps of a same patterning process performed in a same layer of material. In another example, the plurality of light emitting control signal lines em and the second capacitor electrode Ce2 can be formed in a same layer by simultaneously performing the step of forming the plurality of light emitting control signal lines em, and the step of forming the second capacitor electrode Ce2. The term "same layer" does not always mean that the thickness of the layer or the height of the layer in a cross-sectional view is the same.

Referring to FIG. 2B, FIG. 5A, FIG. 5E, and FIG. 6A to FIG. 6C, the second gate metal layer Gate2 in some embodiments includes at least portions of a plurality of gate lines (e.g., a respective gate line first branch GL-1), at least portions of a plurality of first control signal lines (e.g., a respective first control signal line first branch SL1-1), at least portions of a plurality of third control signal lines (e.g., a respective third control signal line second branch SL3-2), a first capacitor electrode Ce1 of the first capacitor C1, and a fourth capacitor electrode Ce4 of the second capacitor C2 in the pixel driving circuit. Various appropriate electrode materials and various appropriate fabricating methods may be used to make the second gate metal layer Gate2. For example, a conductive material may be deposited on the substrate by a plasma-enhanced chemical vapor deposition (PECVD) process and patterned. Examples of appropriate conductive materials for making the second gate metal layer Gate2 include, but are not limited to, aluminum, copper, molybdenum, chromium, aluminum copper alloy, copper molybdenum alloy, molybdenum aluminum alloy, aluminum chromium alloy, copper chromium alloy, molybdenum chromium alloy, copper molybdenum aluminum alloy, and the like. Optionally, the at least portions of the plurality of gate lines (e.g., the respective gate line first branch GL-1), the at least portions of the plurality of first control signal lines (e.g., the respective first control signal line first branch SL1-1), the at least portions of the plurality of third control signal lines (e.g., the respective third control signal line second branch SL3-2), the first capacitor electrode Ce1 of the first capacitor C1, and the fourth capacitor electrode Ce4 of the second capacitor C2 in the pixel driving circuit are in a same layer.

Optionally, the first capacitor electrode Ce1 of the first capacitor C1 and the fourth capacitor electrode Ce4 of the second capacitor C2 in the pixel driving circuit are parts of a unitary structure.

Vias extending through the first inter-layer dielectric layer ILD1 are depicted in FIG. SF.

Referring to FIG. 2B, FIG. SA, FIG. 5G, and FIG. 6A to FIG. 6C, the second semiconductor material layer SML2 in some embodiments includes at least an active layer ACT1 of the first reset transistor T1, an active layer ACT2 of the compensating transistor T2, an active layer ACT4 of the data write transistor T4, and an active layer ACT6 of the third reset transistor To in the pixel driving circuit. Optionally, the second semiconductor material layer SML2 further includes at least a portion of a first electrode S1 of the first reset transistor T1, at least a portion of a first electrode S2 of the compensating transistor T2, at least a portion of a first electrode S4 of the data write transistor T4, and at least a portion of a first electrode S6 of the third reset transistor T6 in the pixel driving circuit. Optionally, the second semiconductor material layer SML2 further includes at least a portion of a second electrode D1 of the first reset transistor T1, at least a portion of a second electrode D2 of the compensating transistor T2, at least a portion of a second electrode D4 of the data write transistor T4, and at least a portion of a second electrode D6 of the third reset transistor T6 in the pixel driving circuit. Optionally, the second semiconductor material layer SML2 includes the active layer ACT1, the first electrode S1, and the second electrode D1 of the first reset transistor T1; the active layer ACT2, the first electrode S2, and the second electrode D2 of the compensating transistor T2; the active layer ACT4, the first electrode S4, and the second electrode D4 of the data write transistor T4; and the active layer ACT6, the first electrode S6, and the second electrode D6 of the third reset transistor T6 in the pixel driving circuit. In the present array substrate, at least the active layer ACT1 of the first reset transistor T1, the active layer ACT2 of the compensating transistor T2, the active layer ACT4 of the data write transistor T4, and the active layer ACT6 of the third reset transistor T6 are in a layer different from at least the active layers of other transistors of the pixel driving circuit. Various appropriate semiconductor materials may be used for making the second semiconductor material layer SML2. Examples of the semiconductor materials for making the second semiconductor material layer SML2 include metal oxide-based semiconductor material such as indium gallium zinc oxide and metal oxynitride-based semiconductor materials such as zinc oxynitride.

In FIG. 5O, a pixel driving circuit corresponding to PDC2 in FIG. SB is annotated with labels indicating components of the second transistor in the pixel driving circuit. For example, the first reset transistor T1 includes an active layer ACT1, a first electrode S1, and the second electrode D1. The compensating transistor T2 includes an active layer ACT2, a first electrode S2, and a second electrode D2. The data write transistor T4 includes an active layer ACT4, a first electrode S4, and a second electrode D4. The third reset transistor T6 includes an active layer ACT6, a first electrode S6, and a second electrode D6.

In some embodiments, the active layers (ACT2, ACT4, and ACT6), at least portions of the first electrodes (S2, S4, and S6), and at least portions of the second electrodes (D2, D4, and D6) of multiple transistors (T2, T4, and T6) in the pixel driving circuit are parts of a unitary structure. Optionally, at least a part of the first reset transistor T1 (ACT1, S1, D1) in the second semiconductor material layer is spaced apart from the unitary structure (T2, T4, and T6) in a same pixel driving circuit.

In some embodiments, active layers and at least portions of first electrodes of two adjacent third reset transistors in two adjacent pixel driving circuits (e.g., two adjacent pixel driving circuits in a same row) are parts of a unitary structure. Optionally, active layers, at least portions of first electrodes, and at least portions of second electrodes of two adjacent third reset transistors in two adjacent pixel driving circuits (e.g., two adjacent pixel driving circuits in a same row) are parts of a unitary structure. Optionally, in the unitary structure, the first electrodes of the two adjacent third reset transistors in the two adjacent pixel driving circuits in the same row are directly connected to each other.

In some embodiments, active layers, at least portions of first electrodes, and at least portions of second electrodes of two adjacent third reset transistors in two adjacent pixel driving circuits (e.g., two adjacent pixel driving circuits in a same row); active layers, at least portions of first electrodes, and at least portions of second electrodes of two adjacent compensating transistors in two adjacent pixel driving circuits (e.g., two adjacent pixel driving circuits in a same row); and active layers, at least portions of first electrodes, and at least portions of second electrodes of two adjacent data write transistors in two adjacent pixel driving circuits (e.g., two adjacent pixel driving circuits in a same row) are parts of a unitary structure. Optionally, in the unitary structure, the first electrodes of the two adjacent third reset transistors in the two adjacent pixel driving circuits in the same row are directly connected to each other.

Vias extending through the second inter-layer dielectric layer ILD2 are depicted in FIG. 5H.

Referring to FIG. 2B, FIG. 5A, FIG. 5I, FIG. 6A to FIG. 6C, the third gate metal layer Gate3 in some embodiments includes at least portions of a plurality of gate lines (e.g., a respective gate line second branch GL-2), at least portions of a plurality of first control signal lines (e.g., a respective first control signal second branch SL1-2), at least portions of a plurality of third control signal lines (e.g., a respective third control signal line third branch SL3-3), a plurality of second reset signal lines Vint2, and a plurality of third reset signal lines Vint3. Various appropriate electrode materials and various appropriate fabricating methods may be used to make the third gate metal layer Gate3. For example, a conductive material may be deposited on the substrate by a plasma-enhanced chemical vapor deposition (PECVD) process and patterned. Examples of appropriate conductive materials for making the third gate metal layer Gate3 include, but are not limited to, aluminum, copper, molybdenum, chromium, aluminum copper alloy, copper molybdenum alloy, molybdenum aluminum alloy, aluminum chromium alloy, copper chromium alloy, molybdenum chromium alloy, copper molybdenum aluminum alloy, and the like.

Figure 5J:
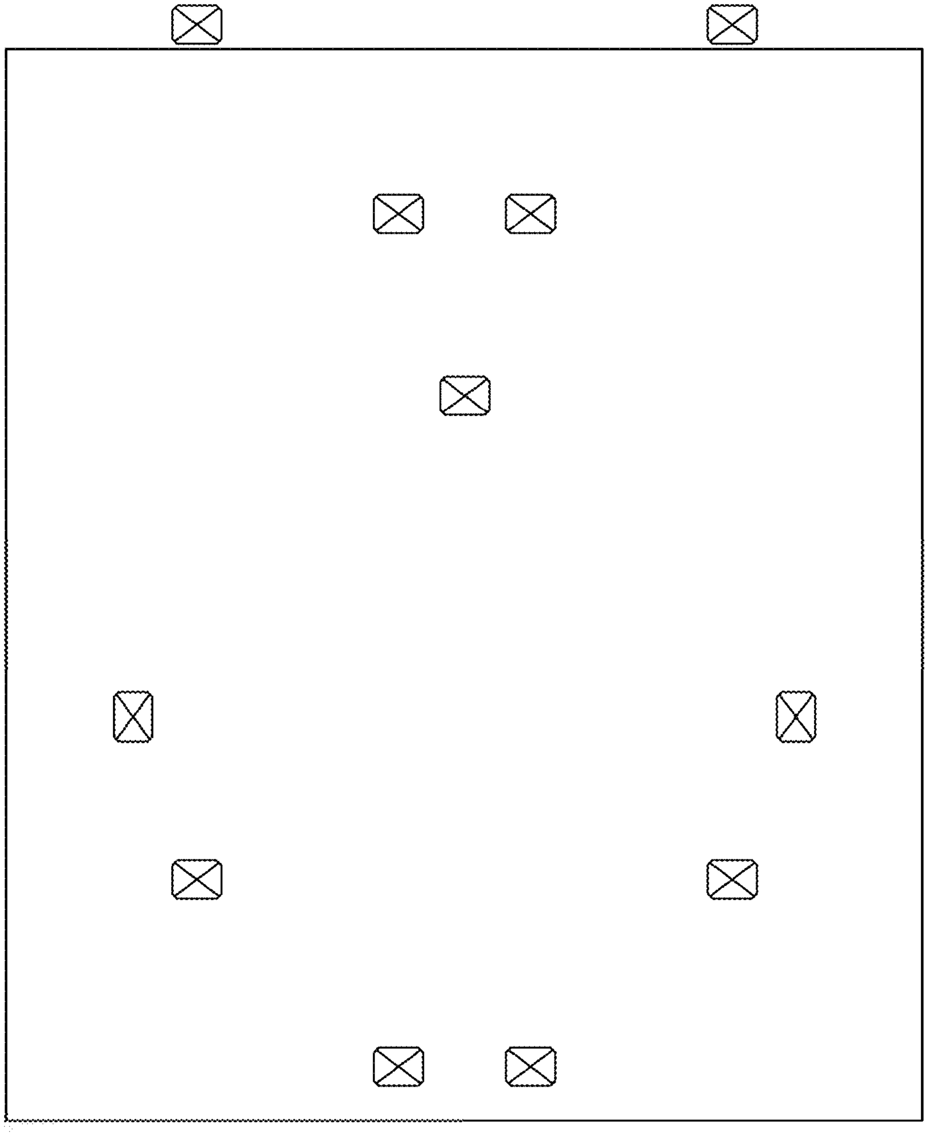
FIG. 5J is a diagram illustrating vias extending through a passivation layer in the array substrate depicted in FIG. 5A.
Figure 5K:
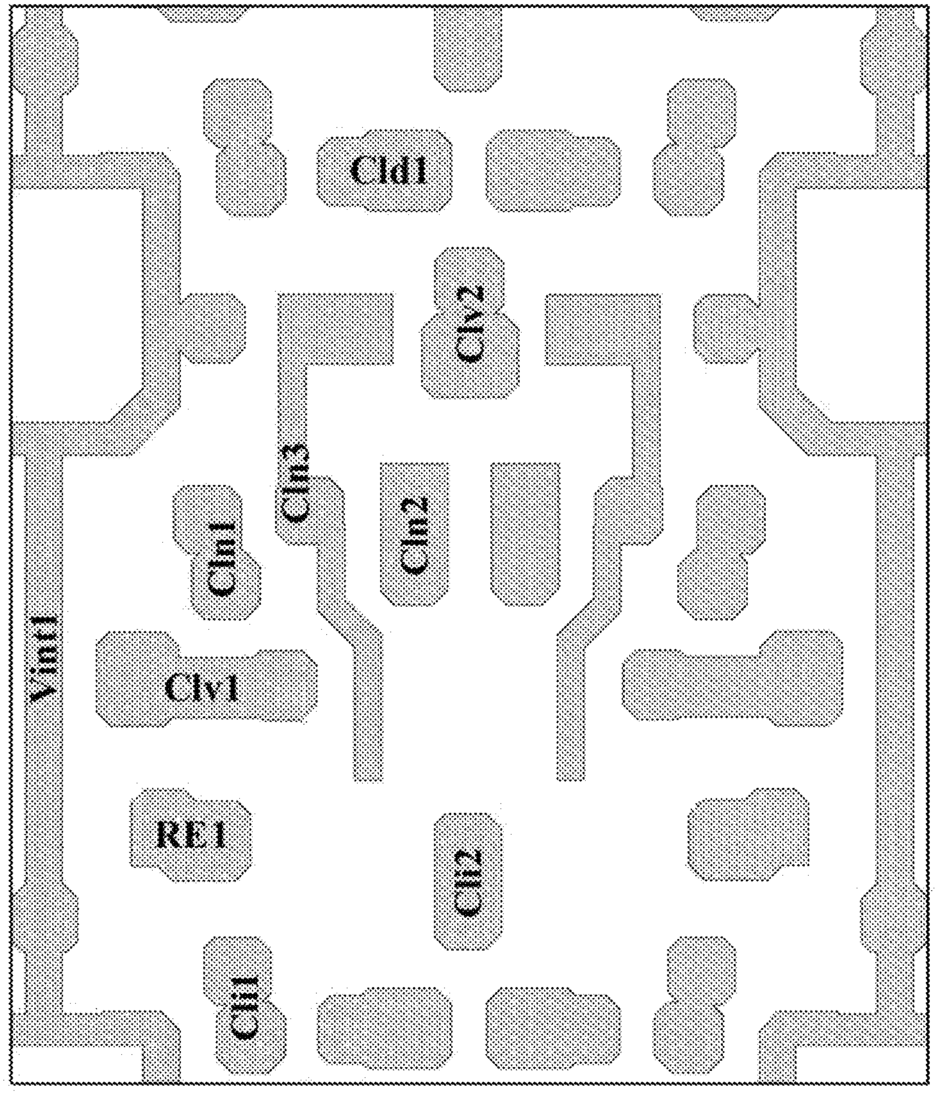
FIG. 5K is a diagram illustrating the structure of a first signal line layer in the array substrate depicted in FIG. 5A.
Figure 5L:
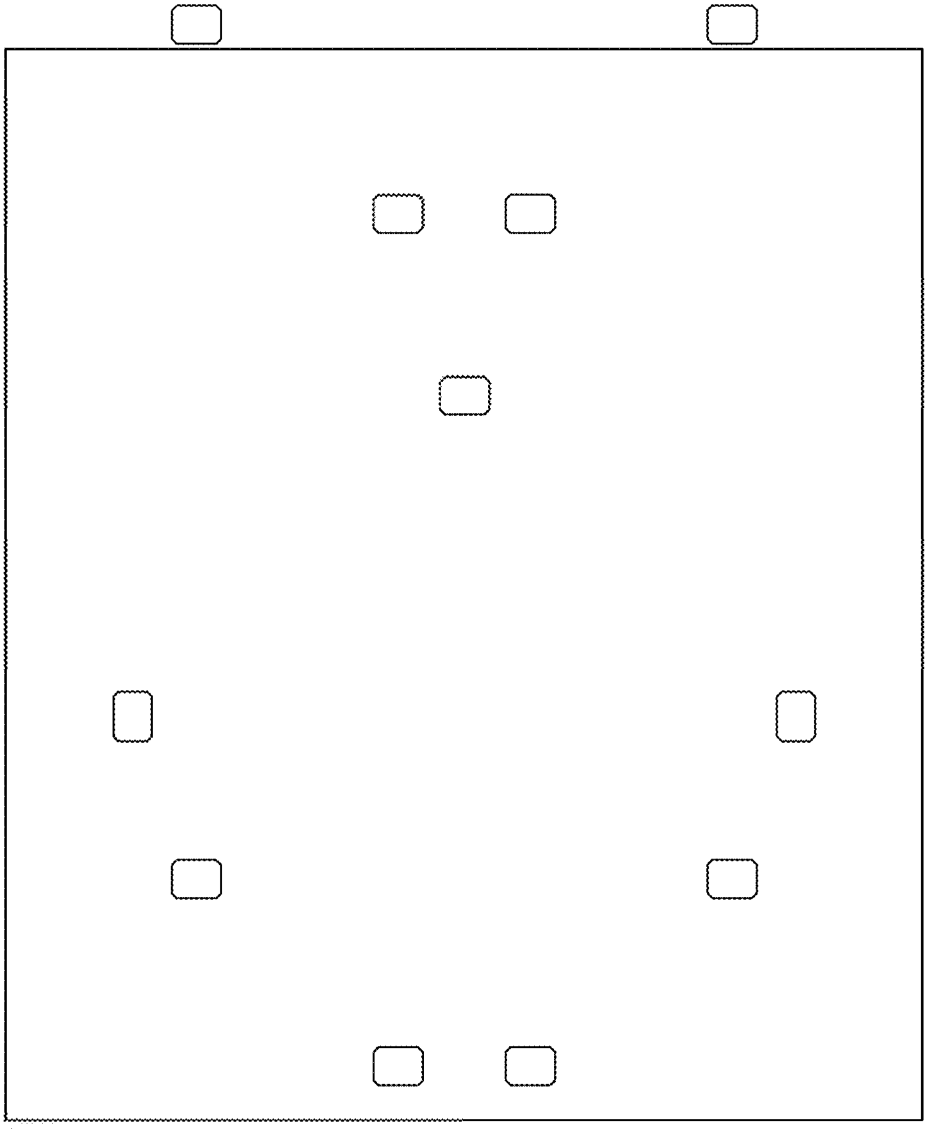
FIG. 5L is a diagram illustrating vias extending through a first planarization layer in the array substrate depicted in FIG. 5A.
Figure 5M:
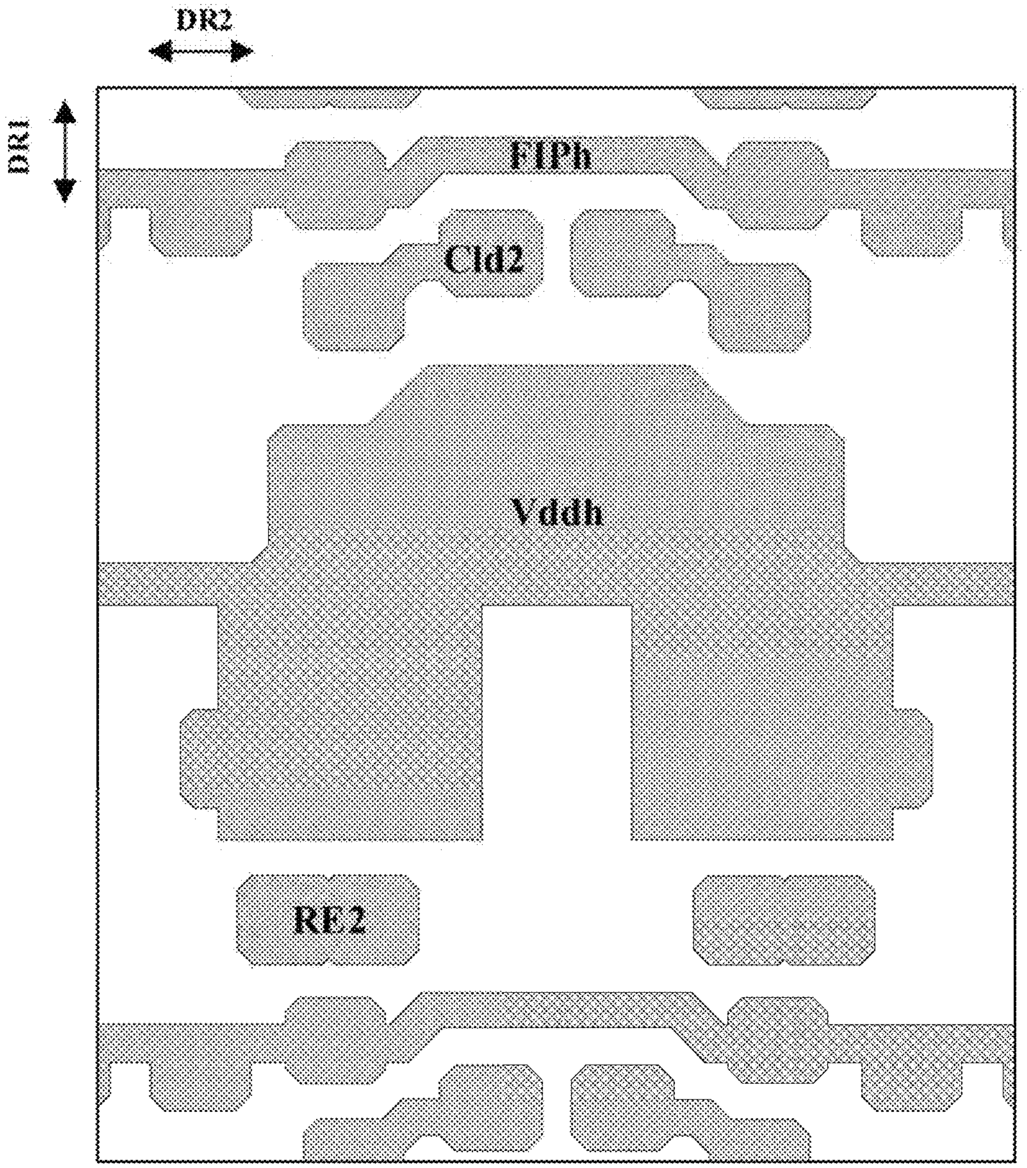
FIG. 5M is a diagram illustrating the structure of a second signal line layer in the array substrate depicted in FIG. SA.
Figure 5N:
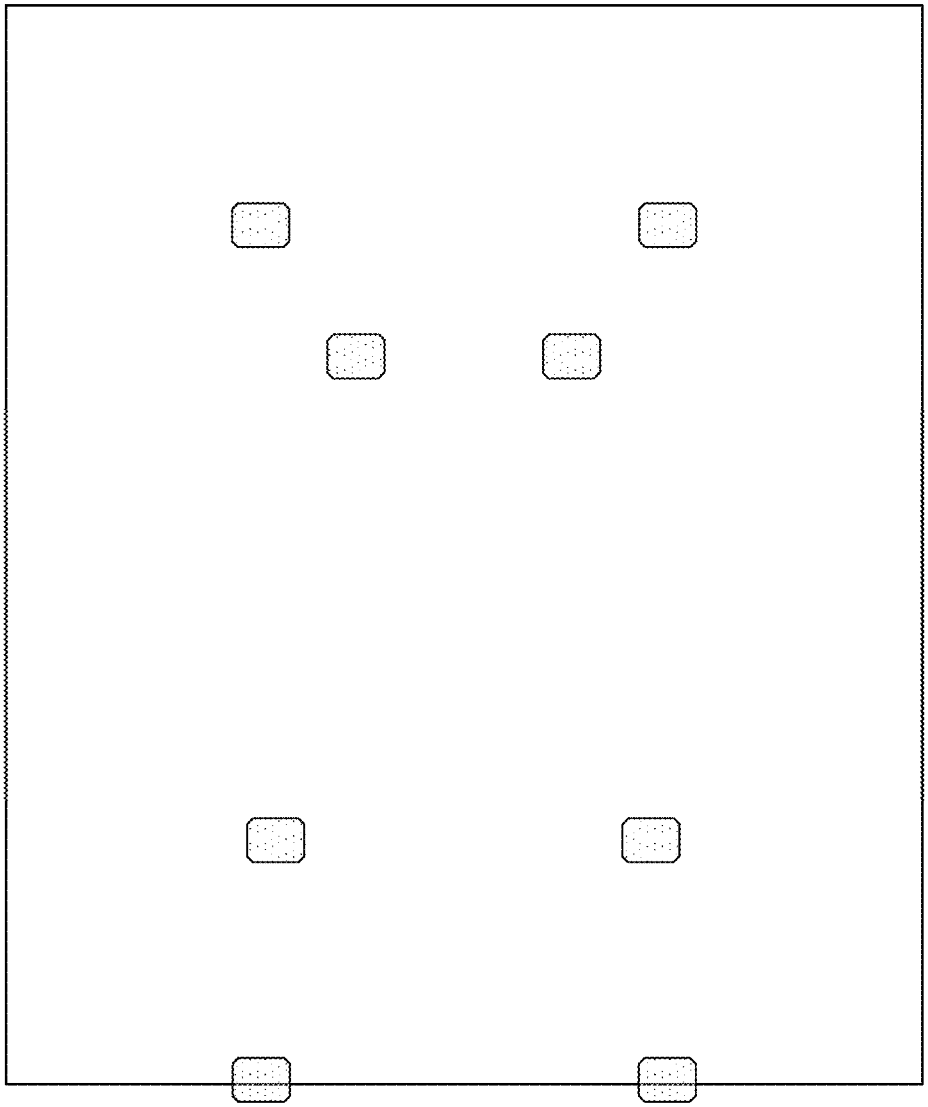
FIG. 5N is a diagram illustrating vias extending through a second planarization layer in the array substrate depicted in FIG. 5A.
Figure 5O:
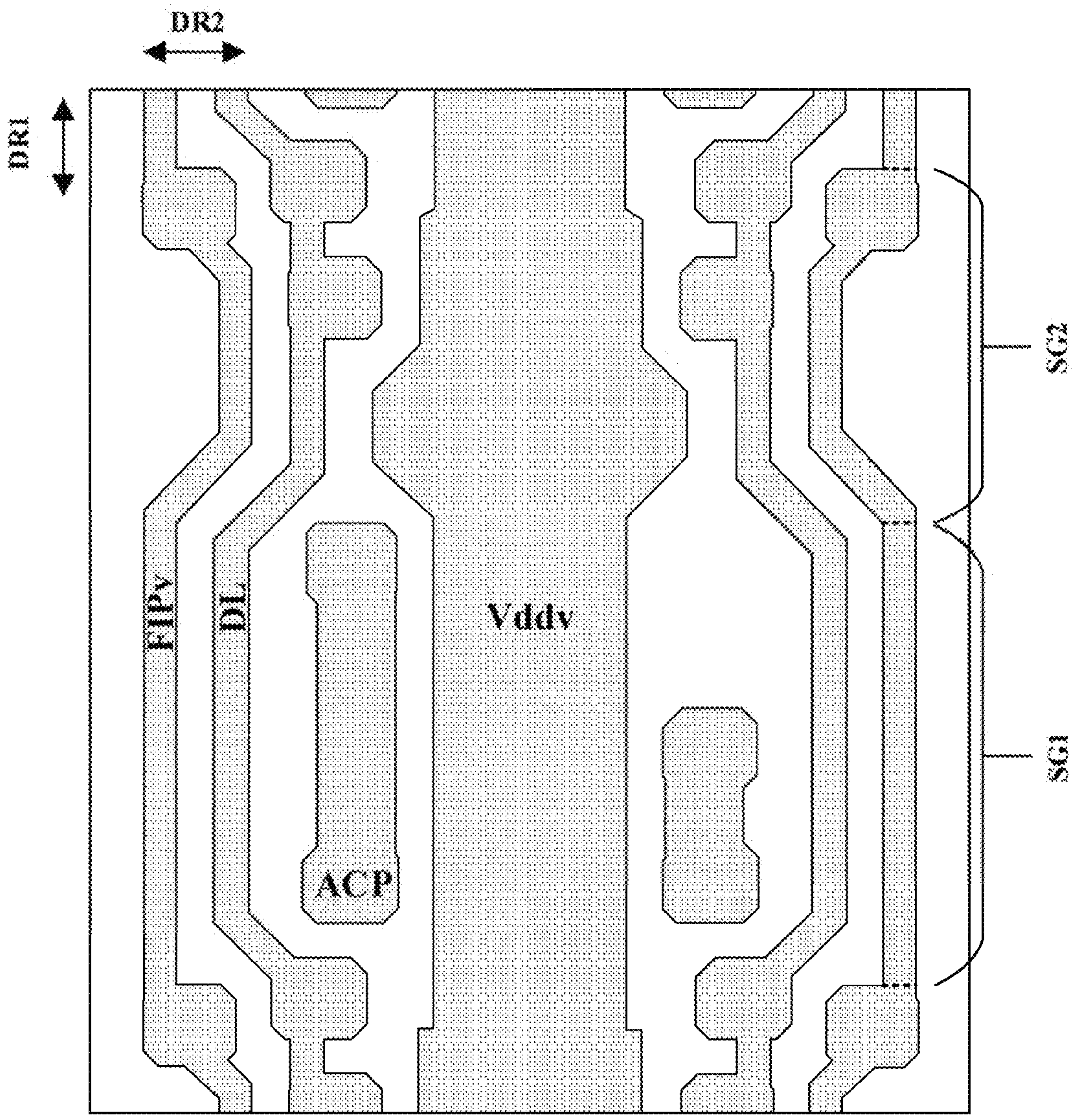
FIG. 5O is a diagram illustrating the structure of a third signal line layer in the array substrate depicted in FIG. 5A.
Figure 5P:
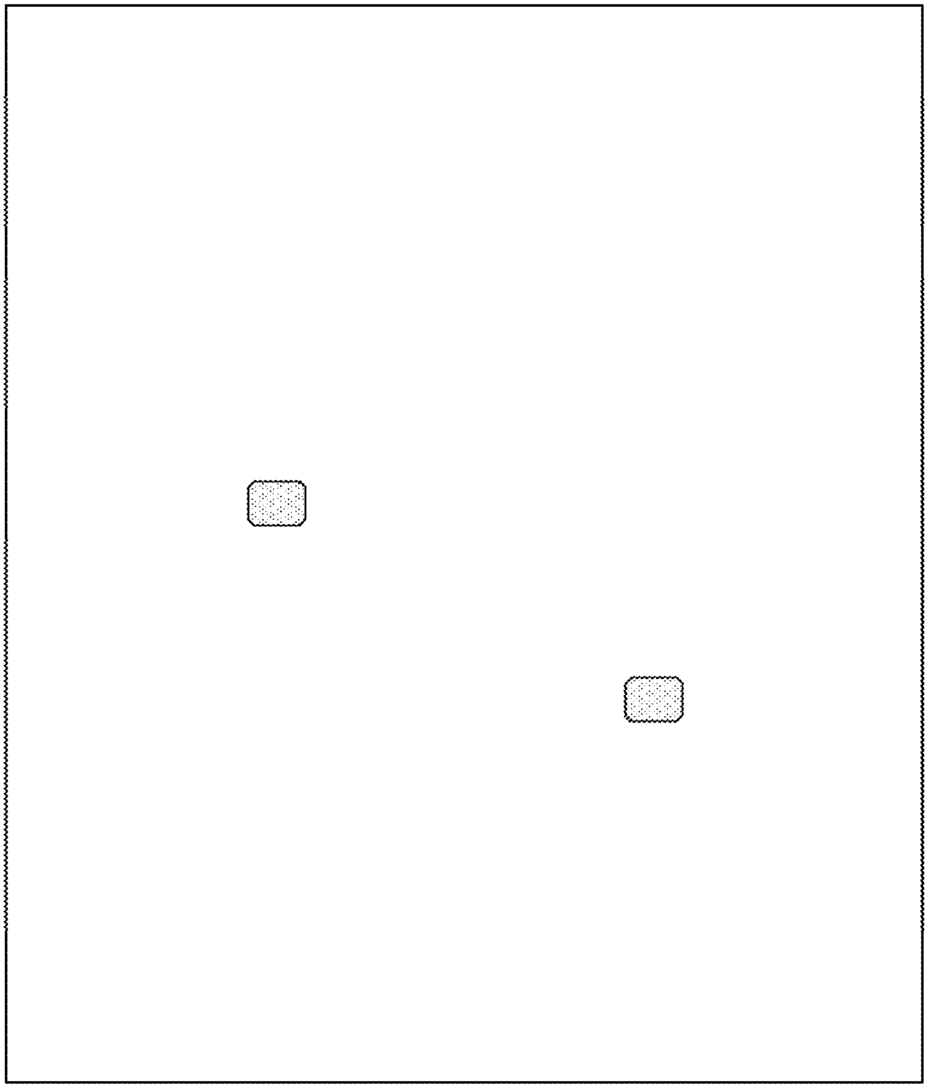
FIG. 5P is a diagram illustrating vias extending through a third planarization layer in the array substrate depicted in FIG. SA.
Figure 5Q:
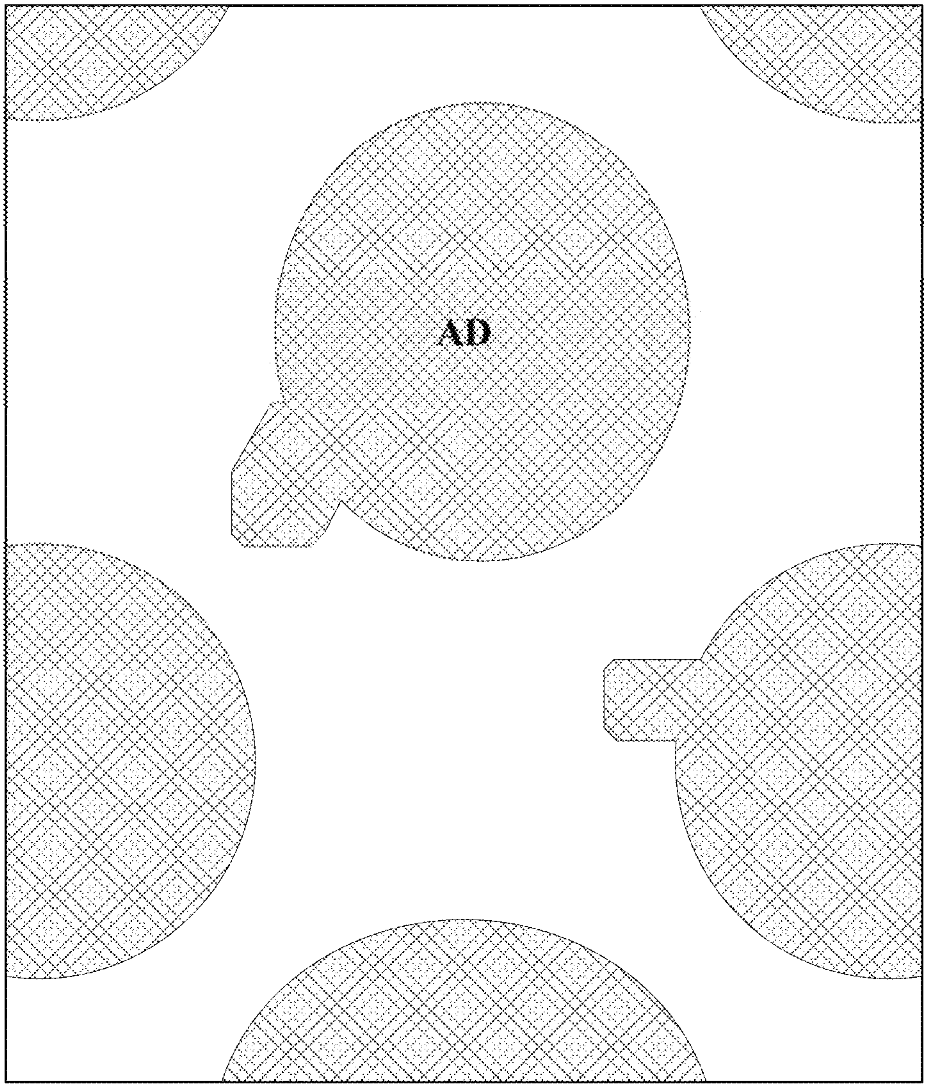
FIG. 5Q is a diagram illustrating the structure of an anode layer in the array substrate depicted in FIG. SA.
Figure 5R:
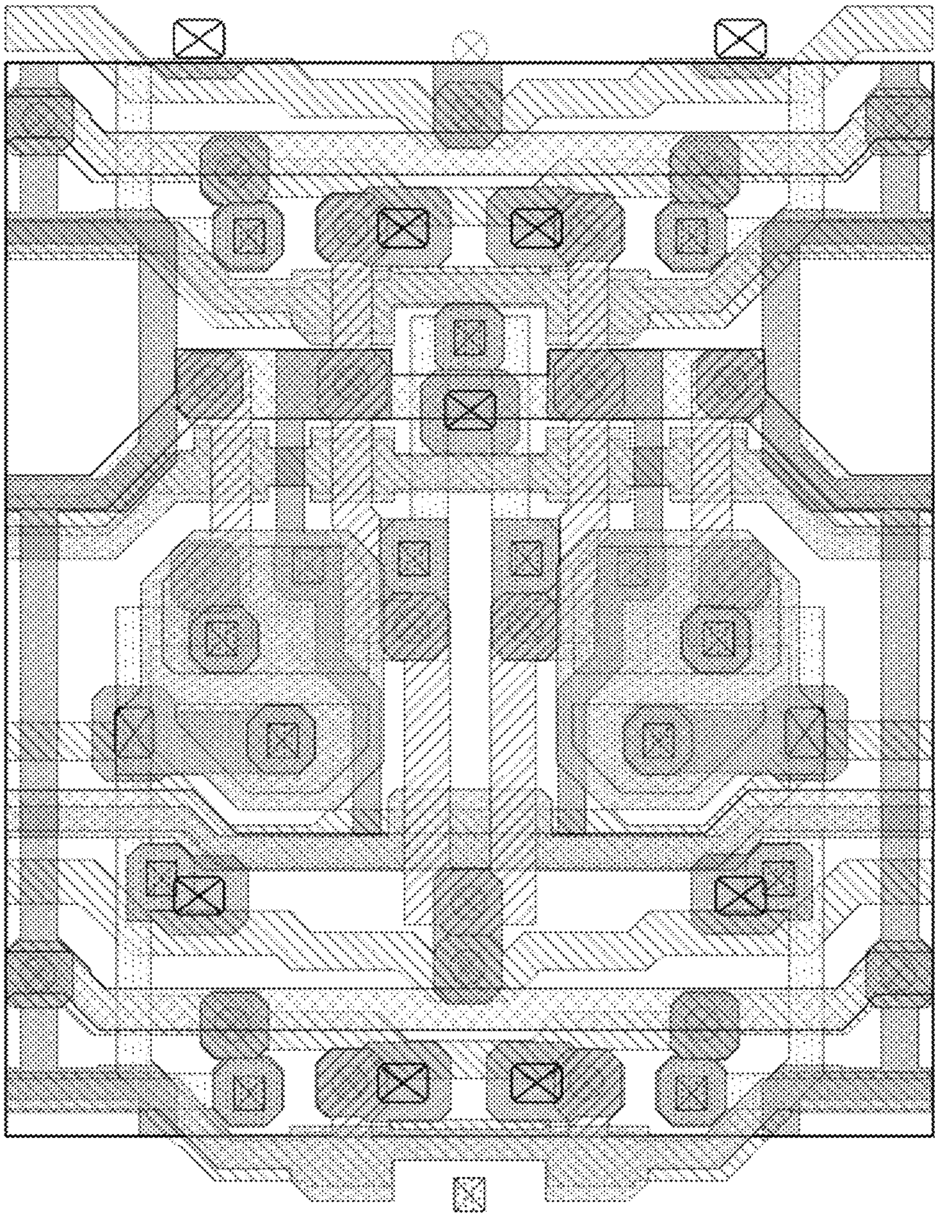
FIG. 5R is a diagram illustrating the structure from a first semiconductor material layer to a first signal line layer in the array substrate depicted in FIG. 5A.
Figure 6A:
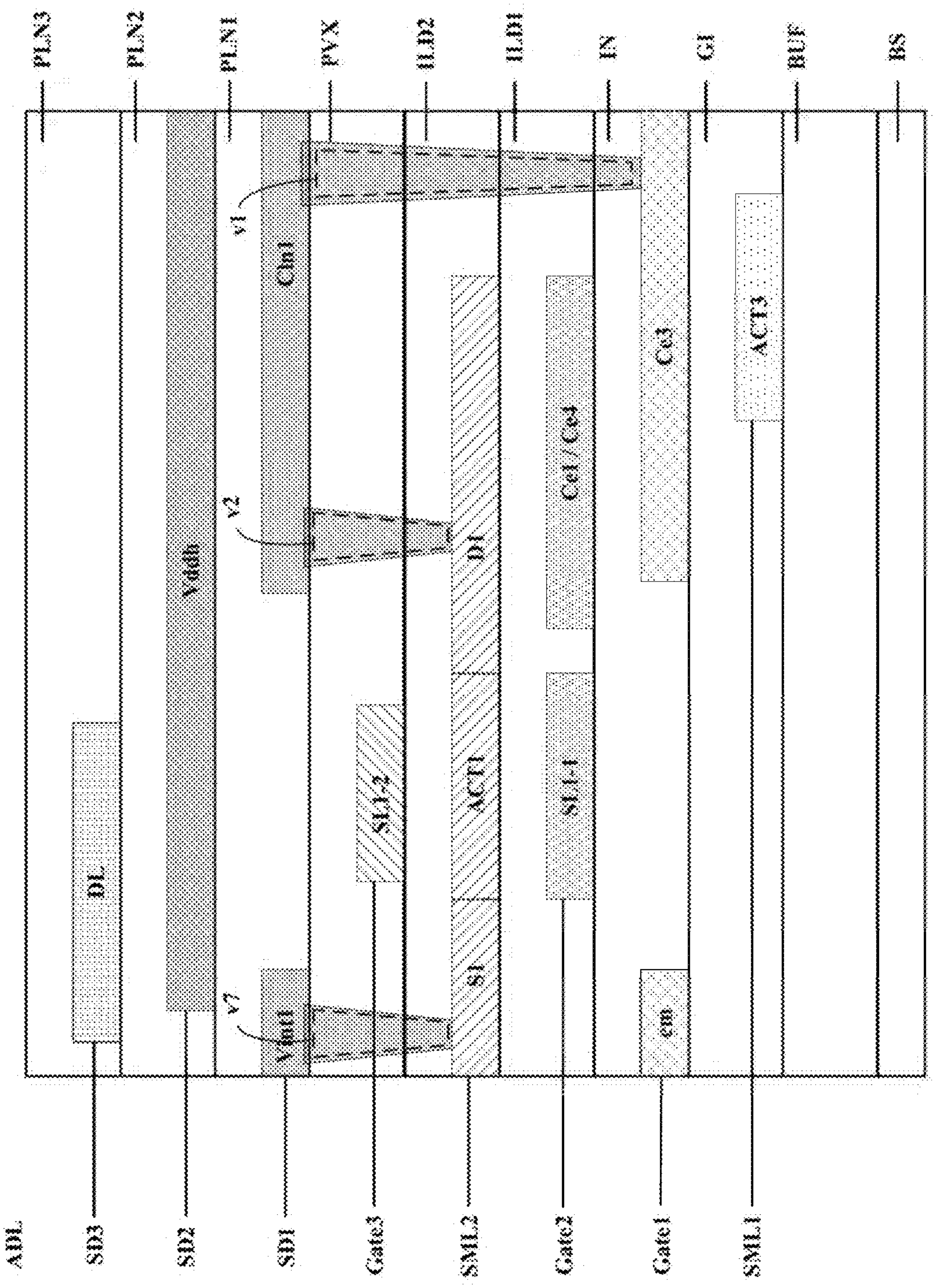
FIG. 6A is a cross-sectional view along an A-A' line in FIG. SA.
Figure 6B:
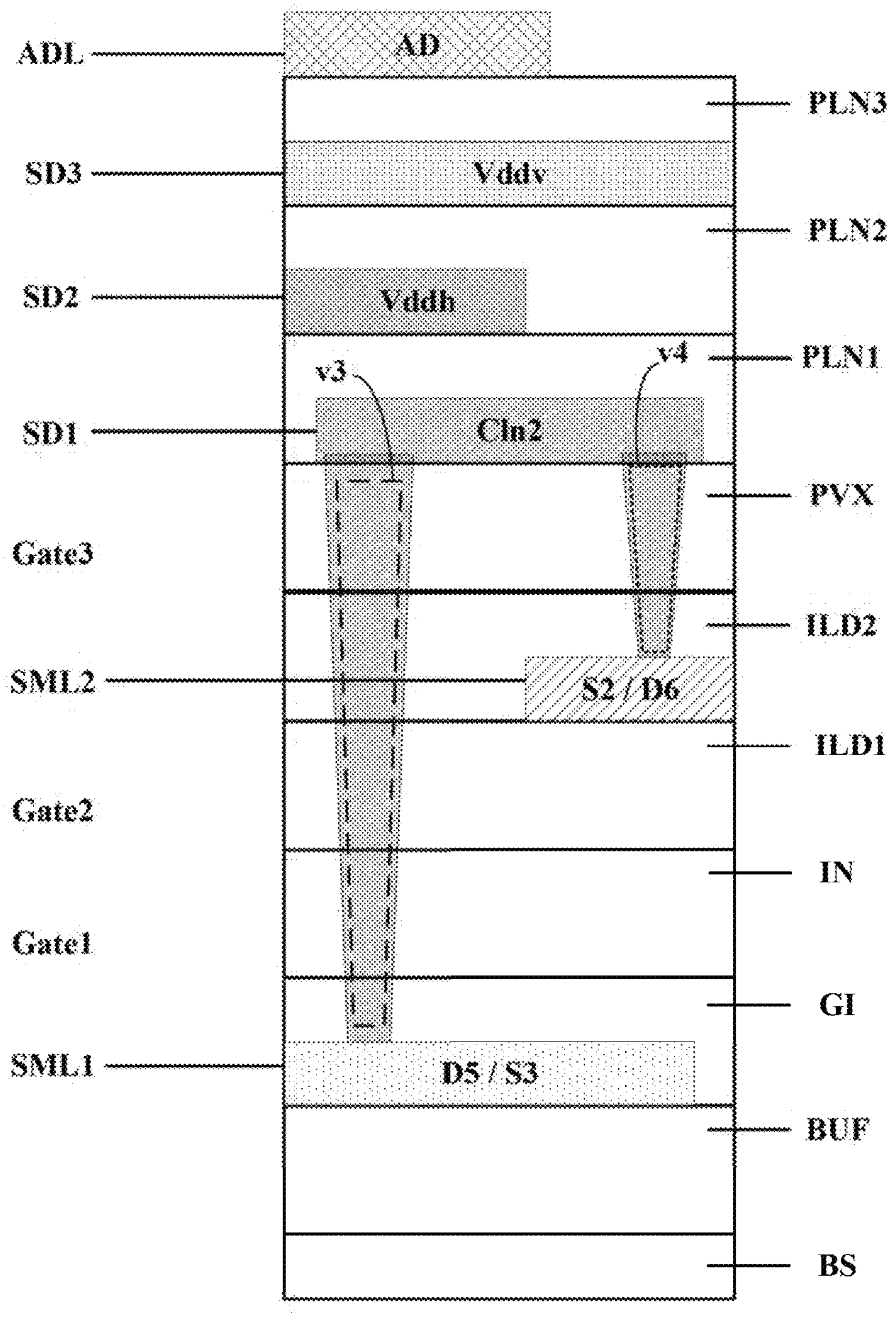
FIG. 6B is a cross-sectional view along a B-B' line in FIG. 5A.
Figure 6C:
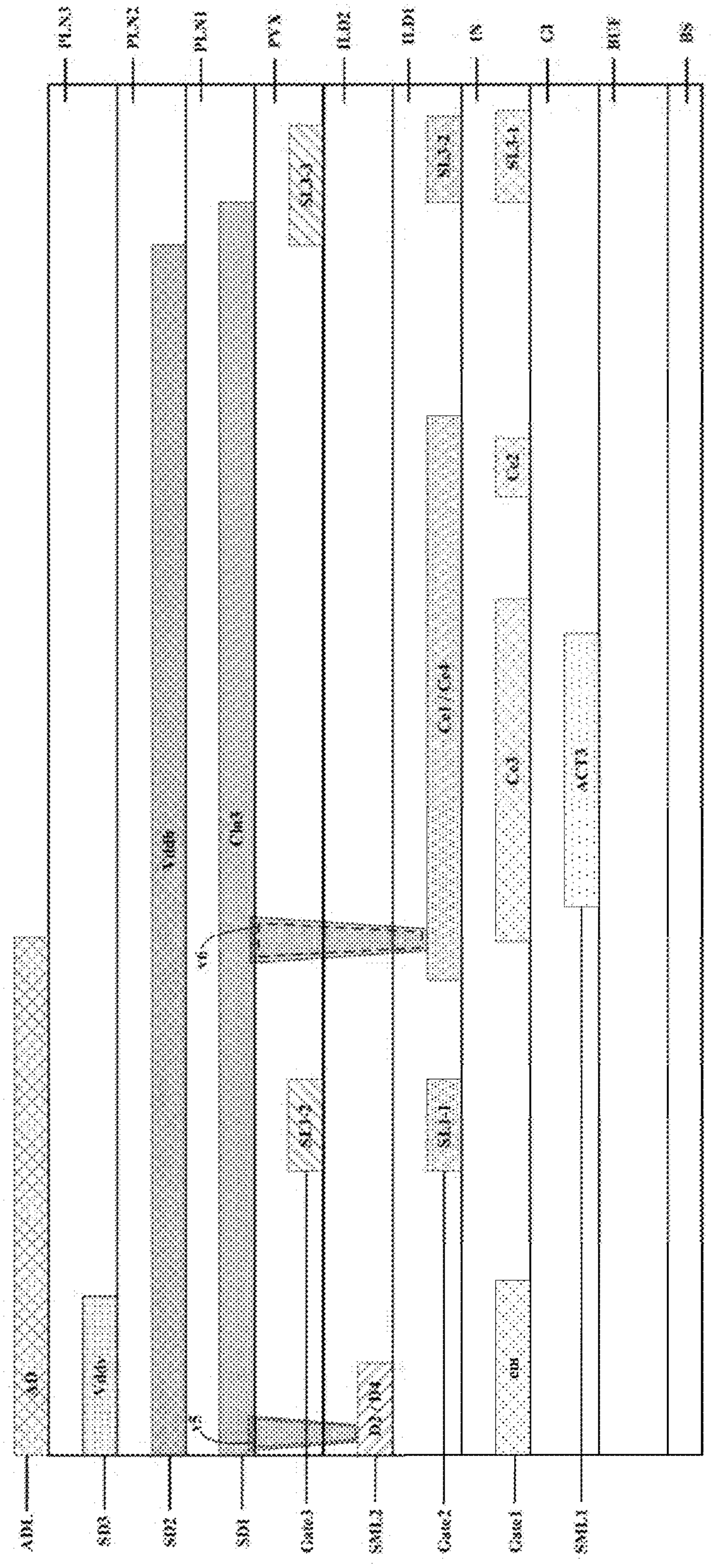
FIG. 6C is a cross-sectional view along a C-C' line in FIG. 5A.

Vias extending through the passivation layer PVX are depicted in FIG. 5J.

Referring to FIG. 2B, FIG. 5A, FIG. 5K, FIG. 6A to FIG. 6C, the first signal line layer SD1 in some embodiments includes a plurality of first reset signal lines Vint1; a first node connecting line Cln1, a second node connecting line Cln2, a third node connecting line Cln3, a first data connecting line Cld1, a first voltage supply connecting line Clv1, a second voltage supply connecting line Clv2, a first reset signal connecting line Cli1, a second reset signal connecting line Cli2, and a first relay electrode RE1.

Various appropriate conductive materials and various appropriate fabricating methods may be used to make the first signal line layer. For example, a conductive material may be deposited on the substrate by a plasma-enhanced chemical vapor deposition (PECVD) process and patterned. Examples of appropriate conductive materials for making the first signal line layer include, but are not limited to, titanium, aluminum, copper, molybdenum, chromium, aluminum copper alloy, copper molybdenum alloy, molybdenum aluminum alloy, aluminum chromium alloy, copper chromium alloy, molybdenum chromium alloy, copper molybdenum aluminum alloy, and the like. In some embodiments, the first signal line layer includes a plurality of sub-layers stacked together. In one example, the first signal line layer includes a stacked titanium/aluminum/titanium multi-layer structure. In another example, the first signal line layer includes a stacked molybdenum/aluminum/molybdenum multi-layer structure. Optionally, the plurality of first reset signal lines Vint1; the first node connecting line Cln1, the second node connecting line Cln2, the third node connecting line Cln3, the first data connecting line Cld1, the first voltage supply connecting line Clv1, the second voltage supply connecting line Clv2, the first reset signal connecting line Cli1, the second reset signal connecting line Cli2, and the first relay electrode RE1 are in a same layer.

In some embodiments, the first node connecting line Cln1 connects multiple components of the pixel driving circuit to the node N1. Referring to FIG. 6A, in the pixel driving circuit, the first node connecting line Cln1 is connected to the third capacitor electrode Ce3 of the second capacitor C2 through a first via v1, and connected to the first reset transistor T1 (e.g., to the second electrode D1 of the first reset transistor T1) through a second via v2. Optionally, the first node connecting line Cln1 corresponds to the node N1 depicted in FIG. 2B. In one example, the first via v1 extends through the passivation layer PVX, the second inter-layer dielectric layer ILD2, the first inter-layer dielectric layer ILD1, and the insulating layer IN. In another example, the second via v2 extends through the passivation layer PVX and the second inter-layer dielectric layer ILD2.

In some embodiments, the second node connecting line Cln2 connects multiple components of the pixel driving circuit to the node N2. Referring to FIG. GB, in the pixel driving circuit, the second node connecting line Cln2 is connected to the second electrode D5 of the light emitting control transistor T5 and/or the first electrode S3 of the driving transistor T3 through a third via v3, and connected to the second electrode D6 of the third reset transistor T6 and/or the first electrode S2 of the compensating transistor T2 through a fourth via v4. Optionally, the second node connecting line Cln2 corresponds to the node N2 depicted in FIG. 2B. In one example, the third via v3 extends through the passivation layer PVX, the second inter-layer dielectric layer ILD2, the first inter-layer dielectric layer ILD1, the insulating layer IN, and the gate insulating layer GL. In another example, the fourth via v4 extends through the passivation layer PVX and the second inter-layer dielectric layer ILD2.

In some embodiments, the third node connecting line Cln3 connects multiple components of the pixel driving circuit to the node N3. Referring to FIG. 6C, in the pixel driving circuit, the third node connecting line Cln3 is connected to second electrodes of the compensating transistor T2 and the data write transistor T4 through a fifth via v5, and is connected to the first capacitor electrode Ce1 of the first capacitor C1 and/or the fourth capacitor electrode Ce4 of the second capacitor C2 through a sixth via v6. Optionally, the third node connecting line Cln3 corresponds to the node N3 depicted in FIG. 2B. In one example, the fifth via v5 extends through the passivation layer PVX and the second inter-layer dielectric layer ILD2. In another example, the sixth via v6 extends through the passivation layer PVX, the second inter-layer dielectric layer ILD2, and the first inter-layer dielectric layer ILD1.

In some embodiments, referring to FIG. 6A, a respective first reset signal line of the plurality of first reset signal lines Vint1 is connected to a first electrode S1 of the first reset transistor T1 through a seventh via v7. In one example, the seventh via v7 extends through the passivation layer PVX and the second inter-layer dielectric layer ILD2.

Referring to FIG. SA, FIG. 5G, FIG. 5I, and FIG. 5K, in some embodiments, the first reset signal connecting line Cli1 in the first signal line layer is connected to a respective second reset signal line of the plurality of second reset signal lines Vint2 in the third gate metal layer, and is connected to a first electrode S7 of the second reset transistor T7 in the first semiconductor material layer.

Referring to FIG. 5A, FIG. 5G, FIG. 5I, and FIG. 5K, in some embodiments, the second reset signal connecting line Cli2 in the first signal line layer is connected to a respective third reset signal line of the plurality of third reset signal lines Vint3 in the third gate metal layer, and is connected to a first electrode S6 of the third reset transistor T6 in the second semiconductor material layer, Optionally, the second reset signal connecting line Cli2 is connected to first electrodes of two adjacent third reset transistors of two adjacent pixel driving circuits in a same row.

Vias extending through the first planarization layer PLN1 are depicted in FIG. 5L.

Referring to FIG. 2B, FIG. 5A, FIG. 5M, and FIG. 6A to FIG. 6C, the second signal line layer SD2 in some embodiments includes a plurality of first voltage supply lines Vddh, a plurality of first fanout connecting lines FIPh, a second data connecting line Cld2, and a second reset electrode RE2. Various appropriate conductive materials and various appropriate fabricating methods may be used to make the second signal line layer. For example, a conductive material may be deposited on the substrate by a plasma-enhanced chemical vapor deposition (PECVD) process and patterned. Examples of appropriate conductive materials for making the second signal line layer include, but are not limited to, titanium, aluminum, copper, molybdenum, chromium, aluminum copper alloy, copper molybdenum alloy, molybdenum aluminum alloy, aluminum chromium alloy, copper chromium alloy, molybdenum chromium alloy, copper molybdenum aluminum alloy, and the like. In some embodiments, the second signal line layer includes a plurality of sub-layers stacked together. In one example, the second signal line layer includes a stacked titanium/aluminum/titanium multi-layer structure. In another example, the second signal line layer includes a stacked molybdenum/aluminum/molybdenum multi-layer structure. Optionally, the plurality of first voltage supply lines Vddh, the plurality of first fanout connecting lines FIPh, the second data connecting line Cld2, and the second reset electrode RE2 are in a same layer.

Vias extending through the second planarization layer PLN2 are depicted in FIG. 5N.

Referring to FIG. 5A, and FIG. 5K to FIG. 5M, in some embodiments, the first voltage supply connecting line Clv1 connects the second capacitor electrode Ce2 of the first capacitor C1 with a respective first voltage supply line of the plurality of first voltage supply lines Vddh. The respective first voltage supply line of the plurality of first voltage supply lines Vddh is connected to the first voltage supply connecting line Clv1 through a via (e.g., a via extending through the first planarization layer PLN1). The first voltage supply connecting line Clv1 is connected to the second capacitor electrode Ce2 of the first capacitor C1 through a via (e.g., a via extending through the passivation layer PVX, the second inter-layer dielectric layer ILD2, the first inter-layer dielectric layer ILD1, and the insulating layer IN).

In some embodiments, the second voltage supply connecting line Clv2 connects a second electrode S5 of the light emitting control transistor T5 with a respective first voltage supply line of the plurality of first voltage supply lines Vddh. The respective first voltage supply line of the plurality of first voltage supply lines Vddh is connected to the second voltage supply connecting line Clv2 through a via (e.g., a via extending through the first planarization layer PLN1). The second voltage supply connecting line Clv2 is connected to the second electrode S5 of the light emitting control transistor T5 through a via (e.g., a via extending through the passivation layer PVX, the second inter-layer dielectric layer ILD2, the first inter-layer dielectric layer ILD1, the insulating layer IN, and the gate insulating layer G1).

In some embodiments, the second voltage supply connecting line Clv2 connects multiple components of two adjacent pixel driving circuits in a same row to a respective voltage supply line of the plurality of voltage supply lines Vdd. In some embodiments, the respective voltage supply line of the plurality of voltage supply lines Vdd is connected to the second voltage supply connecting line Clv2. The second voltage supply connecting line Clv2 is connected to second electrodes of two adjacent light emitting control transistors of two adjacent pixel driving circuits in the same row. The second electrodes of two adjacent light emitting control transistors of two adjacent pixel driving circuits in the same row are parts of a unitary structure.

Referring to FIG. 5A, FIG. 5O, and FIG. 6A to FIG. 6C, the third signal line layer SD3 in some embodiments includes a plurality of second voltage supply lines Vddv, a plurality of data lines DL, a plurality of second fanout connecting lines FlPv, and an anode connecting pad ACP. Various appropriate conductive materials and various appropriate fabricating methods may be used to make the third signal line layer. For example, a conductive material may be deposited on the substrate by a plasma-enhanced chemical vapor deposition (PECVD) process and patterned. Examples of appropriate conductive materials for making the third signal line layer include, but are not limited to, titanium, aluminum, copper, molybdenum, chromium, aluminum copper alloy, copper molybdenum alloy, molybdenum aluminum alloy, aluminum chromium alloy, copper chromium alloy, molybdenum chromium alloy, copper molybdenum aluminum alloy, and the like. In some embodiments, the third signal line layer includes a plurality of sub-layers stacked together. In one example, the third signal line layer includes a stacked titanium/aluminum/titanium multi-layer structure. In another example, the third signal line layer includes a stacked molybdenum/aluminum/molybdenum multi-layer structure. Optionally, the plurality of second voltage supply lines Vddv, the plurality of data lines DL, the plurality of second fanout connecting lines FlPv, and the anode connecting pad ACP are in a same layer.

Referring to FIG. 5A, and FIG. 5K to FIG. 5O, in some embodiments, a respective data line of the plurality of data lines DL in the third signal line layer is connected to the second data connecting line Cld2 in the second signal line layer, the second data connecting line Cld2 in the second signal line layer is connected to the first data connecting line Cld1 in the first signal line layer, and the first data connecting line Cld1 is connected to the first electrode S4 of the data write transistor T4 in the second semiconductor material layer.

Vias extending through the third planarization layer PLN3 are depicted in FIG. SP.

Referring to FIG. 5A, FIG. 5R, and FIG. 6A to FIG. 6C, the anode layer ADL in some embodiments includes a plurality of anodes AD.

Referring to FIG. 5A, and FIG. 5K to FIG. 5R, in some embodiments, the anode connecting pad ACP in the third signal line layer is connected to the second relay electrode RE2 in the second signal line layer, the second relay electrode RE2 in the second signal line layer is connected to the first relay electrode RE1 in the first signal line layer, and the first relay electrode RE1 is connected to the second electrodes of the second reset transistor T7 and the control transistor T8. The anode connecting pad ACP is connected to a respective anode AD of a plurality of anodes.

Figure 7A:
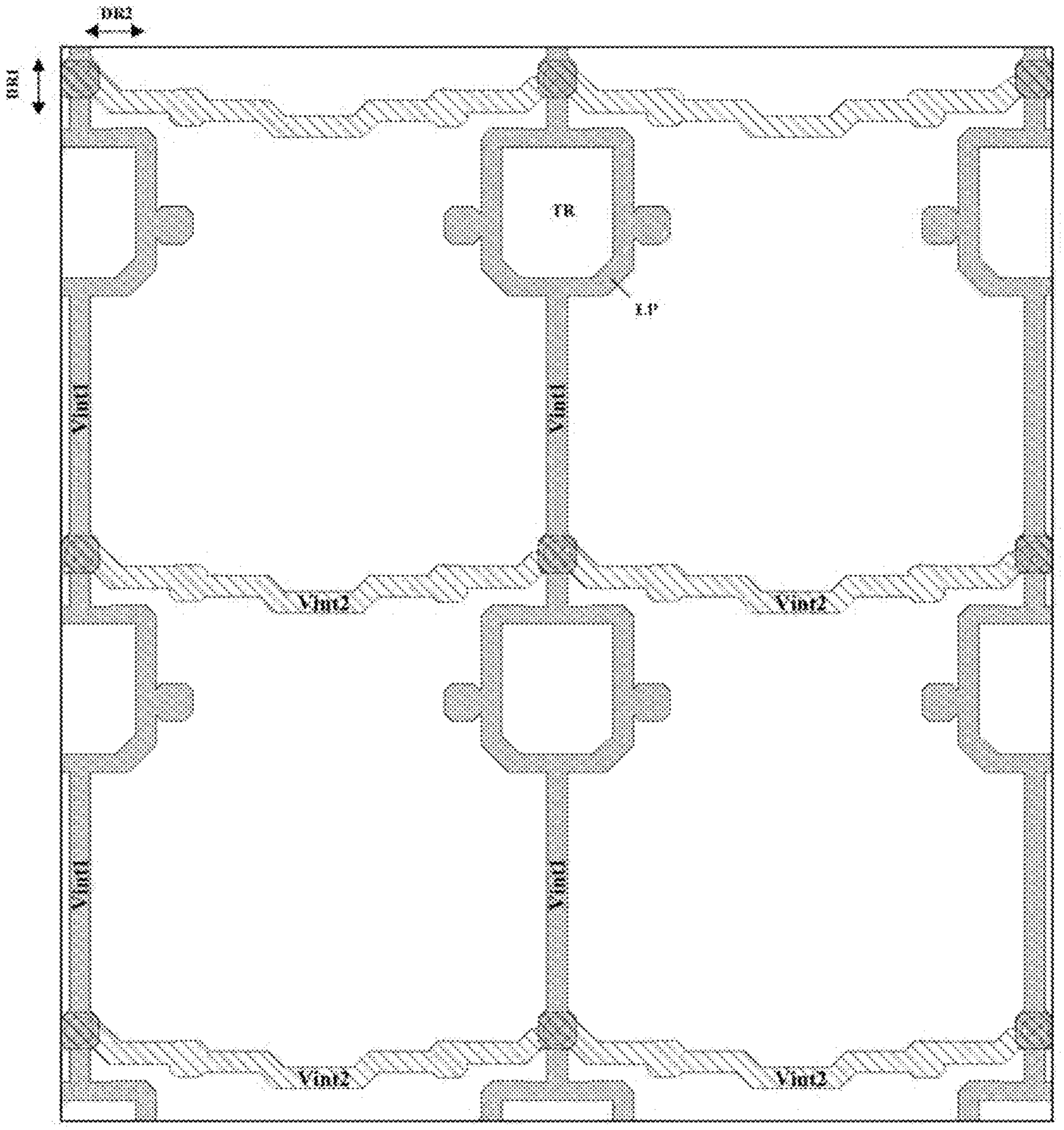
FIG. 7A is a diagram illustrating the structure of a reset signal line network in some embodiments according to the present disclosure.

FIG. 7A is a diagram illustrating the structure of a reset signal line network in some embodiments according to the present disclosure. Referring to FIG. 7A, the array substrate in some embodiments includes an interconnected reset signal line network. In some embodiments, the interconnected reset signal line network includes a plurality of first reset signal lines Vint1 and a plurality of second reset signal lines Vint2 interconnected together. Optionally, the plurality of first reset signal lines Vint1 extend along a direction substantially parallel to the first direction DR1. Optionally, the plurality of second reset signal lines Vint2 extend along a direction substantially parallel to the second direction DR2. Optionally, the plurality of first reset signal lines Vint1 and the plurality of second reset signal lines Vint2 are in different layers. In one example, the plurality of first reset signal lines Vint1 are in the first signal line layer, and the plurality of second reset signal lines Vint2 are in the third gate metal layer. In some embodiments, a respective first reset signal line of the plurality of first reset signal lines Vint1 is connected to one or more second reset signal lines of the plurality of second reset signal lines Vint2. In some embodiments, a respective second reset signal line of the plurality of second reset signal lines Vint2 is connected to one or more first reset signal lines of the plurality of first reset signal lines Vint1, thereby forming the interconnected reset signal line network.

Referring to FIG. 7A, in some embodiments, a respective first reset signal line of the plurality of first reset signal lines Vint1 includes a plurality of loops LP arranged along a direction substantially parallel to the first direction DR1. A respective loop of the plurality of loops LP is connected to first electrodes of two adjacent first reset transistors of two adjacent pixel driving circuits in a same row.

Figure 7B:
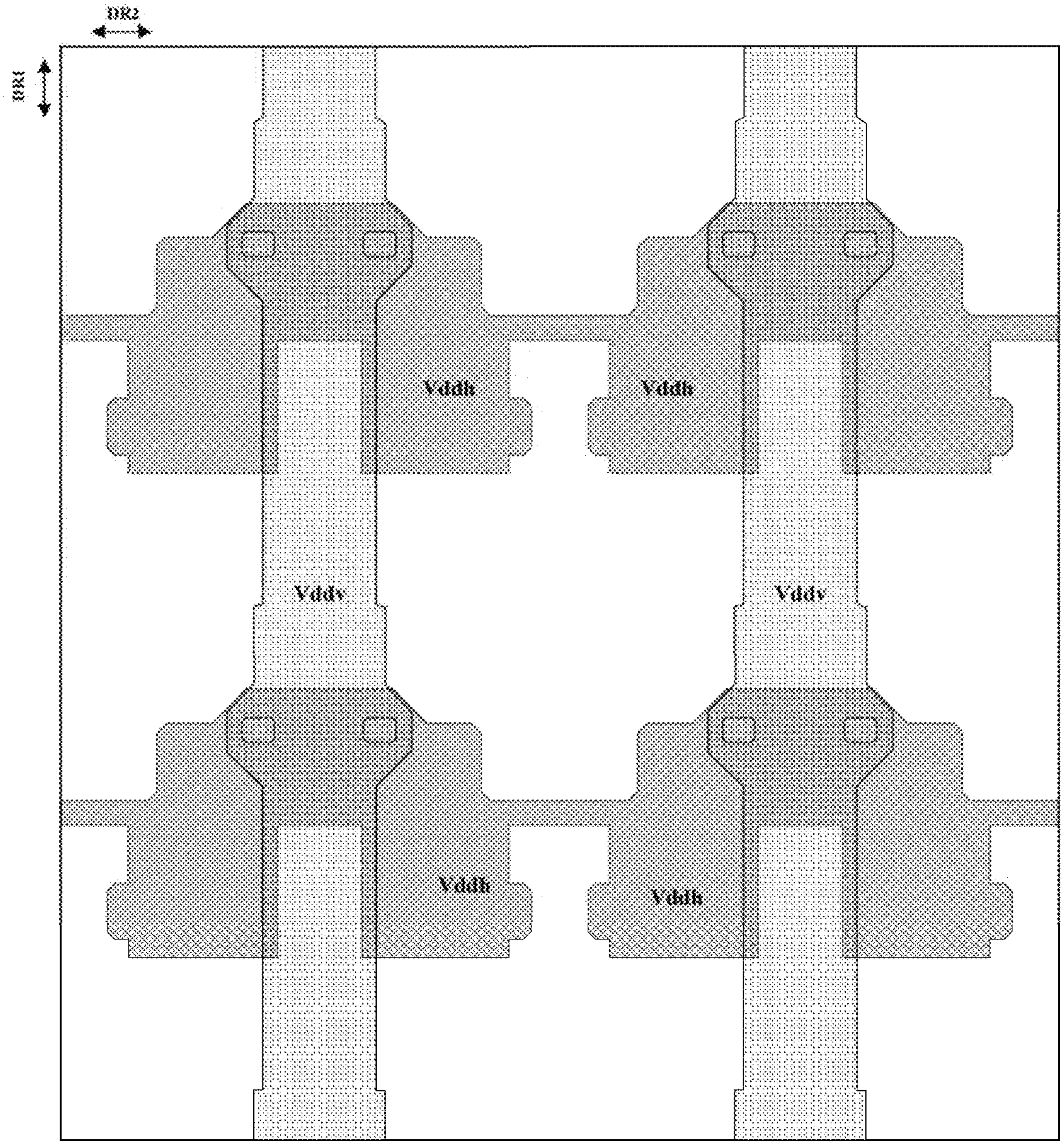
FIG. 7B is a diagram illustrating the structure of a voltage supply network in some embodiments according to the present disclosure.

FIG. 7B is a diagram illustrating the structure of a voltage supply network in some embodiments according to the present disclosure. Referring to FIG. 7B, the array substrate in some embodiments includes an interconnected voltage supply network. In some embodiments, the interconnected voltage supply network includes a plurality of first voltage supply lines Vddh and a plurality of second voltage supply lines Vddv, Optionally, the plurality of second voltage supply lines Vddv extend along a direction substantially parallel to the first direction DR1. Optionally, the plurality of first voltage supply lines Vddh extend along a direction substantially parallel to the second direction DR2. Optionally, the plurality of first voltage supply lines Vddh and the plurality of second voltage supply lines Vddv are in different layers. In one example, the plurality of first voltage supply lines Vddh are in the second signal line layer, and the plurality of second voltage supply lines Vddv are in the third signal line layer. In some embodiments, a respective first voltage supply line of the plurality of first voltage supply lines Vddh is connected to one or more second voltage supply lines of the plurality of second voltage supply line Vddv. In some embodiments, a respective second voltage supply line of the plurality of second voltage supply line Vddv is connected to one or more first voltage supply lines of the plurality of first voltage supply lines Vddh.

Referring to FIG. 5A, in some embodiments, the array substrate includes a transmissive region TR in which conductive components of the pixel driving circuit are absent Referring to FIG. 7A, a respective loop of the plurality of loops of the respective first reset signal line surrounds the transmissive region TR. An accessory may be installed in the transmissive region TR. Examples of accessories include a photosensor.

Figure 7C:
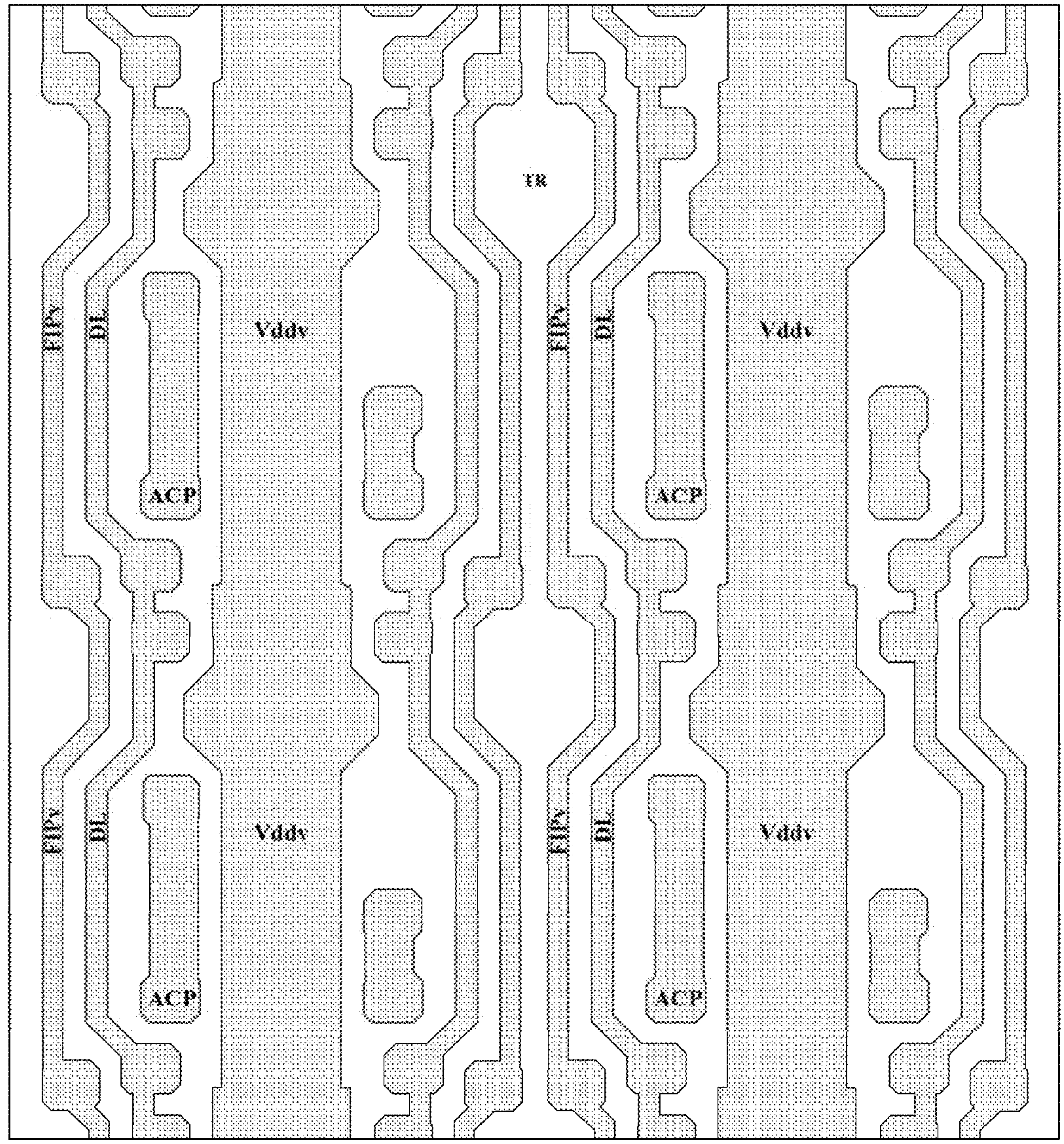
FIG. 7C is a diagram illustrating the structure of a third signal line layer in four adjacent pixel driving circuits in a same row in an array substrate in some embodiments according to the present disclosure.

Referring to FIG. 5O, a respective second fanout connecting line of the plurality of second fanout connecting lines FIPv includes a plurality of first segment SG1 and a plurality of second segments SG2 alternately connected together. FIG. 7C is a diagram illustrating the structure of a third signal line layer in four adjacent pixel driving circuits in a same row in an array substrate in some embodiments according to the present disclosure. Referring to FIG. 5O and FIG. 7C, in some embodiments, second segments of two adjacent second fanout connecting lines substantially surround the transmissive region TR. In some embodiments, the first segment SG1 is substantially straight, and the second segment SG2 is a curved segment curving around the transmissive region TR. In some embodiments, a virtual extension of the first segment SG1 extends through the transmissive region TR.

Referring to FIG. 5A, FIG. 5M, and FIG. 5O, as discussed above, the array substrate in some embodiments includes a plurality of first fanout connecting lines FIPh and a plurality of second fanout connecting lines FIPv. Optionally, the plurality of first fanout connecting lines FIPh are in the second signal line layer. Optionally, the plurality of second fanout connecting lines FIPv are in the third signal line layer. Optionally, the plurality of first fanout connecting lines FIPh extend along a direction substantially parallel to the second direction DR2. Optionally, the plurality of second fanout connecting lines FIPv extend along a direction substantially parallel to the first direction DR1.

In some embodiments, referring to FIG. 7C, two adjacent second fanout connecting lines of the plurality of second fanout connecting lines FIPv are between two adjacent data lines of the plurality of data lines configured to provide data signals to two adjacent pixel driving circuits in a same row. Optionally, two adjacent second fanout connecting lines of the plurality of second fanout connecting lines FIPv are between two adjacent data lines of the plurality of data lines DL configured to provide data signals to two adjacent pixel driving circuits in a same row; and the two adjacent data lines are between two adjacent second voltage supply lines of the plurality of second voltage supply lines Vddv configured to provide voltage supply signals to the two adjacent pixel driving circuits in a same row. Optionally, a respective data line of the plurality of data lines DL is between a second fanout connecting line and a second voltage supply line. Optionally, a second voltage supply line of the plurality of second voltage supply lines Vddv spaces apart two adjacent data lines of the plurality of data lines.

Figure 8:
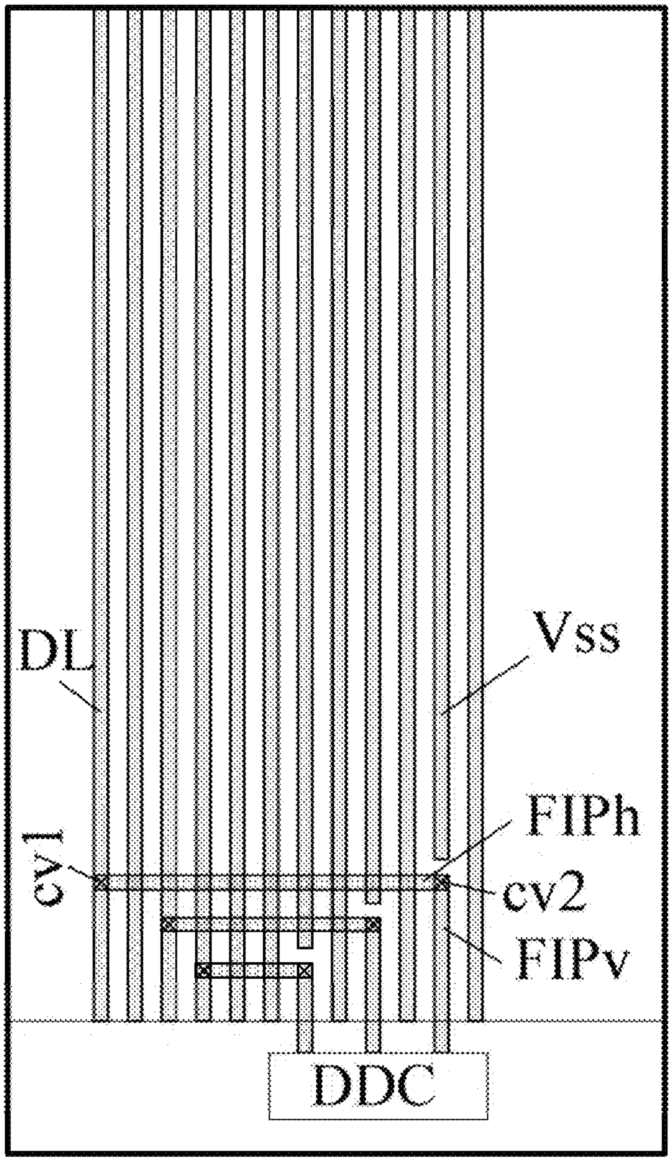
FIG. 8 is a diagram illustrating a layout of certain signal lines in a second signal line layer and a third signal line layer in an array substrate in some embodiments according to the present disclosure.

FIG. 8 is a diagram illustrating a layout of certain signal lines in a second signal line layer and a third signal line layer in an array substrate in some embodiments according to the present disclosure. Referring to FIG. 8, in some embodiments, an individual data line of the plurality of data lines DL is connected to a respective first fanout connecting line of the plurality of first fanout connecting lines FIPh, e.g., through a first connecting via cv1 extending through the second planarization layer. A respective second fanout connecting line of the plurality of second fanout connecting lines FIPv is connected to the respective first fanout connecting line of the plurality of first fanout connecting lines FIPh, e.g., through a second connecting via cv2 extending through the second planarization layer. The respective first fanout connecting line connects the respective data line DL with the respective second fanout connecting line. The plurality of second fanout connecting lines are connected to a data driving circuit DDC. Optionally, an individual first fanout connecting line of the plurality of first fanout connecting lines FIPh is connected to only one data line of the plurality of data lines DL, and an individual data line of the plurality of data lines DL is connected to only one first fanout connecting line of the plurality of first fanout connecting lines FIPh. Optionally, an individual second fanout connecting line of the plurality of second fanout connecting lines FIPv is connected to only one first fanout connecting line of the plurality of first fanout connecting lines FIPh, and an individual first fanout connecting line of the plurality of first fanout connecting lines FIPh is connected to only one second fanout connecting line of the plurality of second fanout connecting lines FIPv.

Figure 9A:
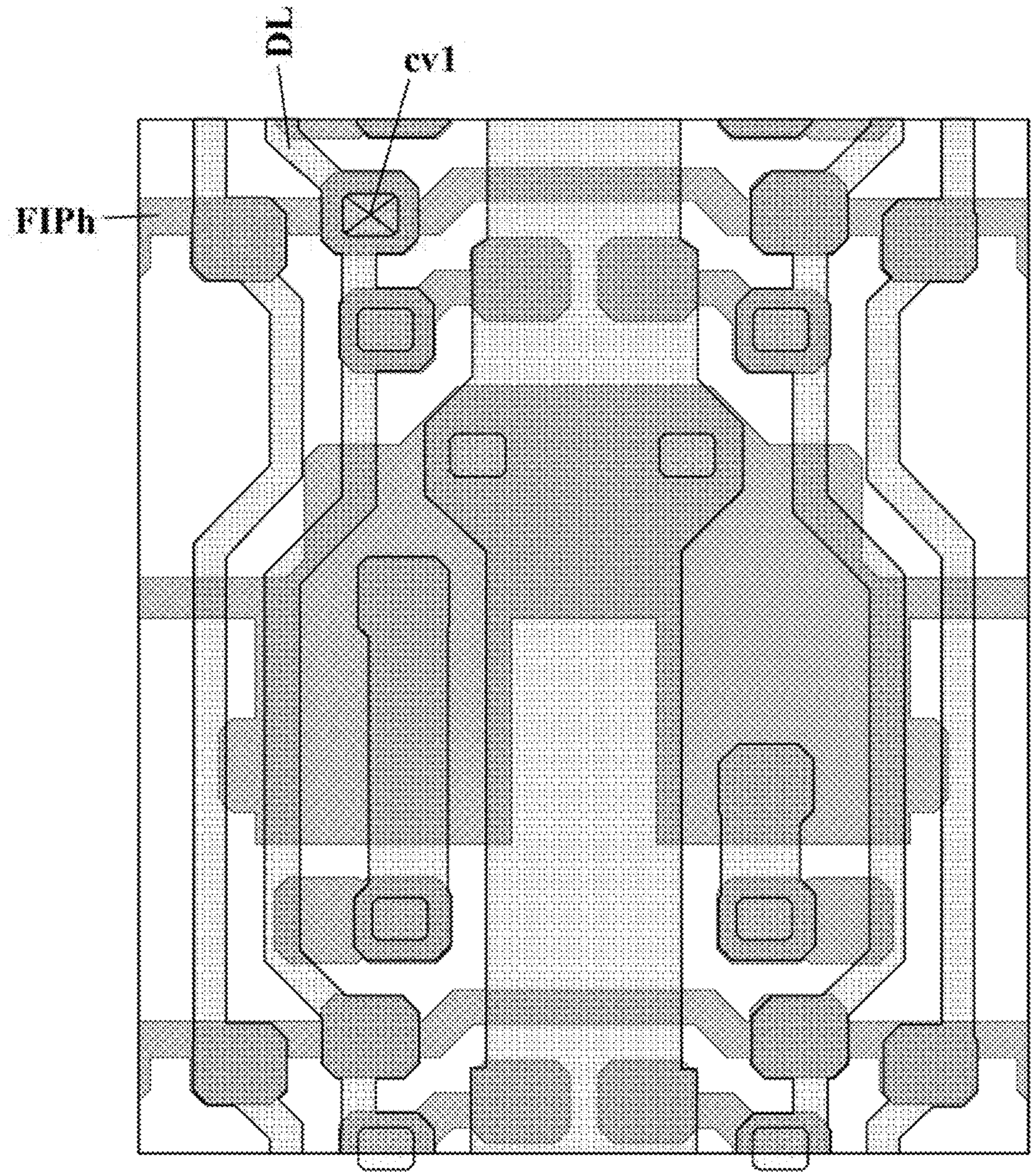
FIG. 9A shows connection between a respective data line and a respective first fanout connecting line through a first connecting via.

FIG. 9A shows connection between a respective data line and a respective first fanout connecting line through a first connecting via. Referring to FIG. 9A, in some embodiments, at least one of the plurality of first fanout connecting lines FIPh crosses over multiple data lines of the plurality of data lines, but is not connected to the multiple data lines except for one corresponding data line.

Figure 9B:
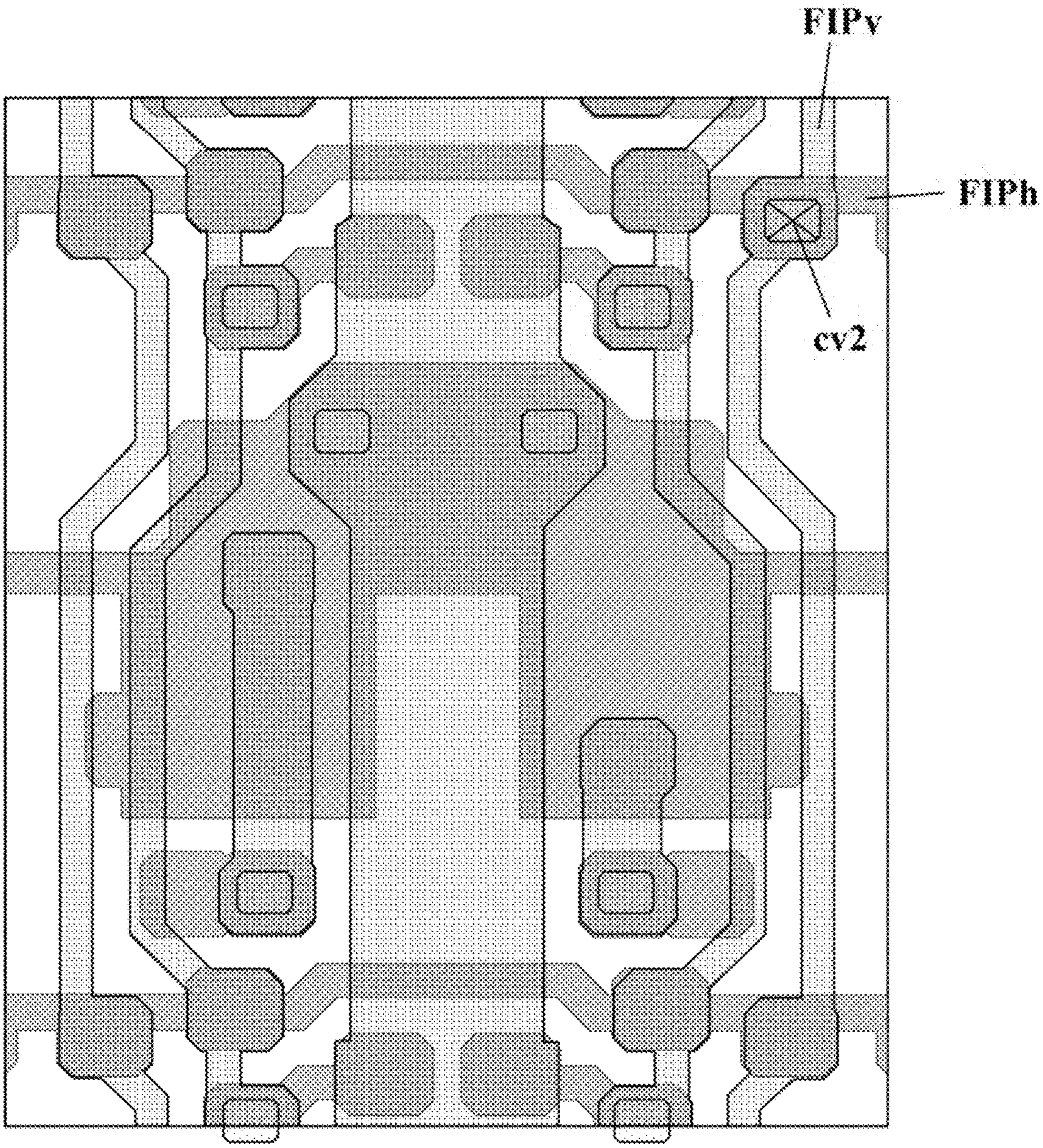
FIG. 9B shows connection between a respective first fanout connecting line and a respective second fanout connecting line through a second connecting via.

FIG. 9B shows connection between a respective first fanout connecting line and a respective second fanout connecting line through a second connecting via. Referring to FIG. 9B, in some embodiments, a respective first fanout connecting line of the plurality of first fanout connecting lines FIPh is connected to a corresponding second fanout connecting line of the plurality of second fanout connecting lines FIPv.

Figure 10:
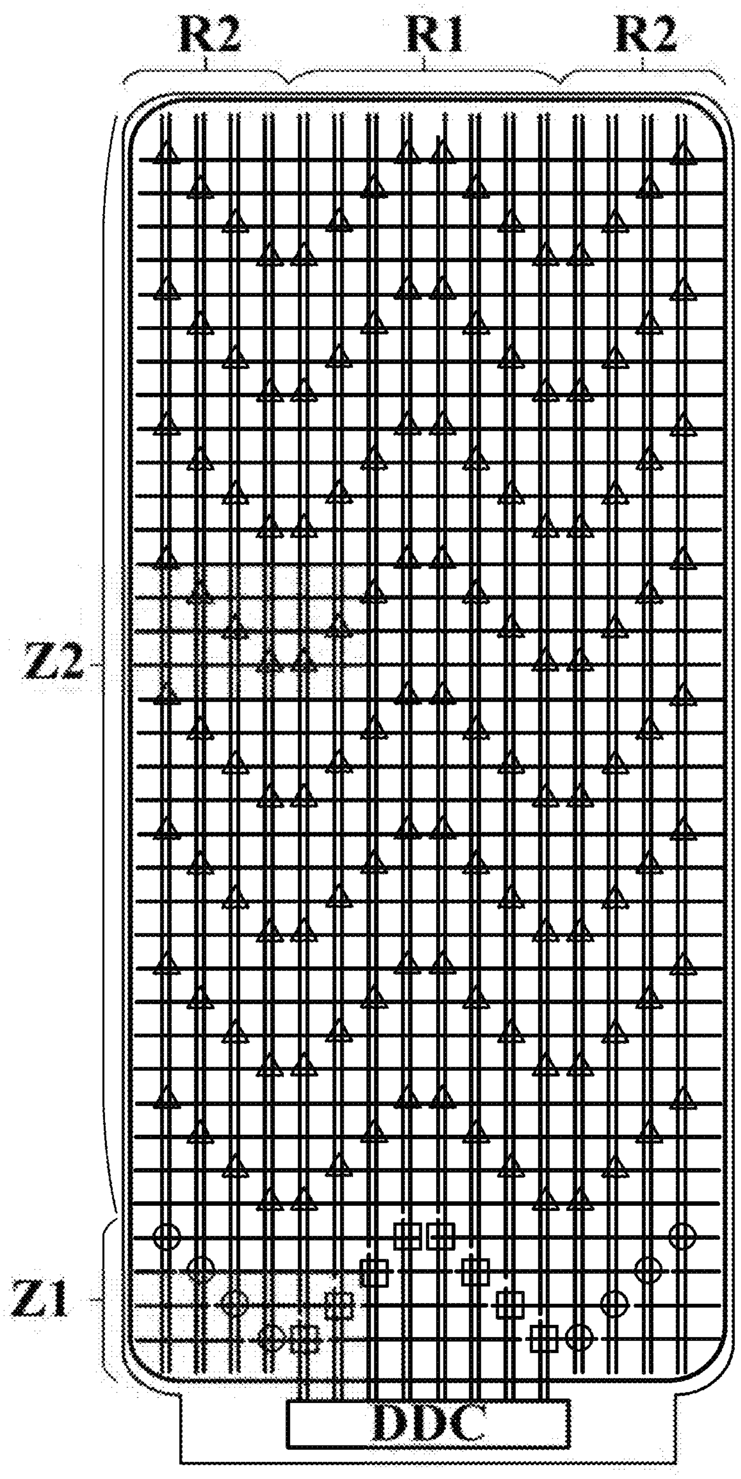
FIG. 10 illustrates a layout of signal lines in an array substrate in some embodiments according to the present disclosure.
Figure 11A:
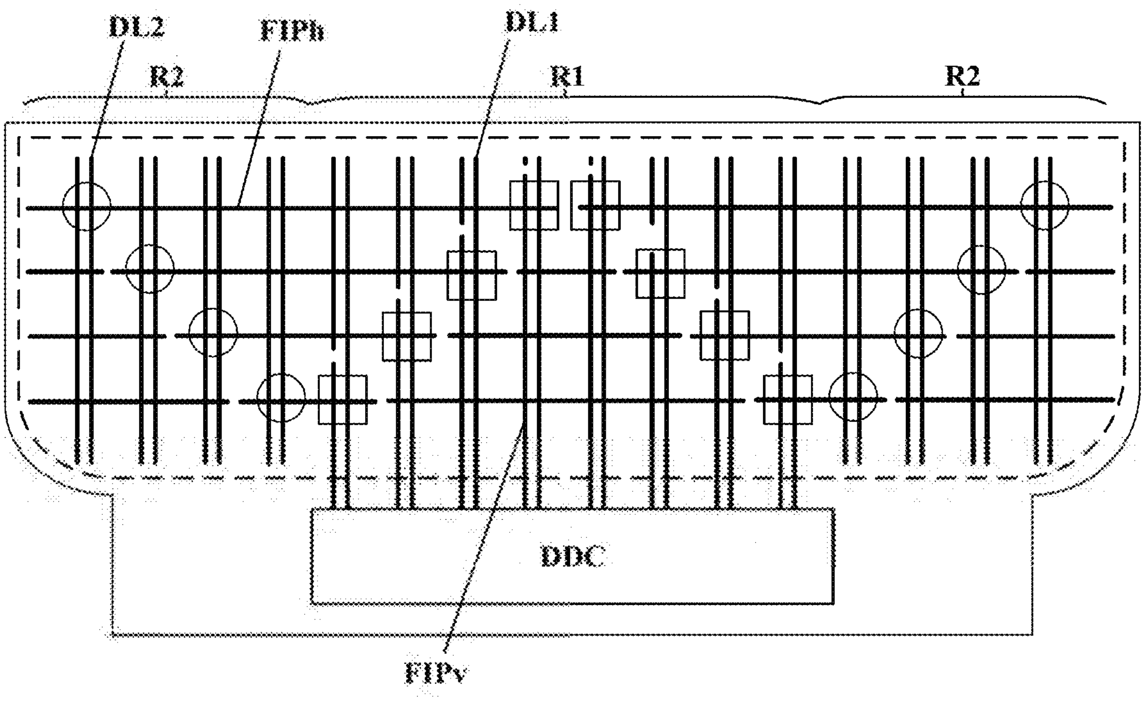
FIG. 11A illustrates a layout of signal lines in a portion of an array substrate in some embodiments according to the present disclosure.

FIG. 10 illustrates a layout of signal lines in an array substrate in some embodiments according to the present disclosure. FIG. 11A illustrates a layout of signal lines in a portion of an array substrate in some embodiments according to the present disclosure. Referring to FIG. 10 and FIG. 11A, the array substrate in some embodiments includes a plurality of data lines, a plurality of first fanout connecting lines FIPh, and a plurality of second fanout connecting lines FIPv.

The array substrate includes a first region R1 and a second region R2 outside the first region R1. The first region R1 includes a plurality of first columns of subpixels, the second region R2 includes a plurality of second columns of subpixels. The plurality of first columns of subpixels are different from the plurality of second columns of subpixels. In some embodiments, the first region R1 and the second region R2 are in a display area of the array substrate. As used herein, the term “display area” refers to an area of an array substrate in a display panel where image is actually displayed. Optionally, the display area may include both a subpixel region and an inter-subpixel region. A subpixel region refers to a light emission region of a subpixel, such as a region corresponding to a pixel electrode in a liquid crystal display or a region corresponding to a light emissive layer in an organic light emitting diode display panel. An inter-subpixel region refers to a region between adjacent subpixel regions, such as a region corresponding to a black matrix in a liquid crystal display or a region corresponding to a pixel definition layer in an organic light emitting diode display panel. Optionally, the inter-subpixel region is a region between adjacent subpixel regions in a same pixel. Optionally, the inter-subpixel region is a region between two adjacent subpixel regions from two adjacent pixels.

Figure 11B:
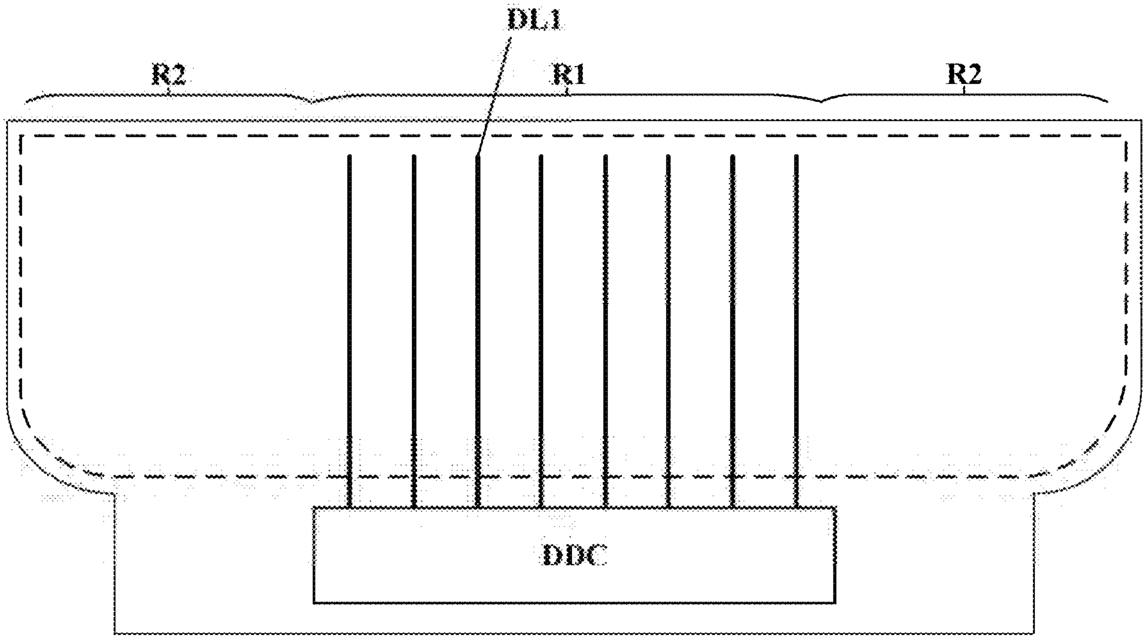
FIG. 11B illustrates a layout of a plurality of first data lines in the portion of the array substrate depicted in FIG. 11A.
Figure 11C:
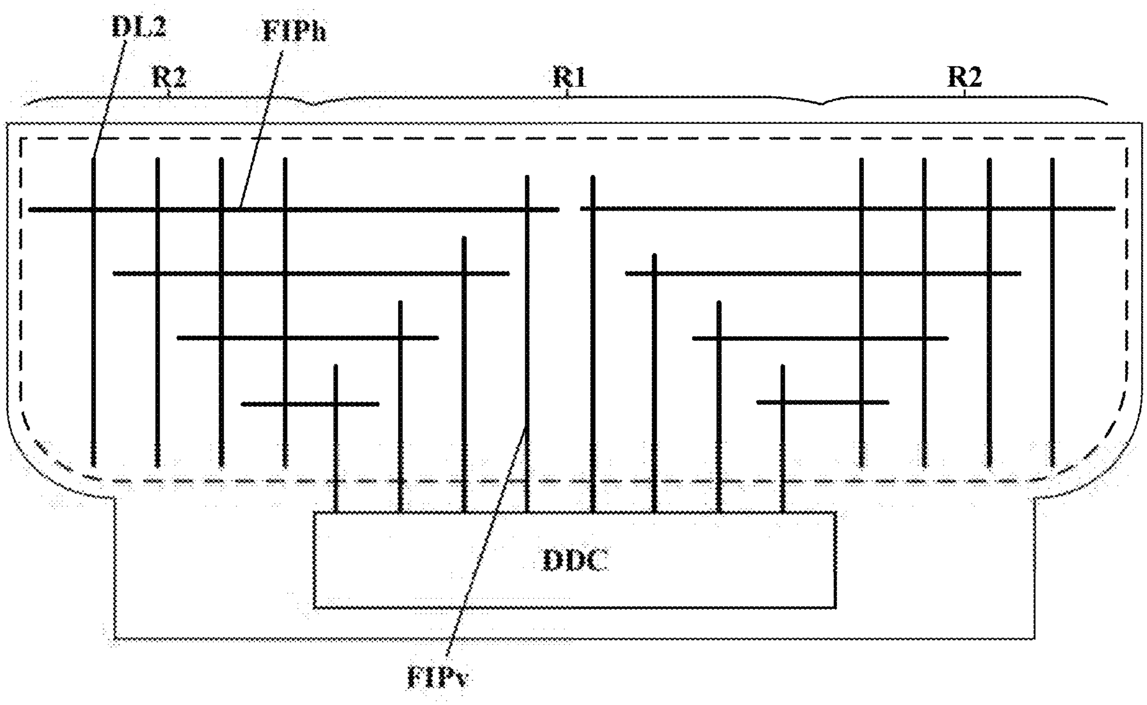
FIG. 11C illustrates a layout of a plurality of second data lines, a plurality of first fanout connecting lines, and a plurality of second fanout connecting lines in the portion of the array substrate depicted in FIG. 11A.

FIG. 11B illustrates a layout of a plurality of first data lines in the portion of the array substrate depicted in FIG. 11A. FIG. 11C illustrates a layout of a plurality of second data lines, a plurality of first fanout connecting lines, and a plurality of second fanout connecting lines in the portion of the array substrate depicted in FIG. 11A. Referring to FIG. 10, FIG. 11A to FIG. 11C, the plurality of data lines includes a plurality of first data lines DL1 configured to provide data signals to the plurality of first columns of subpixels in the first region R1, and a plurality of second data lines DL2 configured to provide data signals to the plurality of second columns of subpixels in the second region R2.

In some embodiments, the plurality of first data lines DL1 are connected to the data driving circuit DDC; and the plurality of second data lines DL2 are connected to the data driving circuit DDC through the plurality of first fanout connecting lines FIPh and the plurality of second fanout connecting lines FIPv. Optionally, a respective second data line of the plurality of second data lines DL2 is connected to the data driving circuit DDC through a respective first fanout connecting line of the plurality of first fanout connecting lines FIPh and a respective second fanout connecting line of the plurality of second fanout connecting lines FIPv. The respective first fanout connecting line of the plurality of first fanout connecting lines FIPh and the respective second fanout connecting line of the plurality of second fanout connecting lines FIPv are connected to each other. The plurality of first fanout connecting lines FIPh and the plurality of second fanout connecting lines FIPv are substantially (e.g., at least 50%, at least 60%, at least 70%, at least 80%, at least 90%, at least 95%, at least 98%, at least 99%, or 100%) in the display area of the array substrate.

A circle mark in FIG. 10, FIG. 11A, and FIG. 11C denotes a connection between the respective first fanout connecting line of the plurality of first fanout connecting lines FIPh and the respective second data line of the plurality of second data lines DL2. A square mark in FIG. 10, FIG. 11A, and FIG. 11C denotes a connection between the respective first fanout connecting line of the plurality of first fanout connecting lines FIPh and the respective second fanout connecting line of the plurality of second fanout connecting lines FIPv. Optionally, the respective second data line of the plurality of second data lines DL2 is connected to the respective first fanout connecting line of the plurality of first fanout connecting lines FIPh through a via extending through the second planarization layer. Optionally, the respective second fanout connecting line of the plurality of second fanout connecting lines FIPv is connected to the respective first fanout connecting line of the plurality of first fanout connecting lines FIPh through a via extending through the second planarization layer.

Figure 11D:
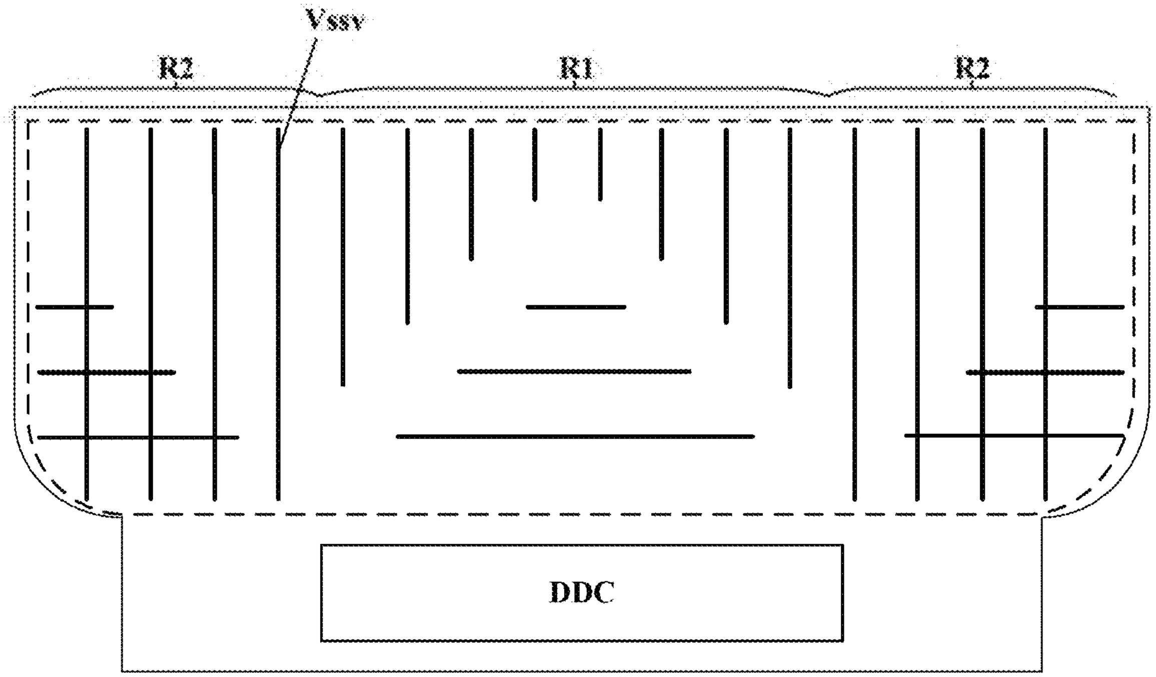
FIG. 11D illustrates a layout of signal lines not involved in data signal transmission in the portion of the array substrate depicted in FIG. 11A.
Figure 12:
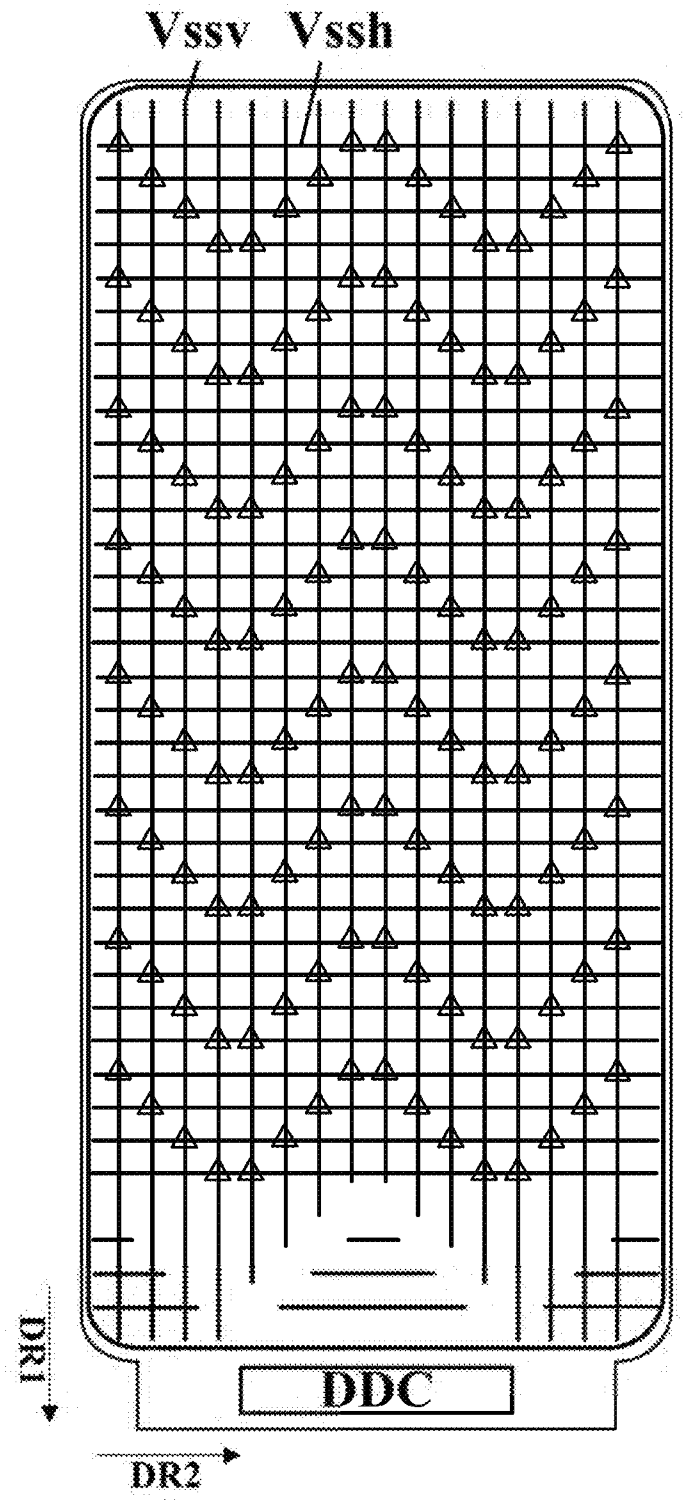
FIG. 12 illustrates a layout of signal lines not involved in data signal transmission in the array substrate depicted in FIG. 10.

FIG. 11D illustrates a layout of signal lines not involved in data signal transmission in the portion of the array substrate depicted in FIG. 11A. FIG. 12 illustrates a layout of signal lines not involved in data signal transmission in the array substrate depicted in FIG. 10.

Referring to FIG. 10, FIG. 11A, FIG. 11D, and FIG. 12, the array substrate in some embodiments further includes a plurality of fourth voltage supply lines Vssv and a plurality of third voltage supply lines Vssh. The plurality of fourth voltage supply lines Vssv extend along a direction substantially parallel to the first direction DR1. The plurality of third voltage supply lines Vssh extend along a direction substantially parallel to the second direction DR2.

In some embodiments, the plurality of first voltage supply lines are configured to provide a first reference voltage signal (e.g., a high reference voltage signal). The plurality of fourth voltage supply lines Vssv and the plurality of third voltage supply lines Vssh are configured to provide a second reference voltage signal (e.g., a low reference voltage signal). Optionally, the first reference voltage signal is a constant voltage signal, the second reference voltage signal is a constant voltage signal, the first reference voltage signal has a voltage level higher than a voltage level of the second reference voltage signal.

In some embodiments, the plurality of third voltage supply lines Vssh and the plurality of first fanout connecting lines FIPh are in a same layer; and the plurality of fourth voltage supply lines Vssv and the plurality of second fanout connecting lines FIPv are in a same layer. Optionally, the plurality of third voltage supply lines Vssh and the plurality of first fanout connecting lines FIPh are in the second signal line layer. Optionally, the plurality of fourth voltage supply lines Vssv and the plurality of second fanout connecting lines FIPv are in the third signal line layer.

In some embodiments, the plurality of fourth voltage supply lines Vssv and the plurality of third voltage supply lines Vssh form an interconnected voltage supply network. In some embodiments, a respective fourth voltage supply line of the plurality of fourth voltage supply lines Vssv is connected to one or more third voltage supply lines of the plurality of third voltage supply lines Vssh through one or more vias, e.g., one or more vias extending through the second planarization layer PLN2. The triangle mark in FIG. 10 and FIG. 12 denotes a connection between the respective fourth voltage supply line of the plurality of fourth voltage supply lines Vssv and the respective third voltage supply line of the plurality of third voltage supply lines Vssh.

In some embodiments, the array substrate includes a first zone Z1 and a second zone Z2 outside the first zone Z1. The first zone Z1 includes a plurality of first rows of subpixels, the second zone 22 includes a plurality of second rows of subpixels. The plurality of first rows of subpixels are different from the plurality of second rows of subpixels. In some embodiments, the first zone Z1 and the second zone Z2 are in a display area of the array substrate.

In some embodiments, connections between the plurality of first fanout connecting lines FIPh and the plurality of second data lines DL2 (circle marks) and connections between the plurality of first fanout connecting lines FIPh and the plurality of second fanout connecting lines FIPv (square marks) are in the first zone Z1, In some embodiments, connections between the plurality of fourth voltage supply lines Vssv and the plurality of third voltage supply lines Vssh (triangle marks) are in the second zone Z2.

In some embodiments, the connections between the plurality of first fanout connecting lines FIPh and the plurality of second data lines DL2 (circle marks) and connections between the plurality of first fanout connecting lines FIPh and the plurality of second fanout connecting lines FIPv (square marks) in the first zone Z1 constitute a first group of connections. In some embodiments, the connections between the plurality of fourth voltage supply lines Vssv and the plurality of third voltage supply lines Vssh in the second zone 22 include one or more second groups of connections between the plurality of fourth voltage supply lines Vssv and the plurality of third voltage supply lines Vssh. In some embodiments, a respective second group of the one or more second groups of connections in the second zone Z2 has a same pattern as the first group of connections in the first zone Z1. In some embodiments, the first group of connections and the one or more second groups of connections are distributed substantially evenly in the array substrate, e.g., along the first direction DR1.

The inventors of the present disclosure discover that, by having the one or more second groups of connections having a same pattern as the first group of connections, and by having the first group of connections and the one or more second groups of connections distributed substantially evenly in the array substrate, an enhanced display uniformity can be achieved.

In some embodiments, the interconnected voltage supply network comprising the plurality of fourth voltage supply lines Vssv and the plurality of third voltage supply lines Vssh is electrically connected to a peripheral voltage supply line to receive a second reference voltage signal. Optionally, the interconnected voltage supply network is electrically connected to a cathode of the light emitting elements in the array substrate, and functions as an auxiliary cathode.

In some embodiments, a respective gate line of the plurality of gate lines includes a plurality of branches. Referring to FIG. 5A to FIG. 5R, the respective gate line in some embodiments includes a respective gate line first branch GL-1 and a respective gate line second branch GL-2. Optionally, an orthographic projection of the respective gate line first branch GL-1 on a base substrate at least partially overlaps with an orthographic projection of the respective gate line second branch GL-2 on the base substrate. In one example, the respective gate line first branch GL-1 is in the second gate metal layer. In another example, the respective gate line second branch GL-2 is in the third gate metal layer.

In some embodiments, a respective first control signal line of the plurality of first control signal lines SL1 includes a plurality of branches. Referring to FIG. 5A to FIG. 5R, the respective first control signal line includes a respective first control signal line first branch SL1-1 and a respective first control signal line second branch SL1-2. Optionally, an orthographic projection of the respective first control signal line first branch SL1-1 on a base substrate at least partially overlaps with an orthographic projection of the respective first control signal line second branch SL1-2 on the base substrate. In one example, the respective first control signal line first branch SL1-1 is in the second gate metal layer. In another example, the respective first control signal line second branch SL1-2 is in the third gate metal layer.

In some embodiments, a respective third control signal line of the plurality of third control signal lines includes a plurality of branches. Referring to FIG. 5A to FIG. 5R, the respective third control signal line includes a respective third control signal line first branch SL3-1, a respective third control signal line second branch SL3-2, and a respective third control signal line third branch SL3-3. Optionally, an orthographic projection of the respective third control signal line first branch SL3-1 on a base substrate at least partially overlaps with an orthographic projection of the respective third control signal line second branch SL3-2 on the base substrate, and at least partially overlaps with an orthographic projection of the respective third control signal line third branch SL3-3 on the base substrate. Optionally, the orthographic projection of the respective third control signal line second branch SL3-2 on the base substrate at least partially overlaps with an orthographic projection of the respective third control signal line third branch SL3-3 on the base substrate. In one example, the respective third control signal line first branch SL3-1 is in the first gate metal layer. In another example, the respective third control signal line second branch SL3-2 is in the second gate metal layer. In another example, the respective third control signal line third branch SL3-3 is in the third gate metal layer.

Figure 13:
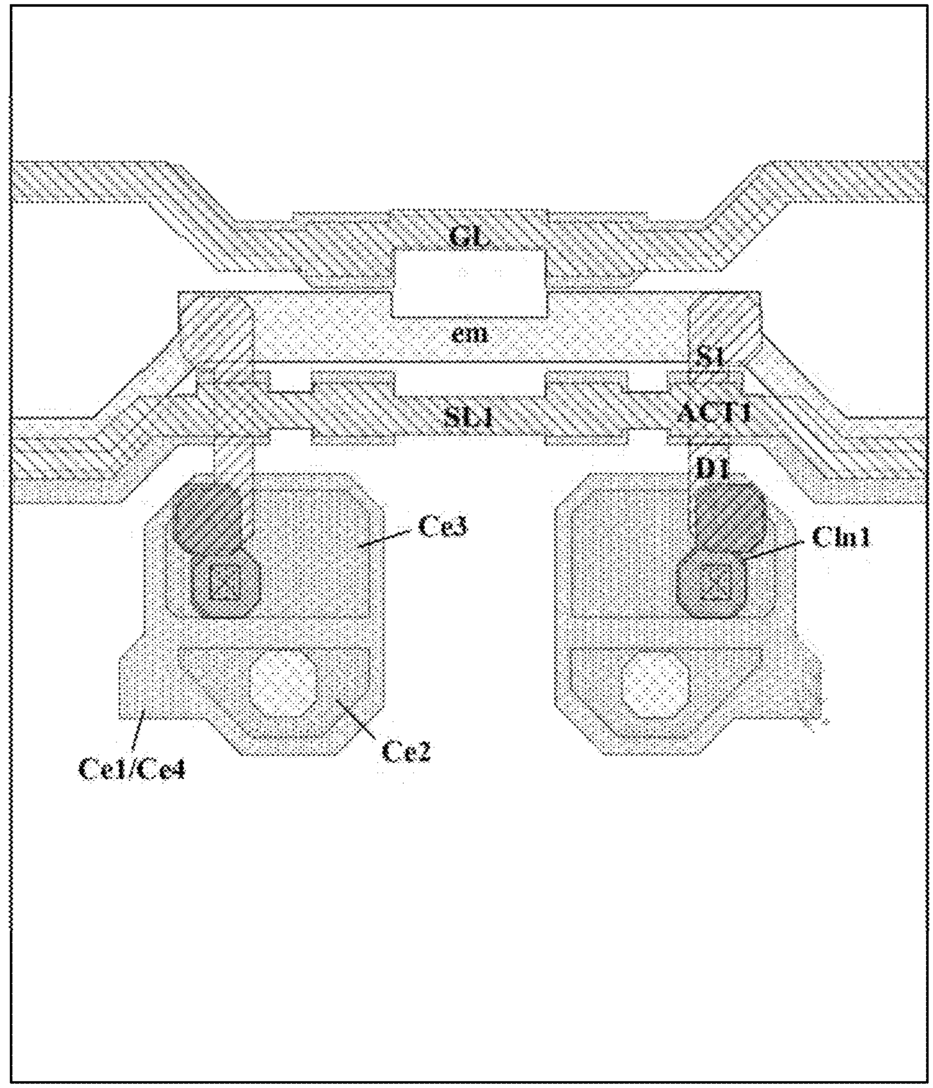
FIG. 13 is a diagram illustrating a layout of a respective gate line with respect to a first node connecting line in the array substrate depicted in FIG. 5A.

FIG. 13 is a diagram illustrating a layout of a respective gate line with respect to a first node connecting line in the array substrate depicted in FIG. 5A. Referring to FIG. 13, in some embodiments, an orthographic projection of the respective gate line on a base substrate is substantially non-overlapping (e.g., at least 80% non-overlapping, at least 90% non-overlapping, at least 95% non-overlapping, at least 99% non-overlapping, or completely non-overlapping) with an orthographic projection of the first node connecting line Cln1 on the base substrate. The parasitic capacitance between the respective gate line of the plurality of gate lines GL and the first node connecting line Cln1 can be minimized. The first node connecting line Cln1 at least partially corresponds to the node N1.

In some embodiments, the orthographic projection of the respective gate line on the base substrate and the orthographic projection of the second capacitor electrode Ce2 of the first capacitor C1 on the base substrate are spaced apart by an orthographic projection of the third capacitor electrode Ce3 of the second capacitor C2 on the base substrate. Optionally, the orthographic projection of the second capacitor electrode Ce2 of the first capacitor C1 on the base substrate is substantially non-overlapping (e.g., at least 80% non-overlapping, at least 90% non-overlapping, at least 95% non-overlapping, at least 99% non-overlapping, or completely non-overlapping) with the orthographic projection of the respective gate line on the base substrate, and is substantially non-overlapping (e.g., at least 80% non-overlapping, at least 90% non-overlapping, at least 95% non-overlapping, at least 99% non-overlapping, or completely non-overlapping) with the orthographic projection of the third capacitor electrode Ce3 of the second capacitor C2 on the base substrate.

In some embodiments, an orthographic projection of the respective gate line on a base substrate is substantially non-overlapping (e.g., at least 80% non-overlapping, at least 90% non-overlapping, at least 95% non-overlapping, at least 99% non-overlapping, or completely non-overlapping) with an orthographic projection of the second electrode D1 of the first reset transistor T1 on the base substrate. Optionally, the orthographic projection of the respective gate line on a base substrate is substantially non-overlapping (e.g., at least 80% non-overlapping, at least 90% non-overlapping, at least 95% non-overlapping, at least 99% non-overlapping, or completely non-overlapping) with an orthographic projection of the active layer ACT1 and the second electrode D1 of the first reset transistor T1 on the base substrate. Optionally, the orthographic projection of the respective gate line on a base substrate is substantially non-overlapping (e.g., at least 80% non-overlapping, at least 90% non-overlapping, at least 95% non-overlapping, at least 99% non-overlapping, or completely non-overlapping) with an orthographic projection of the first electrode S1, the active layer ACT1, and the second electrode D1 of the first reset transistor T1 on the base substrate.

In some embodiments, the orthographic projection of the respective gate line on the base substrate and the orthographic projection of the second capacitor electrode Ce2 of the first capacitor C1 on the base substrate are spaced apart by an orthographic projection of a respective light emitting control signal line of the plurality of light emitting control signal lines em on the base substrate. Optionally, the orthographic projection of the respective light emitting control signal line of the plurality of light emitting control signal lines em on the base substrate is substantially non-overlapping (e.g., at least 80% non-overlapping, at least 90% non-overlapping, at least 95% non-overlapping, at least 99% non-overlapping, or completely non-overlapping) with the orthographic projection of the respective gate line on the base substrate, and is substantially non-overlapping (e.g., at least 80% non-overlapping, at least 90% non-overlapping, at least 95% non-overlapping, at least 99% non-overlapping, or completely non-overlapping) with the orthographic projection of the second capacitor electrode Ce2 of the first capacitor C1 on the base substrate.

In some embodiments, the orthographic projection of the respective gate line on the base substrate and the orthographic projection of the second capacitor electrode Ce2 of the first capacitor C1 on the base substrate are spaced apart by an orthographic projection of a respective first control signal line of the plurality of first control signal lines SL1 on the base substrate. Optionally, the orthographic projection of the respective first control signal line of the plurality of first control signal lines SL1 on the base substrate is substantially non-overlapping (e.g., at least 80% non-overlapping, at least 90% non-overlapping, at least 95% non-overlapping, at least 99% non-overlapping, or completely non-overlapping) with the orthographic projection of the respective gate line on the base substrate, and is substantially non-overlapping (e.g., at least 80% non-overlapping, at least 90% non-overlapping, at least 95% non-overlapping, at least 99% non-overlapping, or completely non-overlapping) with the orthographic projection of the second capacitor electrode Ce2 of the first capacitor C1 on the base substrate.

Referring to FIG. 5A to FIG. 5R, and FIG. 6A to FIG. 6C, in some embodiments, corresponding layers of a first pixel driving circuit (e.g., PDC1 in FIG. 5B) and corresponding layers of a second pixel driving circuit (e.g., PDC2 in FIG. 5B) directly adjacent to each other and in a same row have a substantially mirror symmetry with respect to each other, e.g., about a plane perpendicular to a main surface of the array substrate and substantially parallel to the plurality of data lines.

As used herein, the term "corresponding layers of a first pixel driving circuit and corresponding layers of a second pixel driving circuit" is not intended to include layers that are not parts of the pixel driving circuits. For example, the "corresponding layers of a first pixel driving circuit and corresponding layers of a second pixel driving circuit" do not include an anode layer or a pixel definition layer. In some embodiments, the "corresponding layers of a first pixel driving circuit and corresponding layers of a second pixel driving circuit" do not include a light shielding layer or a first signal line layer. In one example, the "corresponding layers of a first pixel driving circuit and corresponding layers of a second pixel driving circuit" refer to at least one conductive layer of the first pixel driving circuit and conductive layers of a second pixel driving circuit. In one specific example, "corresponding layers" includes at least one of a first semiconductor material layer, a first gate metal layer, a second gate metal layer, a second semiconductor material layer, a third gate metal layer, a first signal line layer, or a second signal line layer. In another specific example, "corresponding layers" further includes at least one of a gate insulating layer, an insulating layer, a first inter-layer dielectric layer, a second inter-layer dielectric layer, a passivation layer, a first planarization layer, or a second planarization layer. In another specific example, "corresponding layers" includes a first semiconductor material layer, a first gate metal layer, a second gate metal layer, a second semiconductor material layer, a third gate metal layer, a first signal line layer, and a second signal line layer. In another specific example, "corresponding layers" further includes a gate insulating layer, an insulating layer, a first inter-layer dielectric layer, a second inter-layer dielectric layer, a passivation layer, a first planarization layer, and a second planarization layer.

Figure 14:
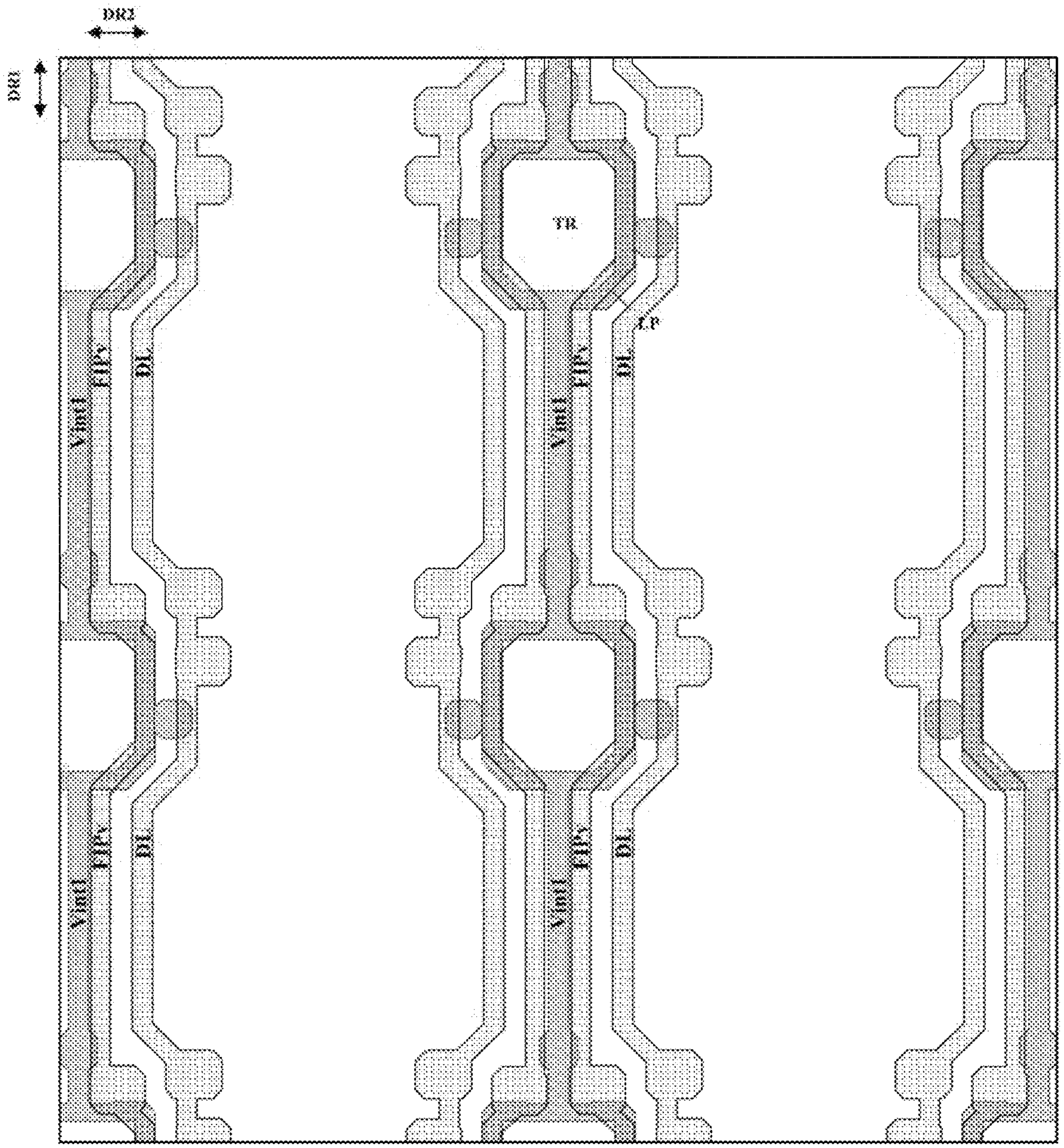
FIG. 14 is a diagram illustrating a layout of a plurality of first reset signal lines with respect to a plurality of second fanout connecting lines and a plurality of data lines in four adjacent pixel driving circuits in a same row in an array substrate in some embodiments according to the present disclosure.

FIG. 14 is a diagram illustrating a layout of a plurality of first reset signal lines with respect to a plurality of second fanout connecting lines and a plurality of data lines in four adjacent pixel driving circuits in a same row in an array substrate in some embodiments according to the present disclosure. Referring to FIG. 14, FIG. 5K, and FIG. 5O, in some embodiments, at least a part of an orthographic projection of a respective first reset signal line of the plurality of first reset signal lines Vint1 on a base substrate spaces apart an orthographic projection of at least a part of a first respective data line of the plurality of data lines DL configured to provide data signals to a first adjacent pixel driving circuit on the base substrate and an orthographic projection of at least a part of a second respective data line of the plurality of data lines DL configured to provide data signals to a second adjacent pixel driving circuit on the base substrate. Optionally, the at least a part of an orthographic projection of a respective first reset signal line of the plurality of first reset signal lines on the base substrate spaces apart an orthographic projection of a second segment of a first respective data line of the plurality of data lines DL configured to provide data signals to a first adjacent pixel driving circuit on the base substrate and an orthographic projection of a second segment of a second respective data line of the plurality of data lines DL configured to provide data signals to a second adjacent pixel driving circuit on the base substrate. Because the respective first reset signal line is provided with a constant voltage, this layout is effective in preventing interference between data signals in two adjacent data lines of the plurality of data lines DL configured to provide data signals to two adjacent pixel driving circuits.

Referring to FIG. 14, FIG. 5K, and FIG. 5O, in some embodiments, at least a part of an orthographic projection of a respective first reset signal line of the plurality of first reset signal lines Vint1 on a base substrate spaces apart an orthographic projection of at least a part of a first adjacent second fanout connecting line of the plurality of second fanout connecting lines FIPv on the base substrate and an orthographic projection of at least a part of a second adjacent second fanout connecting line of the plurality of second fanout connecting lines FIPv on the base substrate. The first adjacent second fanout connecting line and the second adjacent second fanout connecting line adjacent to each other. Optionally, an orthographic projection of a respective loop of the plurality of loops LP on a base substrate at least partially overlaps with the orthographic projection of at least a part of the first adjacent second fanout connecting line of the plurality of second fanout connecting lines FIPv on the base substrate, and at least partially overlaps with the orthographic projection of at least a part of the second adjacent second fanout connecting line of the plurality of second fanout connecting lines FIPv on the base substrate.

Figure 15:
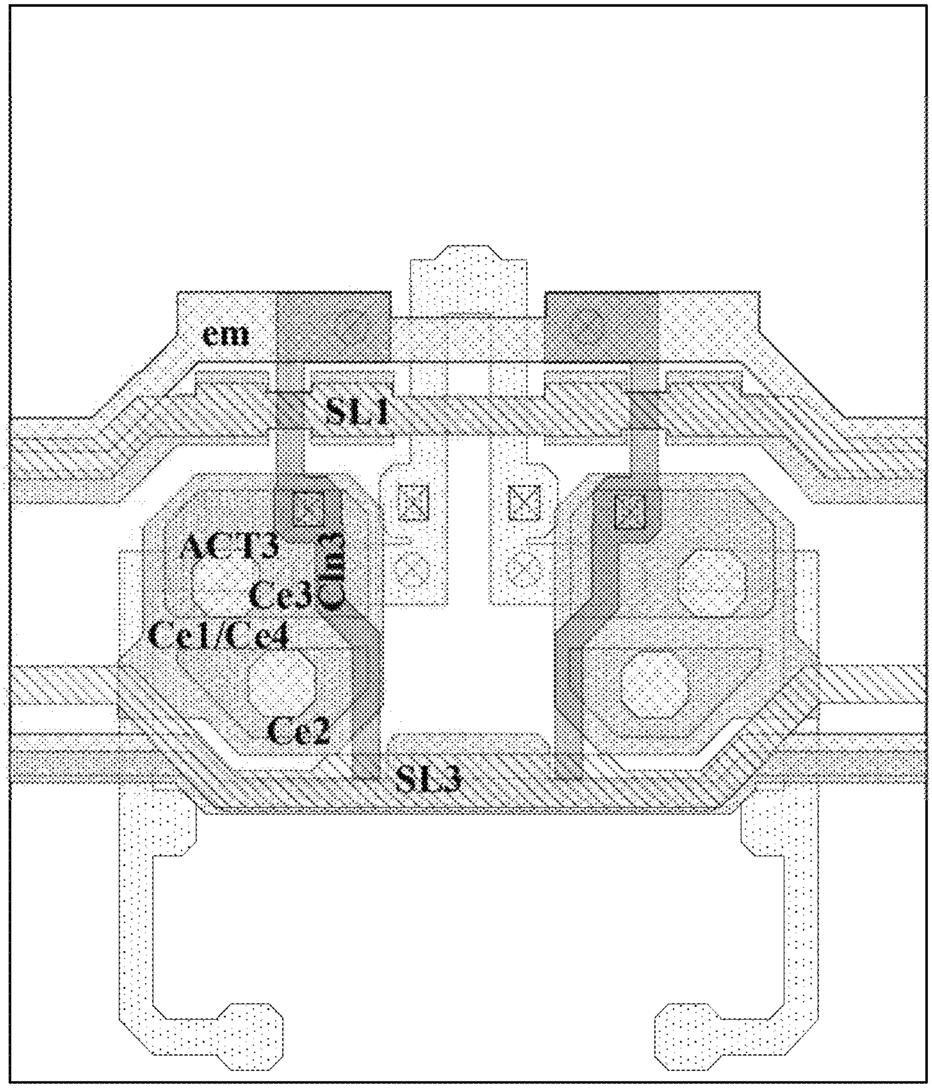
FIG. 15 is a diagram illustrating a layout of a third node connecting line with respect to underlying layers in the array substrate depicted in FIG. 5A.

FIG. 15 is a diagram illustrating a layout of a third node connecting line with respect to underlying layers in the array substrate depicted in FIG. 5A. Referring to FIG. 15, in some embodiments, an orthographic projection of the third node connecting line Cln3 on a base substrate at least partially overlaps with an orthographic projection of the second capacitor electrode Ce2 of the first capacitor C1 on the base substrate. Optionally, an orthographic projection of the third node connecting line Cln3 on a base substrate at least partially overlaps with an orthographic projection of the third capacitor electrode Ce3 of the second capacitor C2 on the base substrate. Optionally, an orthographic projection of the third node connecting line Cln3 on a base substrate at least partially overlaps with an orthographic projection of the first capacitor electrode Ce1 of the first capacitor C1 and/or the fourth capacitor electrode Ce4 of the second capacitor C2 on the base substrate. Optionally, an orthographic projection of the third node connecting line Cln3 on a base substrate at least partially overlaps with an orthographic projection of the active layer ACT3 of the driving transistor on the base substrate. Optionally, an orthographic projection of the third node connecting line Cln3 on a base substrate at least partially overlaps with an orthographic projection of the respective first control signal line of the plurality of first control signal lines SL1 on the base substrate. Optionally, an orthographic projection of the third node connecting line Cln3 on a base substrate at least partially overlaps with an orthographic projection of the respective light emitting control signal line of the plurality of light emitting control signal lines em on the base substrate. Optionally, an orthographic projection of the third node connecting line Cln3 on a base substrate at least partially overlaps with an orthographic projection of the respective third control signal line of the plurality of third control signal lines SL3 on the base substrate.

In some embodiments, the third node connecting line Cln3 crosses over at least one of the respective first control signal line of the plurality of first control signal lines SL1, the active layer ACT3 of the driving transistor, the third capacitor electrode Ce3 of the second capacitor C2, or the first capacitor electrode Ce1 of the first capacitor C1 and/or the fourth capacitor electrode Ce4 of the second capacitor C2. Optionally, the third node connecting line Cln3 crosses over the respective first control signal line of the plurality of first control signal lines SL1, the active layer ACT3 of the driving transistor, the third capacitor electrode Ce3 of the second capacitor C2, and the first capacitor electrode Ce1 of the first capacitor C1 and/or the fourth capacitor electrode Ce4 of the second capacitor C2.

The inventors of the present disclosure discover that, surprisingly and unexpectedly, the array substrate according to the present disclosure is conducive in achieving high luminance display panel with a large driving current. The inventors of the present disclosure discover that the unique structure of the array substrate according to the present disclosure can effectively pull down the voltage level at the node N3 by having an increased parasitic capacitance between the node N3 and the respective third control signal line of the plurality of third control signal lines SL3.

In some embodiments, an overlapping area between the orthographic projection of the third node connecting line Cln3 on the base substrate and an orthographic projection of at least one respective signal line on the base substrate is no greater than a third of an area of the orthographic projection of the third node connecting line on the base substrate. Optionally, an overlapping area between the orthographic projection of the third node connecting line Cln3 on the base substrate and an orthographic projection of the respective light emitting control signal line on the base substrate is no greater than a third of an area of the orthographic projection of the third node connecting line on the base substrate. Optionally, an overlapping area between the orthographic projection of the third node connecting line Cln3 on the base substrate and an orthographic projection of the respective first control signal line on the base substrate is no greater than a third of an area of the orthographic projection of the third node connecting line on the base substrate. Optionally, an overlapping area between the orthographic projection of the third node connecting line Cln3 on the base substrate and an orthographic projection of the respective second control signal line on the base substrate is no greater than a third of an area of the orthographic projection of the third node connecting line on the base substrate. Optionally, an overlapping area between the orthographic projection of the third node connecting line Cln3 on the base substrate and an orthographic projection of the respective third control signal line on the base substrate is no greater than a third of an area of the orthographic projection of the third node connecting line on the base substrate. Optionally, an overlapping area between the orthographic projection of the third node connecting line Cln3 on the base substrate and an orthographic projection of the respective gate line on the base substrate is no greater than a third of an area of the orthographic projection of the third node connecting line on the base substrate.

In some embodiments, an overlapping area between an orthographic projection of the third capacitor electrode Ce3 on the base substrate and an orthographic projection of at least one respective signal line on the base substrate is no greater than a third of an area of the orthographic projection of the third capacitor electrode Ce3 on the base substrate. Optionally, an overlapping area between the orthographic projection of the third capacitor electrode Ce3 on the base substrate and an orthographic projection of the respective light emitting control signal line on the base substrate is no greater than a third of an area of the orthographic projection of the third node connecting line on the base substrate. Optionally, an overlapping area between the orthographic projection of the third capacitor electrode Ce3 on the base substrate and an orthographic projection of the respective first control signal line on the base substrate is no greater than a third of an area of the orthographic projection of the third node connecting line on the base substrate, Optionally, an overlapping area between the orthographic projection of the third capacitor electrode Ce3 on the base substrate and an orthographic projection of the respective second control signal line on the base substrate is no greater than a third of an area of the orthographic projection of the third node connecting line on the base substrate. Optionally, an overlapping area between the orthographic projection of the third capacitor electrode Ce3 on the base substrate and an orthographic projection of the respective third control signal line on the base substrate is no greater than a third of an area of the orthographic projection of the third node connecting line on the base substrate. Optionally, an overlapping area between the orthographic projection of the third capacitor electrode Ce3 on the base substrate and an orthographic projection of the respective gate line on the base substrate is no greater than a third of an area of the orthographic projection of the third node connecting line on the base substrate. The inventors of the present disclosure discover that, by having this structure, it can be ensured that the potential at the node N1 will not be pulled too high.

In some embodiments, an overlapping area between an orthographic projection of the unitary structure comprising the first capacitor electrode Ce1 and the fourth capacitor electrode Ce4 on the base substrate and an orthographic projection of at least one respective signal line on the base substrate is no greater than a third of an area of the orthographic projection of the unitary structure comprising the first capacitor electrode Ce1 and the fourth capacitor electrode Ce4 on the base substrate. Optionally, an overlapping area between the orthographic projection of the unitary structure comprising the first capacitor electrode Ce1 and the fourth capacitor electrode Ce4 on the base substrate and an orthographic projection of the respective light emitting control signal line on the base substrate is no greater than a third of an area of the orthographic projection of the third node connecting line on the base substrate. Optionally, an overlapping area between the orthographic projection of the unitary structure comprising the first capacitor electrode Ce1 and the fourth capacitor electrode Ce4 on the base substrate and an orthographic projection of the respective first control signal line on the base substrate is no greater than a third of an area of the orthographic projection of the third node connecting line on the base substrate. Optionally, an overlapping area between the orthographic projection of the unitary structure comprising the first capacitor electrode Ce1 and the fourth capacitor electrode Ce4 on the base substrate and an orthographic projection of the respective second control signal line on the base substrate is no greater than a third of an area of the orthographic projection of the third node connecting line on the base substrate. Optionally, an overlapping area between the orthographic projection of the unitary structure comprising the first capacitor electrode Ce1 and the fourth capacitor electrode Ce4 on the base substrate and an orthographic projection of the respective third control signal line on the base substrate is no greater than a third of an area of the orthographic projection of the third node connecting line on the base substrate. Optionally, an overlapping area between the orthographic projection of the unitary structure comprising the first capacitor electrode Ce1 and the fourth capacitor electrode Ce4 on the base substrate and an orthographic projection of the respective gate line on the base substrate is no greater than a third of an area of the orthographic projection of the third node connecting line on the base substrate. The inventors of the present disclosure discover that, by having this structure, it can be ensured that the potential at the node N3 will not be pulled too high.

Figure 16:
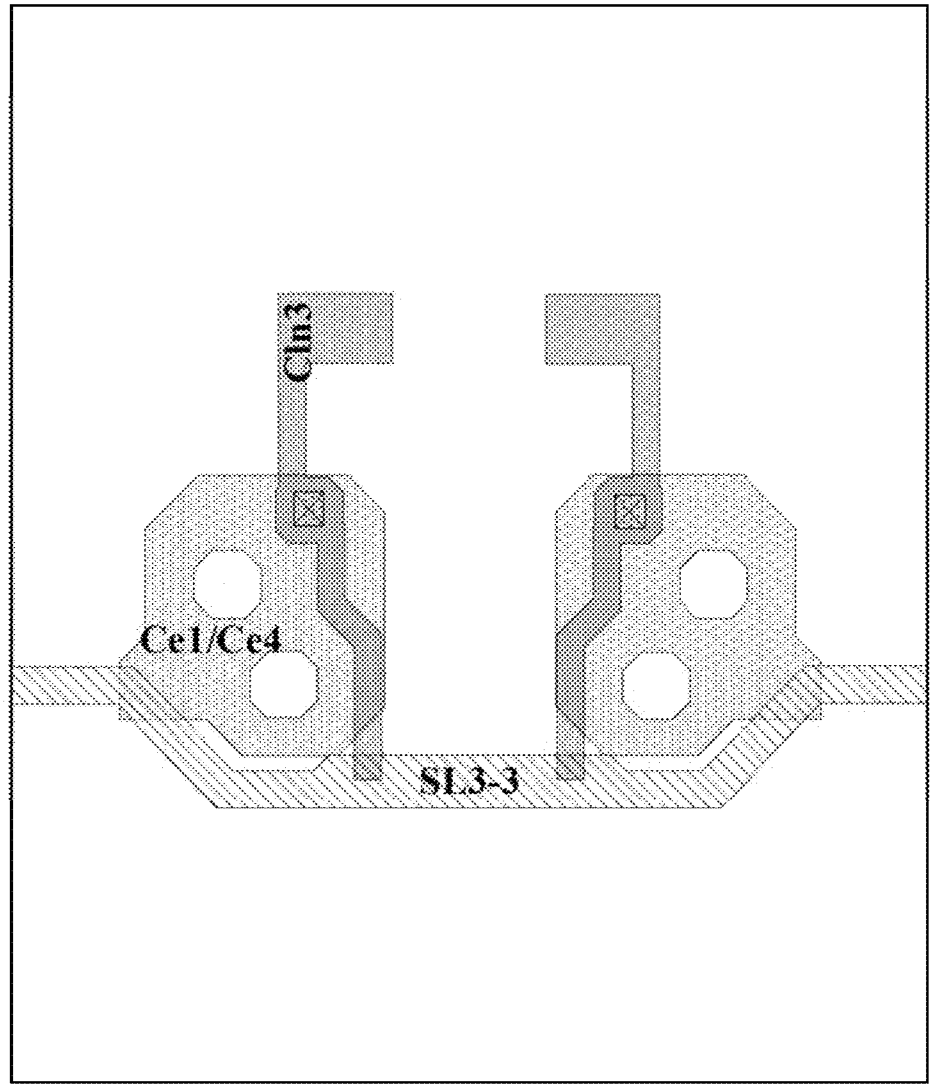
FIG. 16 is a diagram illustrating a layout of a third node connecting line with respect to a respective third control signal line third branch, a first capacitor electrode, and a fourth capacitor electrode in the array substrate depicted in FIG. 5A.

FIG. 16 is a diagram illustrating a layout of a third node connecting line with respect to a respective third control signal line third branch, a first capacitor electrode, and a fourth capacitor electrode in the army substrate depicted in FIG. 5A. Referring to FIG. 16, in some embodiments, an orthographic projection of the third node connecting line Cln3 on a base substrate at least partially overlaps with an orthographic projection of the respective third control signal line on the base substrate. Optionally, the orthographic projection of the third node connecting line Cln3 on the base substrate at least partially overlaps with an orthographic projection of the respective third control signal line third branch SL3-3 on the base substrate. Optionally, the third node connecting line Cln3 crosses over at least one of the respective first control signal line of the plurality of first control signal lines SL1, the active layer ACT3 of the driving transistor, the third capacitor electrode Ce3 of the second capacitor C2, or the first capacitor electrode Ce1 of the first capacitor C1 and/or the fourth capacitor electrode Ce4 of the second capacitor C2; and the orthographic projection of the third node connecting line Cln3 on the base substrate at least partially overlaps with an orthographic projection of the respective third control signal line third branch SL3-3 on the base substrate. Optionally, the third node connecting line Cln3 crosses over the respective first control signal line of the plurality of first control signal lines SL1, the active layer ACT3 of the driving transistor, the third capacitor electrode Ce3 of the second capacitor C2, and the first capacitor electrode Ce1 of the first capacitor C1 and/or the fourth capacitor electrode Ce4 of the second capacitor C2; and the orthographic projection of the third node connecting line Cln3 on the base substrate at least partially overlaps with an orthographic projection of the respective third control signal line third branch SL3-3 on the base substrate. By having the node connecting line Cln3 crosses over multiple components of the pixel driving circuit, and having the orthographic projection of the third node connecting line Cln3 on the base substrate at least partially overlapping with an orthographic projection of the respective third control signal line third branch SL3-3 on the base substrate, the parasitic capacitance between the node N3 and the respective third control signal line of the plurality of third control signal lines SL3 can be effectively increased, leading to a larger driving current and a display panel having higher luminance.

Because the third node connecting line Cln3 is connected to the first capacitor electrode Ce1 of the first capacitor C1 and/or the fourth capacitor electrode Ce4 of the second capacitor C2, the inventors of the present disclosure discover that, by increasing the parasitic capacitance between the respective third control signal line and the first capacitor electrode Ce1 of the first capacitor C1 and/or the fourth capacitor electrode Ce4 of the second capacitor C2, the voltage level at the node N3 can be further pulled down, further enhancing the display quality.

Referring to FIG. 16, in some embodiments, an orthographic projection of the first capacitor electrode Ce1 of the first capacitor C1 and/or the fourth capacitor electrode Ce4 of the second capacitor C2 on a base substrate at least partially overlaps with an orthographic projection of the respective third control signal line on the base substrate. Optionally, the orthographic projection of the first capacitor electrode Ce1 of the first capacitor C1 and/or the fourth capacitor electrode Ce4 of the second capacitor C2 on the base substrate at least partially overlaps with an orthographic projection of the respective third control signal line third branch SL3-3 on the base substrate.

Figure 17:
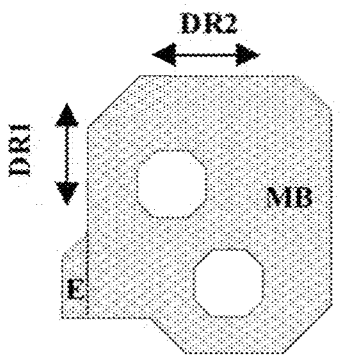
FIG. 17 is a diagram illustrating the structure of a unitary structure comprising a first capacitor electrode of a first capacitor and a fourth capacitor electrode of a second capacitor in some embodiments according to the present disclosure.

FIG. 17 is a diagram illustrating the structure of a unitary structure comprising a first capacitor electrode of a first capacitor and a fourth capacitor electrode of a second capacitor in some embodiments according to the present disclosure. Referring to FIG. 17, the unitary structure in some embodiments includes a main body MB and an extension E extending away from the main body MB, e.g., along a second direction DR2. In some embodiments, referring to FIG. 16 and FIG. 17, an orthographic projection of the respective third control signal line third branch SL3-3 on a base substrate at least partially overlaps with an orthographic projection of the extension E on the base substrate. Optionally, an orthographic projection of the respective third control signal line third branch SL3-3 on the base substrate further at least partially overlaps with an orthographic projection of the main body MB on the base substrate.

Figure 18:
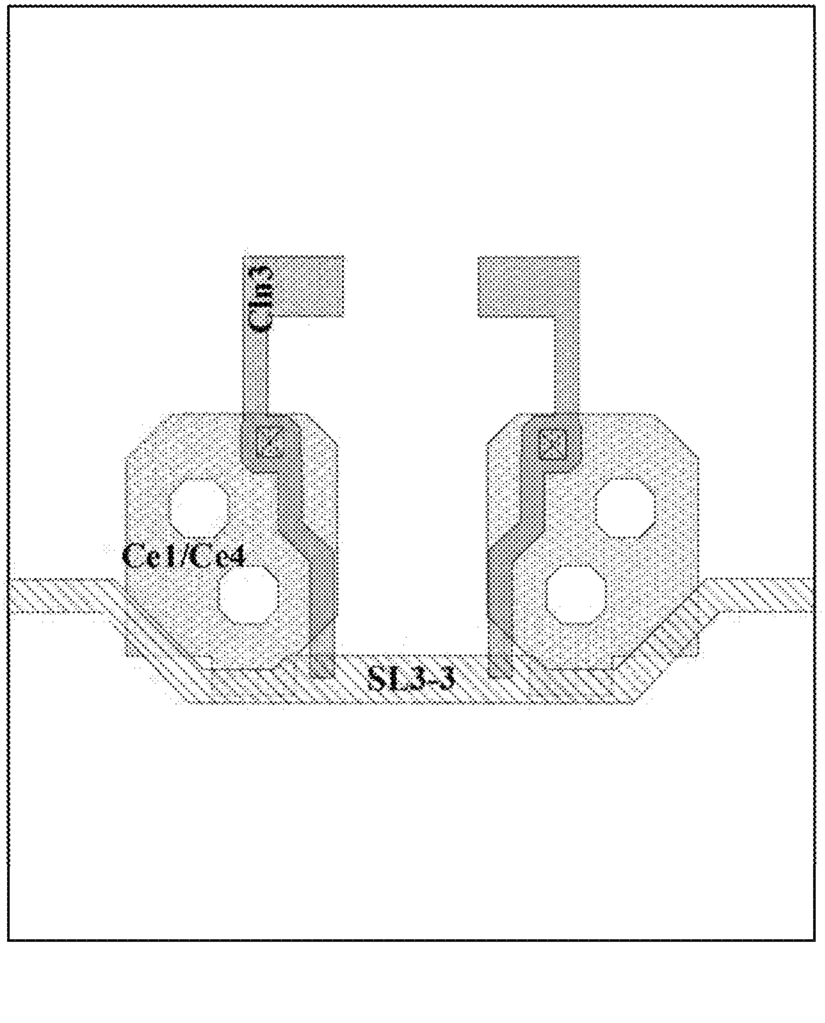
FIG. 18 is a diagram illustrating a layout of a third node connecting line with respect to a respective third control signal line third branch, a first capacitor electrode, and a fourth capacitor electrode in the array substrate depicted in FIG. 5A.
Figure 19:
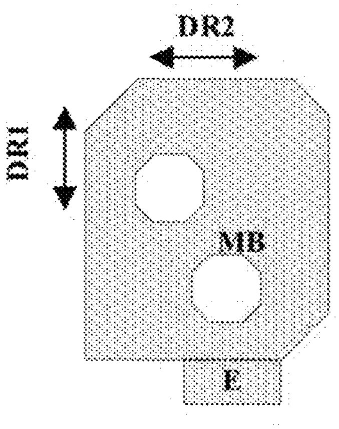
FIG. 19 is a diagram illustrating the structure of a unitary structure comprising a first capacitor electrode of a first capacitor and a fourth capacitor electrode of a second capacitor in some embodiments according to the present disclosure.

FIG. 18 is a diagram illustrating a layout of a third node connecting line with respect to a respective third control signal line third branch, a first capacitor electrode, and a fourth capacitor electrode in the array substrate depicted in FIG. 5A. FIG. 19 is a diagram illustrating the structure of a unitary structure comprising a first capacitor electrode of a first capacitor and a fourth capacitor electrode of a second capacitor in some embodiments according to the present disclosure. Referring to FIG. 18 and FIG. 19, in some embodiments, the unitary structure in some embodiments includes a main body MB and an extension E extending away from the main body MB, e.g., along a first direction DR1. In some embodiments, referring to FIG. 18 and FIG. 19, an orthographic projection of the respective third control signal line third branch SL3-3 on a base substrate at least partially overlaps with an orthographic projection of the extension E on the base substrate. Optionally, an orthographic projection of the respective third control signal line third branch SL3-3 on the base substrate further at least partially overlaps with an orthographic projection of the main body MB on the base substrate.

The inventors of the present disclosure further discover that an increased parasitic capacitance between the node N3 and the respective light emitting control signal line of the plurality of light emitting control signal lines em can further effectively pull down the voltage level at the node N3, thereby achieving high luminance display panel with a large driving current. Referring to FIG. 15, in some embodiments, an orthographic projection of the third node connecting line Cln3 on a base substrate at least partially overlaps with an orthographic projection of the respective light emitting control signal line of the plurality of light emitting control signal lines em on the base substrate.

Figure 20:
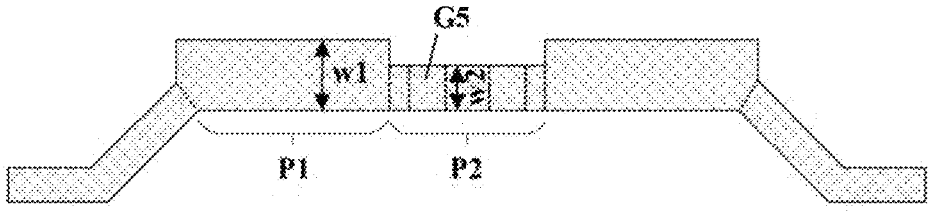
FIG. 20 is a diagram illustrating the structure of a respective light emitting control signal line in some embodiments according to the present disclosure.

FIG. 20 is a diagram illustrating the structure of a respective light emitting signal control line in some embodiments according to the present disclosure. Referring to FIG. 20, the respective light emitting control signal line in some embodiments includes a first portion P1 and a second portion P2 connected to each other. Optionally, the first portion P1 has a first average line width w1, e.g., an average width along a direction substantially parallel to the first direction DR1. Optionally, the second portion P2 has a second average line width w2, e.g., an average width along a direction substantially parallel to the first direction DR1. Optionally, the first average line width w1 is greater than the second average line width w2. By having an increased first average line width as compared to the second average line width, the parasitic capacitance between the node N3 and the respective light emitting control signal line can be increased.

In some embodiments, referring to FIG. 15, FIG. 20, an orthographic projection of the first portion P1 on a base substrate at least partially overlaps with an orthographic projection of the third node connecting line Cln3 on the base substrate; and an orthographic projection of the second portion P2 on the base substrate is non-overlapping with the orthographic projection of the third node connecting line Cln3 on the base substrate. Optionally, the second portion P2 includes a gate electrode G5 of the light emitting control transistor. Optionally, the first portion P1 does not include any portion of the gate electrode G5 of the light emitting control transistor.

The inventors of the present disclosure further discover that, surprisingly and unexpectedly, a decreased parasitic capacitance between the node N3 and the respective first control signal line of the plurality of first control signal lines SL1 can significantly enhance display uniformity. The inventors of the present disclosure discover that the intricate structure of the array substrate according to the present disclosure is conductive to reduce parasitic capacitance between the node N3 and the respective first control signal line of the plurality of first control signal lines SL1, Referring to FIG. 15, in some embodiments, an orthographic projection of the third node connecting line Cln3 on a base substrate at least partially overlaps with an orthographic projection of the respective first control signal line of the plurality of first control signal lines SL1 on the base substrate.

Figure 21:
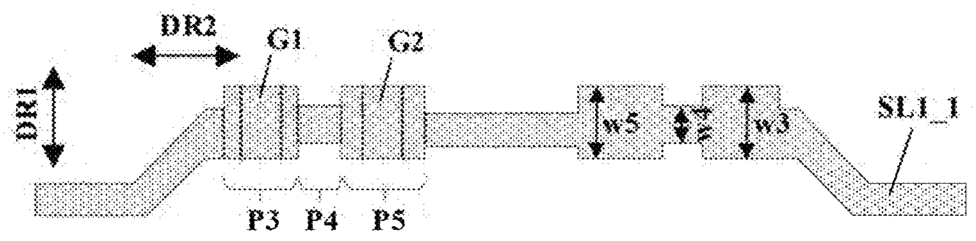
FIG. 21 is a diagram illustrating the structure of a respective first control line first branch in some embodiments according to the present disclosure.

FIG. 21 is a diagram illustrating the structure of a respective first control line first branch in some embodiments according to the present disclosure. Referring to FIG. 21, the respective first control line first branch SL1_1 in some embodiments includes a third portion P3, a fourth portion P4, and a fifth portion P5 connected to each other. Optionally, the third portion P3 has a third average line width w3, e.g., an average width along a direction substantially parallel to the first direction DR1. Optionally, the fourth portion P4 has a fourth average line width w4, e.g., an average width along a direction substantially parallel to the first direction DR1. Optionally, the fifth portion P5 has a fifth average line width w5, e.g., an average width along a direction substantially parallel to the first direction DR1. Optionally, the third average line width w3 is greater than the fourth average line width w4. Optionally, the fifth average line width w5 is greater than the fourth average line width w4. By having a reduced fourth average line width as compared to the third average line width w3 or the fifth average line width w5, the parasitic capacitance between the node N3 and the respective first control line first branch SL1_1 can be decreased.

In some embodiments, referring to FIG. 15, FIG. 21, an orthographic projection of the fourth portion P4 on a base substrate at least partially overlaps with an orthographic projection of the third node connecting line Cln3 on the base substrate; an orthographic projection of the third portion P3 on the base substrate is non-overlapping with the orthographic projection of the third node connecting line Cln3 on the base substrate; and an orthographic projection of the fifth portion P5 on the base substrate is non-overlapping with the orthographic projection of the third node connecting line Cln3 on the base substrate Optionally, the third portion P3 includes at least a portion of a gate electrode G1 of the first reset transistor. Optionally, the fifth portion P5 includes at least a portion of a gate electrode G2 of the compensating transistor. The fourth portion P4 does not include any portion of the gate electrode G1 of the first reset transistor or the gate electrode G2 of the compensating transistor.

Figure 22:
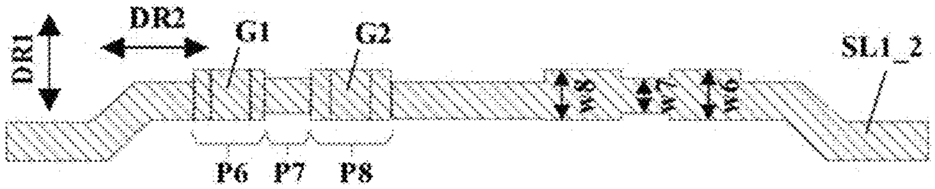
FIG. 22 is a diagram illustrating the structure of a respective first control line second branch in some embodiments according to the present disclosure.

FIG. 22 is a diagram illustrating the structure of a respective first control line second branch in some embodiments according to the present disclosure. Referring to FIG. 22, the respective first control line second branch SL1_2 in some embodiments includes a sixth portion P6, a seventh portion P7, and an eighth portion P8 connected to each other. Optionally, the sixth portion P6 has a sixth average line width w6, e.g., an average width along a direction substantially parallel to the first direction DR1. Optionally, the seventh portion P7 has a seventh average line width w7, e.g., an average width along a direction substantially parallel to the first direction DR1. Optionally, the eighth portion P8 has an eighth average line width w8; e.g., an average width along a direction substantially parallel to the first direction DR1. Optionally, the sixth average line width w6 is greater than the seventh average line width w7. Optionally, the eighth average line width w8 is greater than the seventh average line width w7. By having a reduced seventh average line width as compared to the sixth average line width w6 or the eighth average line width w8, the parasitic capacitance between the node N3 and the respective first control line second branch SL1_2 can be decreased.

In some embodiments, referring to FIG. 15, FIG. 22, an orthographic projection of the seventh portion P7 on a base substrate at least partially overlaps with an orthographic projection of the third node connecting line Cln3 on the base substrate; an orthographic projection of the sixth portion P6 on the base substrate is non-overlapping with the orthographic projection of the third node connecting line Cln3 on the base substrate; and an orthographic projection of the eighth portion P8 on the base substrate is non-overlapping with the orthographic projection of the third node connecting line Cln3 on the base substrate. Optionally, the sixth portion P6 includes at least a portion of a gate electrode G1 of the first reset transistor. Optionally, the eighth portion P8 includes at least a portion of a gate electrode G2 of the compensating transistor. The seventh portion P7 does not include any portion of the gate electrode G1 of the first reset transistor or the gate electrode G2 of the compensating transistor.

To accommodate the third node connecting line, the array substrate according to the present disclosure adopts an intricate structure that allows spaces for the third node connecting line to cross over multiple components of the pixel driving circuit to partially overlaps with the respective third control signal line. Referring to FIG. 5A to FIG. 5R, and FIG. 6A to FIG. 6C, in some embodiments, the first electrode S3 of the driving transistor T3 and the second electrode D5 of the light emitting control transistor T5 are parts of a unitary structure, and the first electrode S2 of the compensating transistor T2 and the second electrode D6 of the third reset transistor T6 are parts of a unitary structure. By having these two unitary structures, only two vias are needed for forming the node N2. For example, the second node connecting line Cln2 is connected to the second electrode D5 of the light emitting control transistor T5 and the first electrode S3 of the driving transistor T3 through a third via v3, and connected to the second electrode D6 of the third reset transistor T6 and the first electrode S2 of the compensating transistor T2 through a fourth via v4, A total length of the second node connecting line Cln2 is shortened to allow space for disposition of the third node connecting line Cln3. In some embodiments, a virtual extension of the third capacitor electrode Ce3 of the second capacitor C2 along the second direction DR2 crosses over the second node connecting line Cln2, whereas a virtual extension of the second capacitor electrode Ce2 of the first capacitor C1 does not cross over the second node connecting line Cln2. Optionally, at least a portion of the third node connecting line Cln3 spaces apart the second node connecting line Cln2 from the second capacitor electrode Ce2 of the first capacitor CL.

Figure 23A:
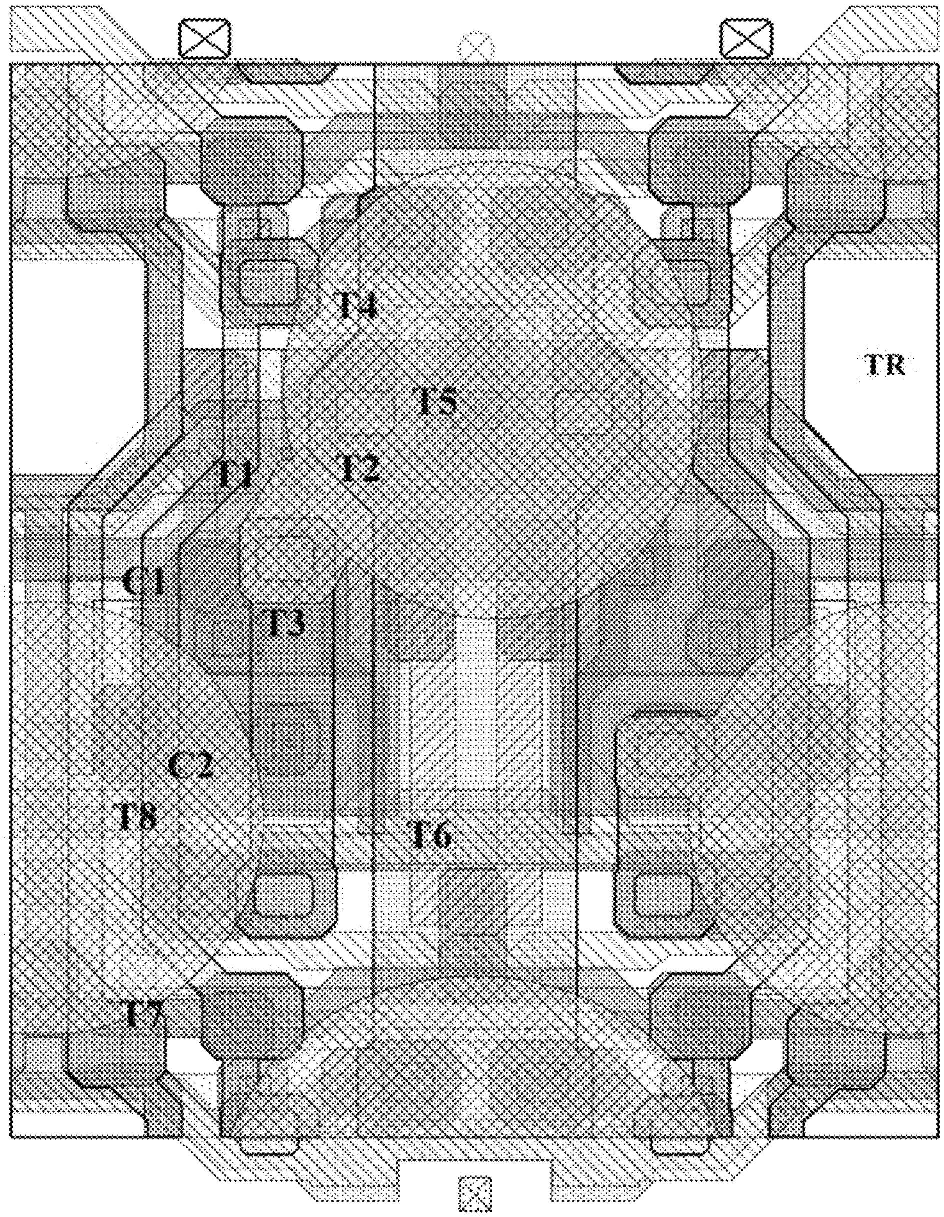
FIG. 23A is a diagram illustrating the structure of pixel driving circuits in an array substrate in some embodiments according to the present disclosure.
Figure 23B:
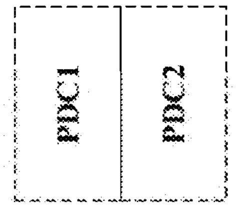
FIG. 23B is a schematic diagram illustrating an arrangement of pixel driving circuits in the array substrate depicted in FIG. 23A.
Figure 23C:
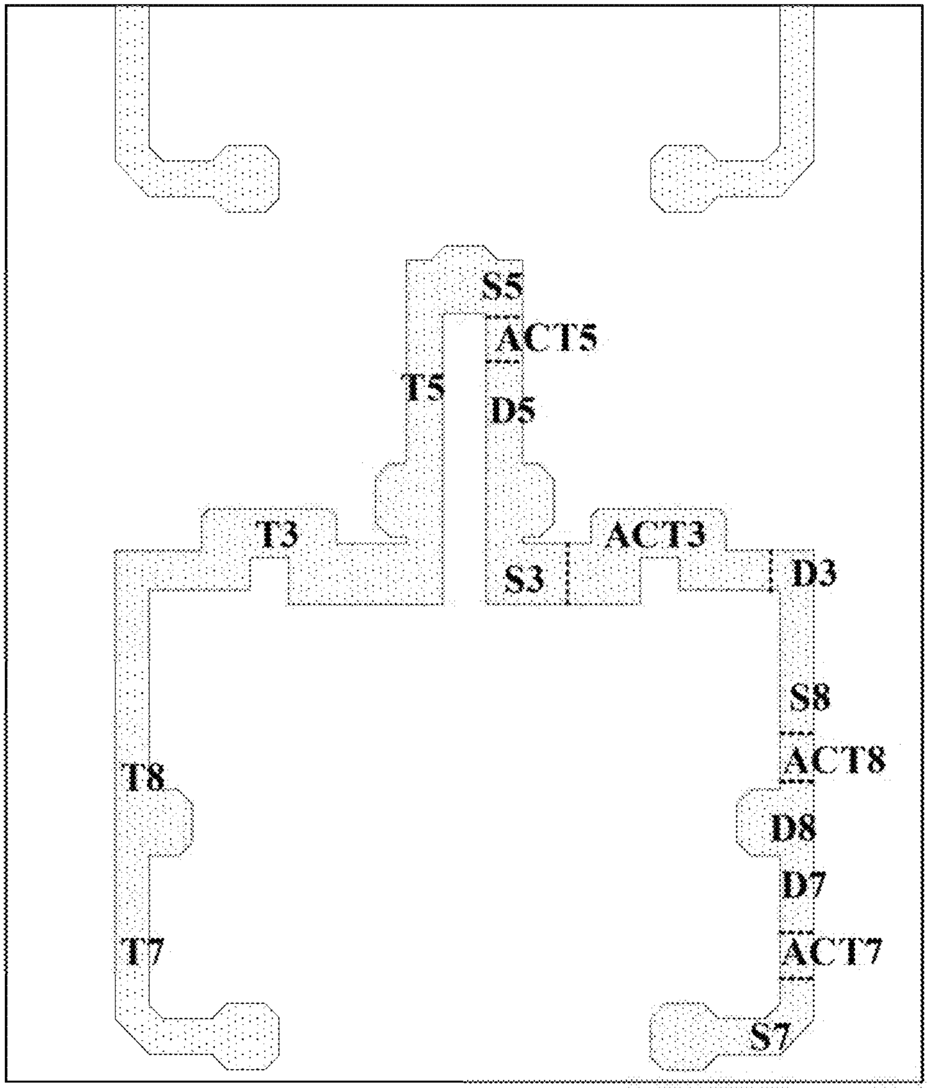
FIG. 23C is a diagram illustrating the structure of a first semiconductor material layer in the array substrate depicted in FIG. 23A.
Figure 23D:
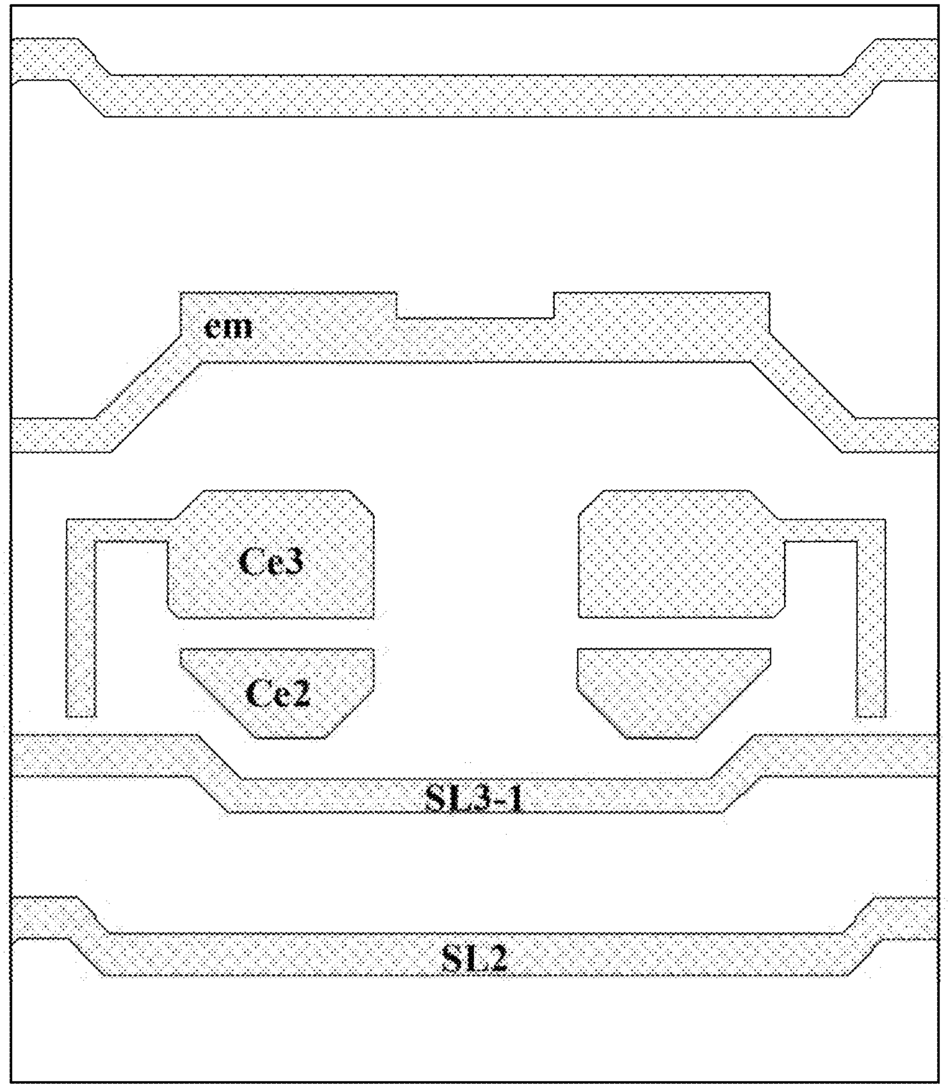
FIG. 23D is a diagram illustrating the structure of a first gate metal layer in the array substrate depicted in FIG. 23A.
Figure 23E:
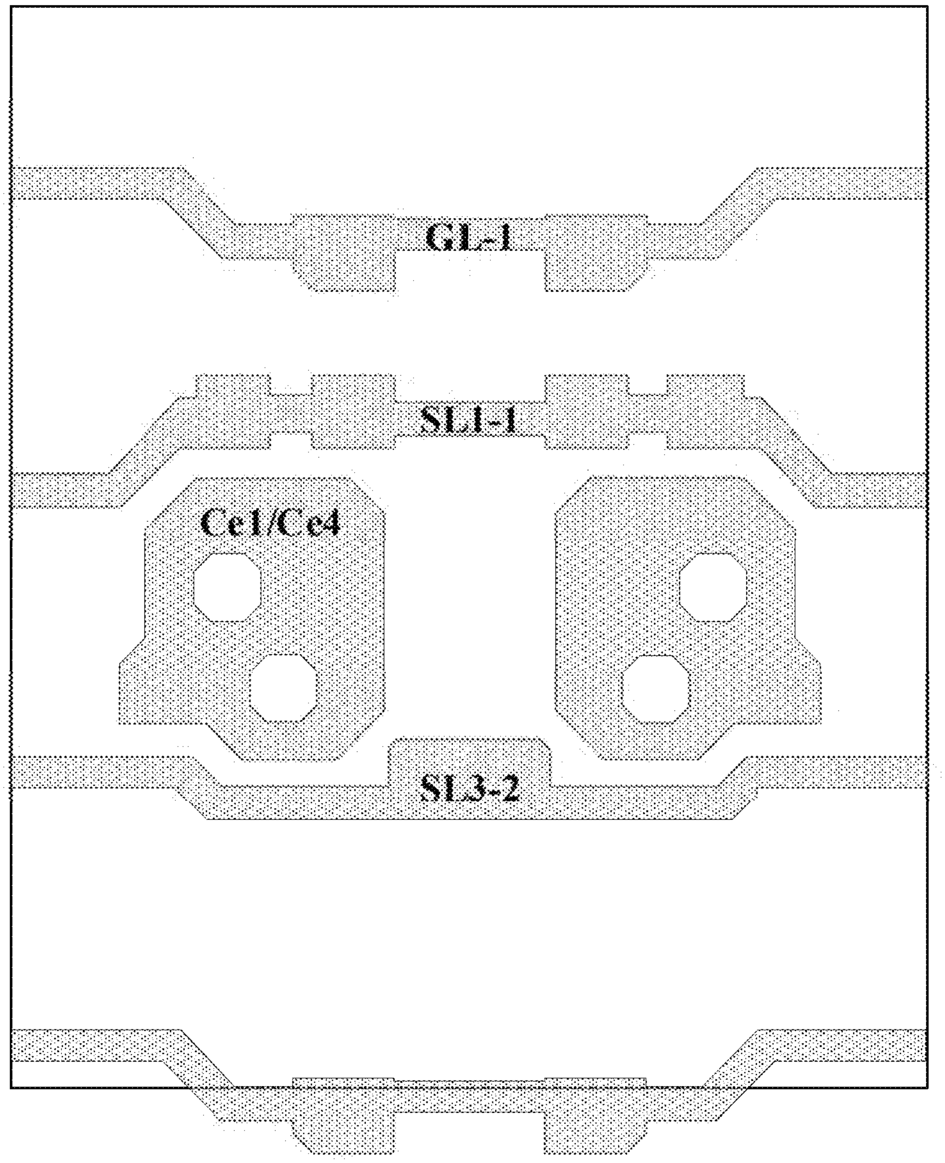
FIG. 23E is a diagram illustrating the structure of a second gate metal layer in the array substrate depicted in FIG. 23A.
Figure 23F:
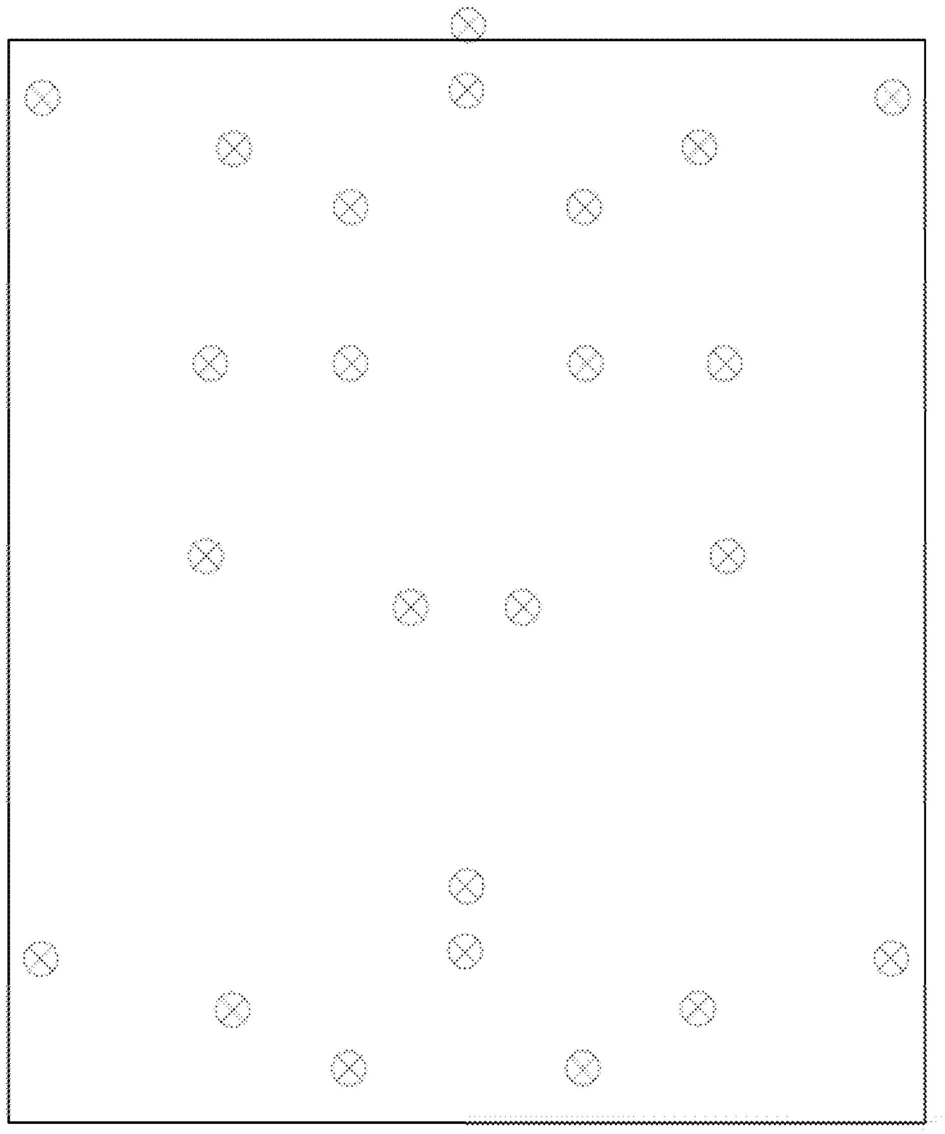
FIG. 23F is a diagram illustrating vias extending through a first inter-layer dielectric layer in the array substrate depicted in FIG. 23A.
Figure 23G:
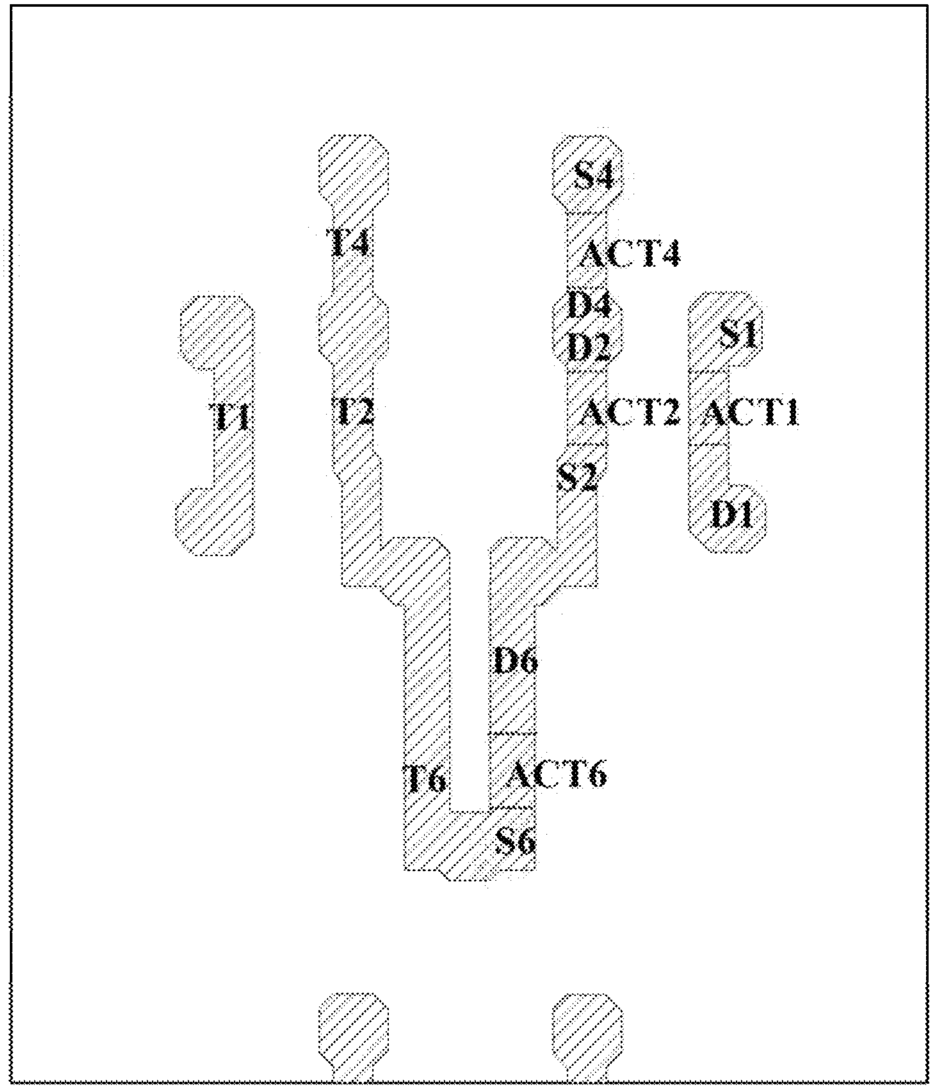
FIG. 23G is a diagram illustrating the structure of a second semiconductor material layer in the array substrate depicted in FIG. 23A.
Figure 23H:
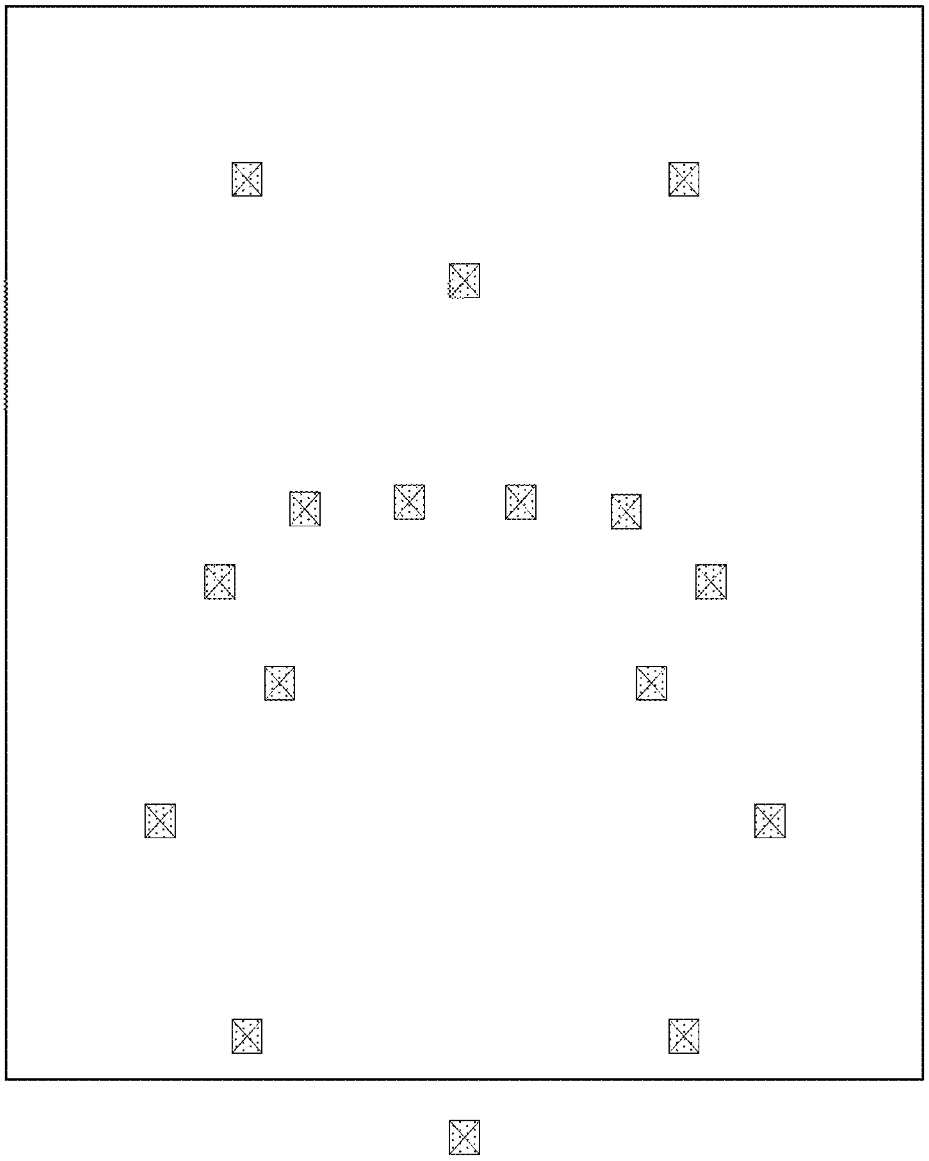
FIG. 23H is a diagram illustrating vias extending through a second inter-layer dielectric layer in the array substrate depicted in FIG. 23A.
Figure 23I:
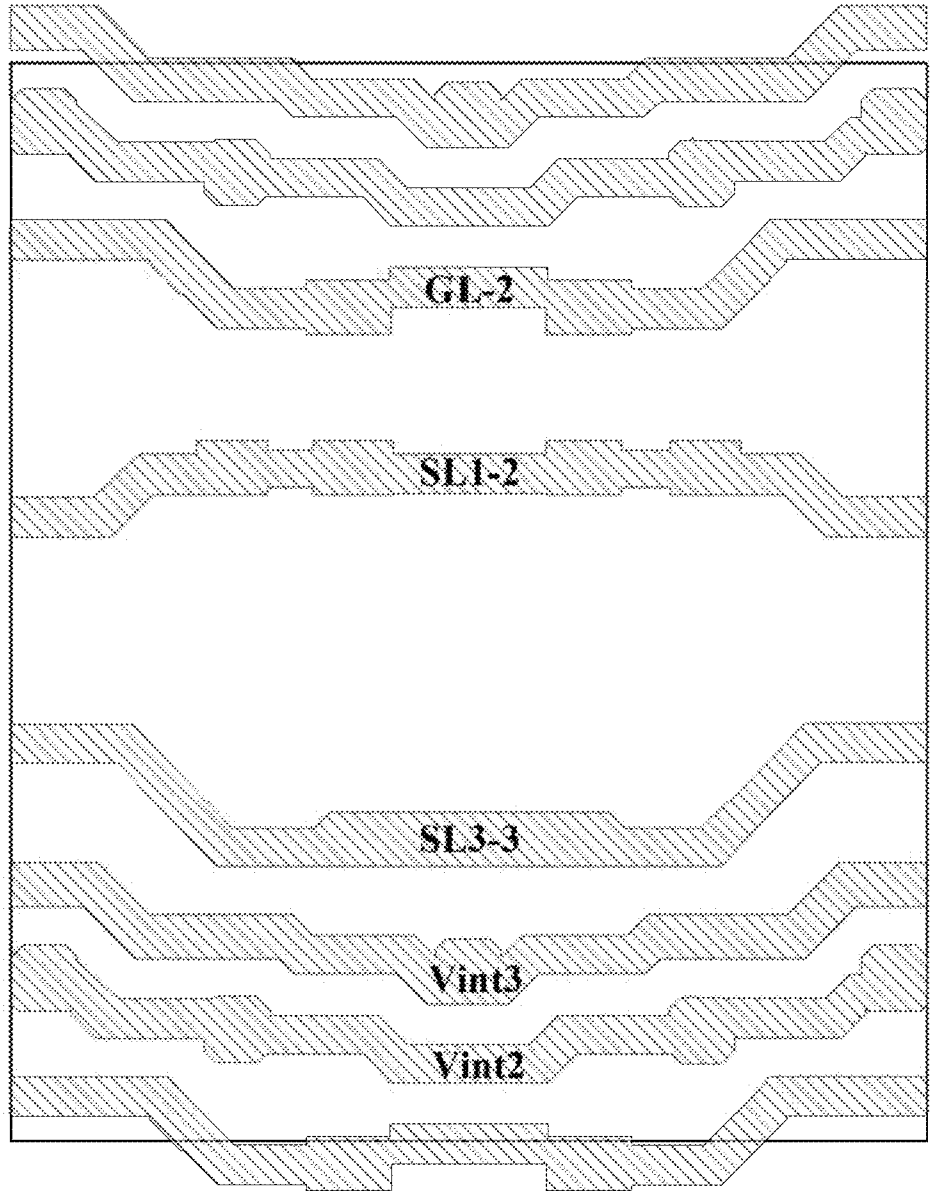
FIG. 23I is a diagram illustrating the structure of a third gate metal layer in the array substrate depicted in FIG. 23A.
Figure 23J:
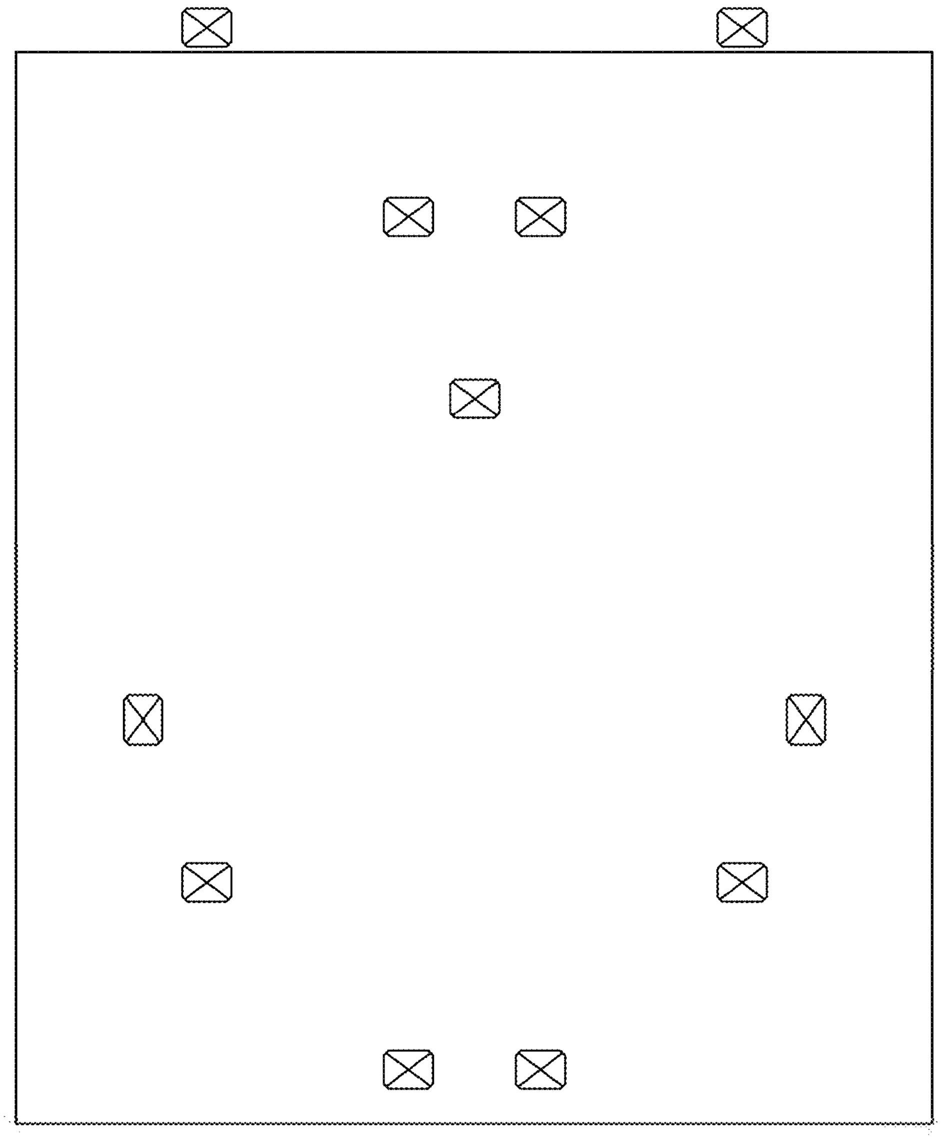
FIG. 23J is a diagram illustrating vias extending through a passivation layer in the array substrate depicted in FIG. 23A.
Figure 23K:
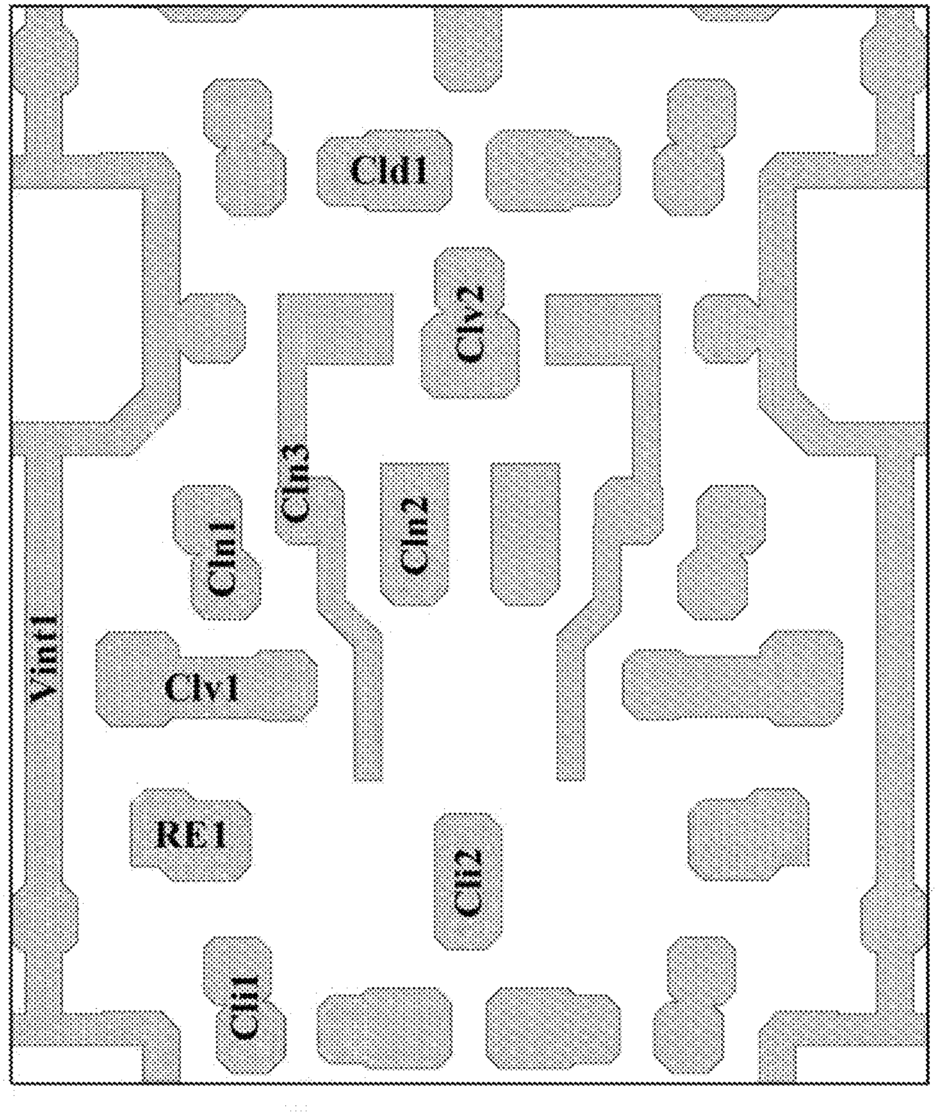
FIG. 23K is a diagram illustrating the structure of a first signal line layer in the array substrate depicted in FIG. 23A.
Figure 23L:
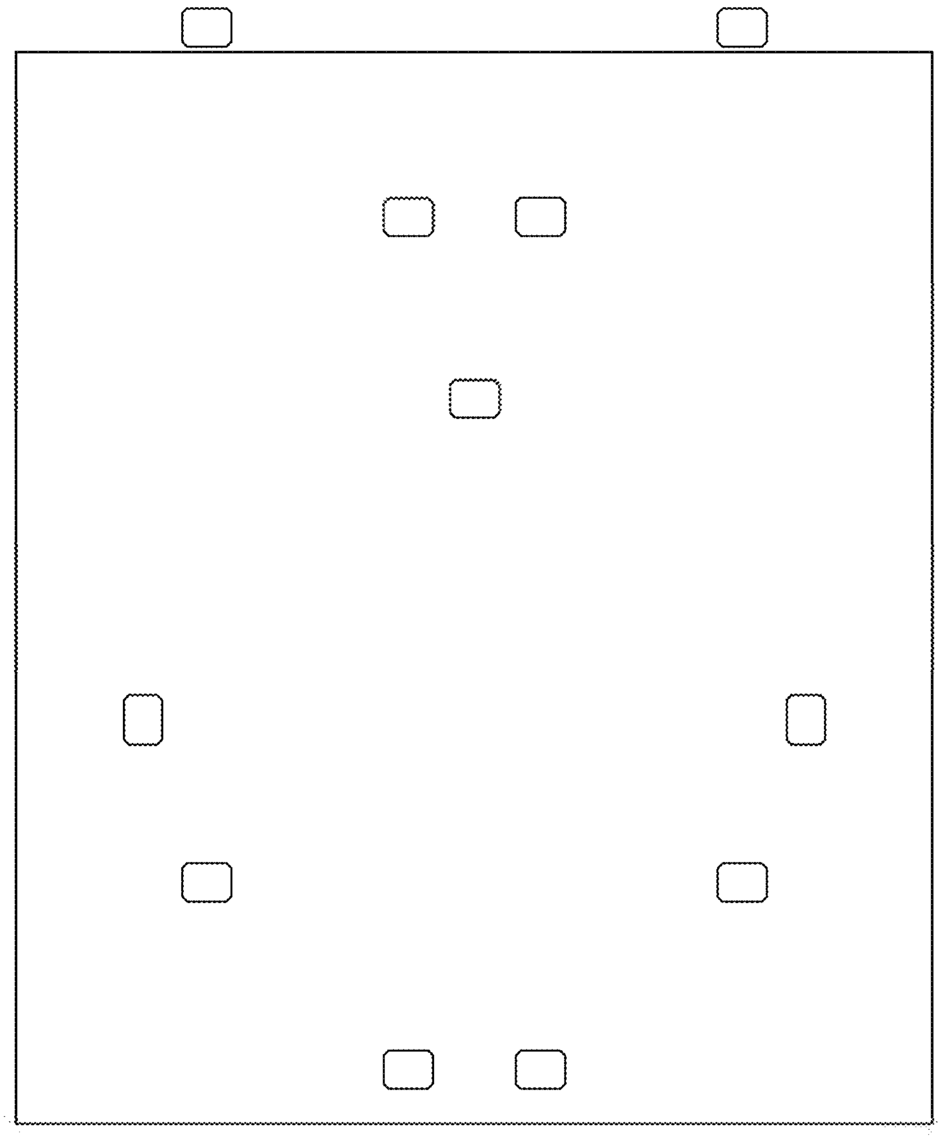
FIG. 23L is a diagram illustrating vias extending through a first planarization layer in the array substrate depicted in FIG. 23A.
Figure 23M:
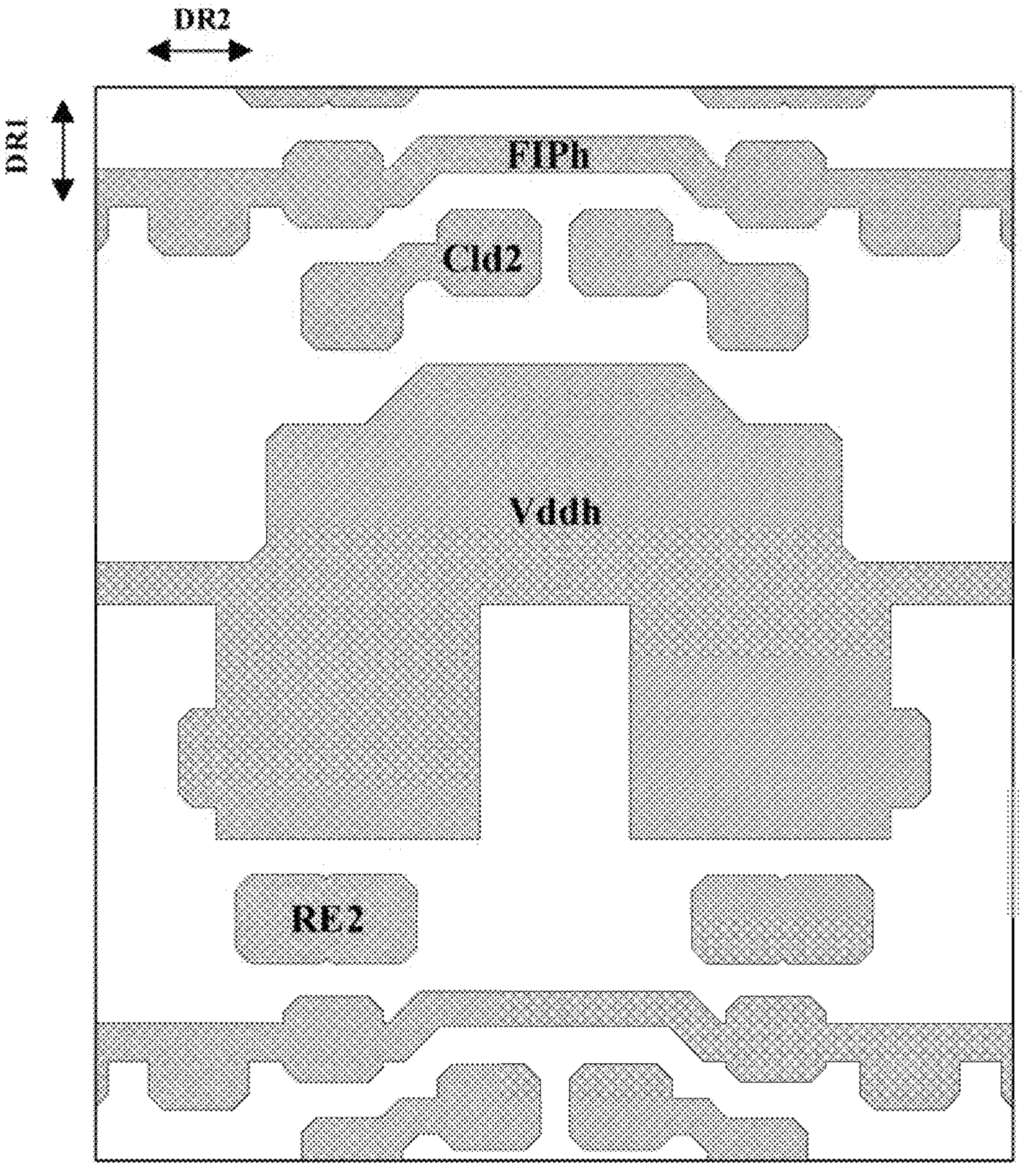
FIG. 23M is a diagram illustrating the structure of a second signal line layer in the array substrate depicted in FIG. 23A.
Figure 23N:
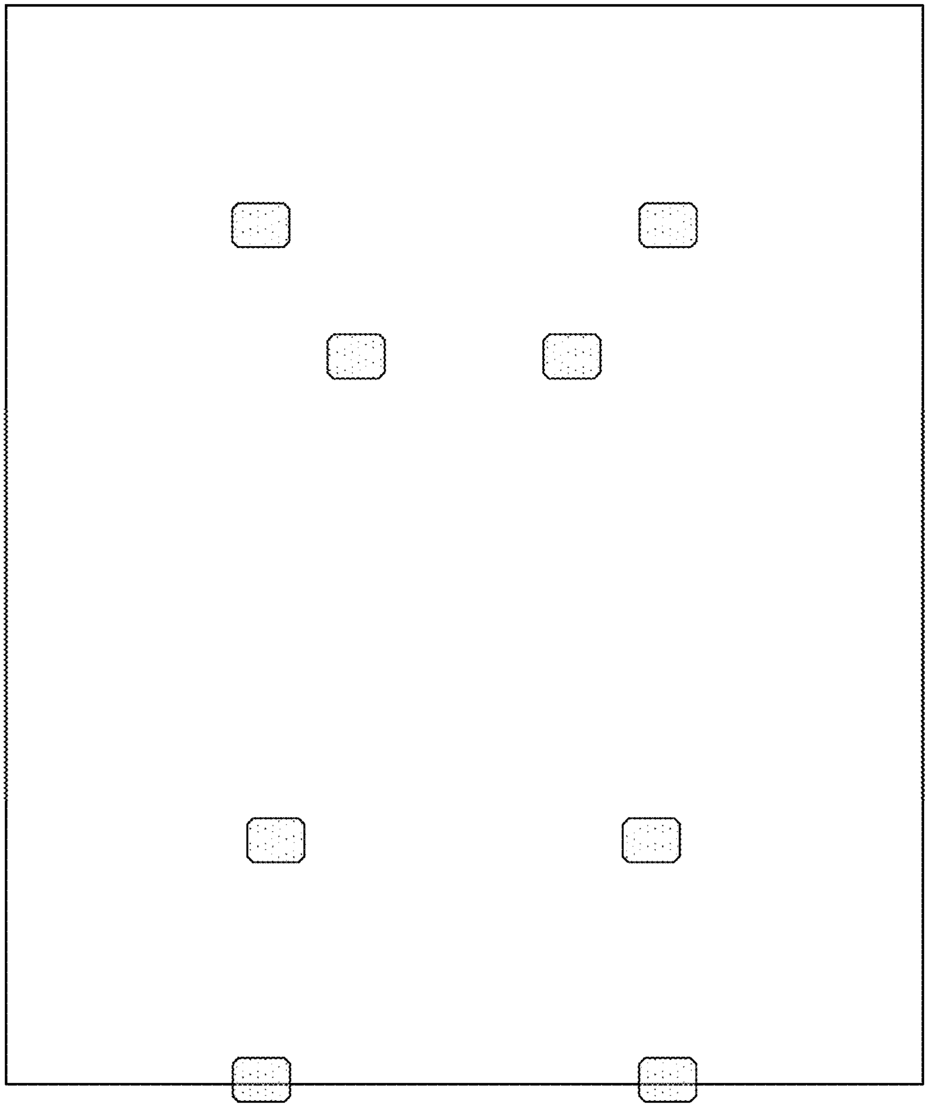
FIG. 23N is a diagram illustrating vias extending through a second planarization layer in the array substrate depicted in FIG. 23A.
Figure 23O:
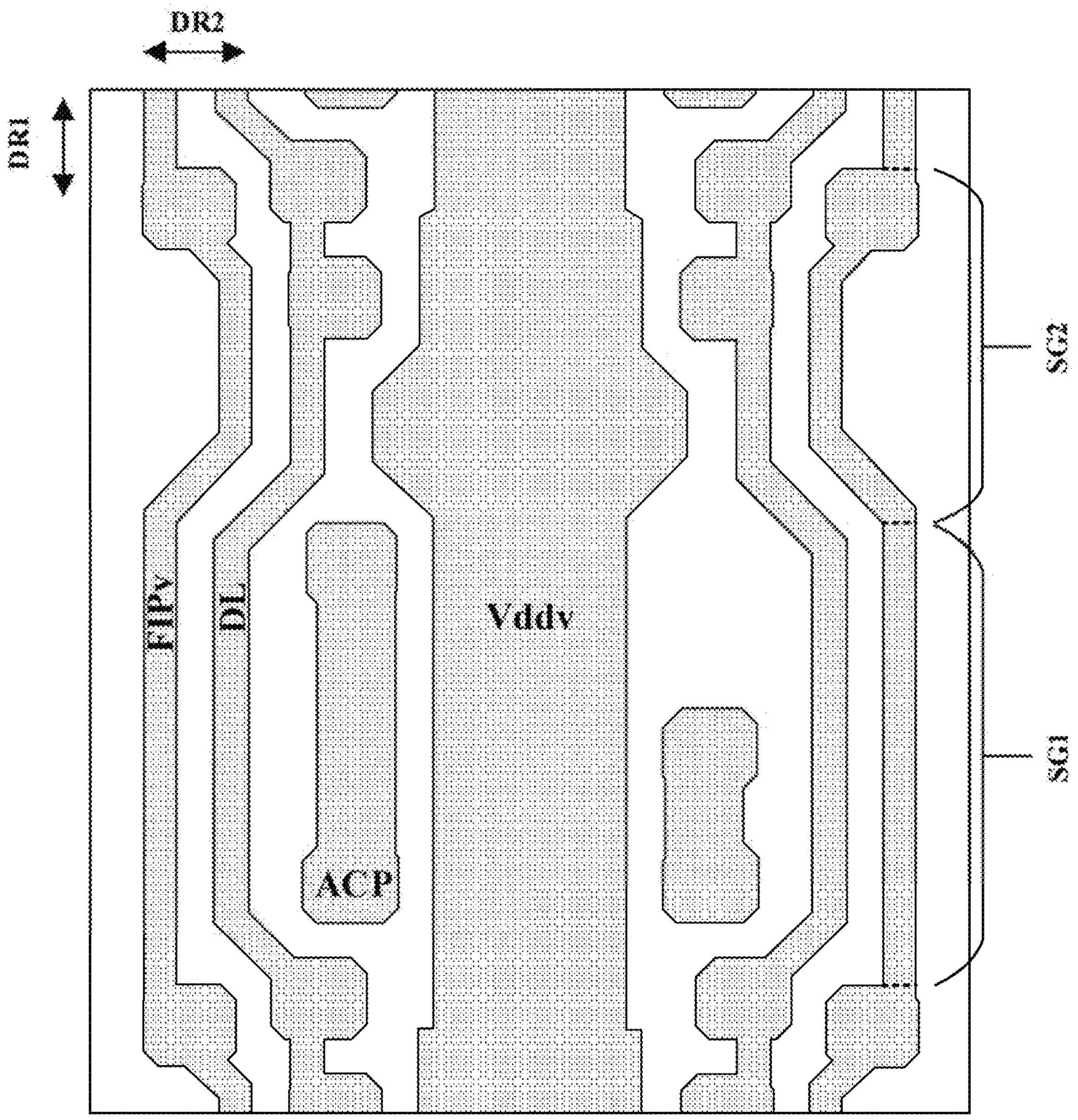
FIG. 23O is a diagram illustrating the structure of a third signal line layer in the array substrate depicted in FIG. 23A.
Figure 23P:
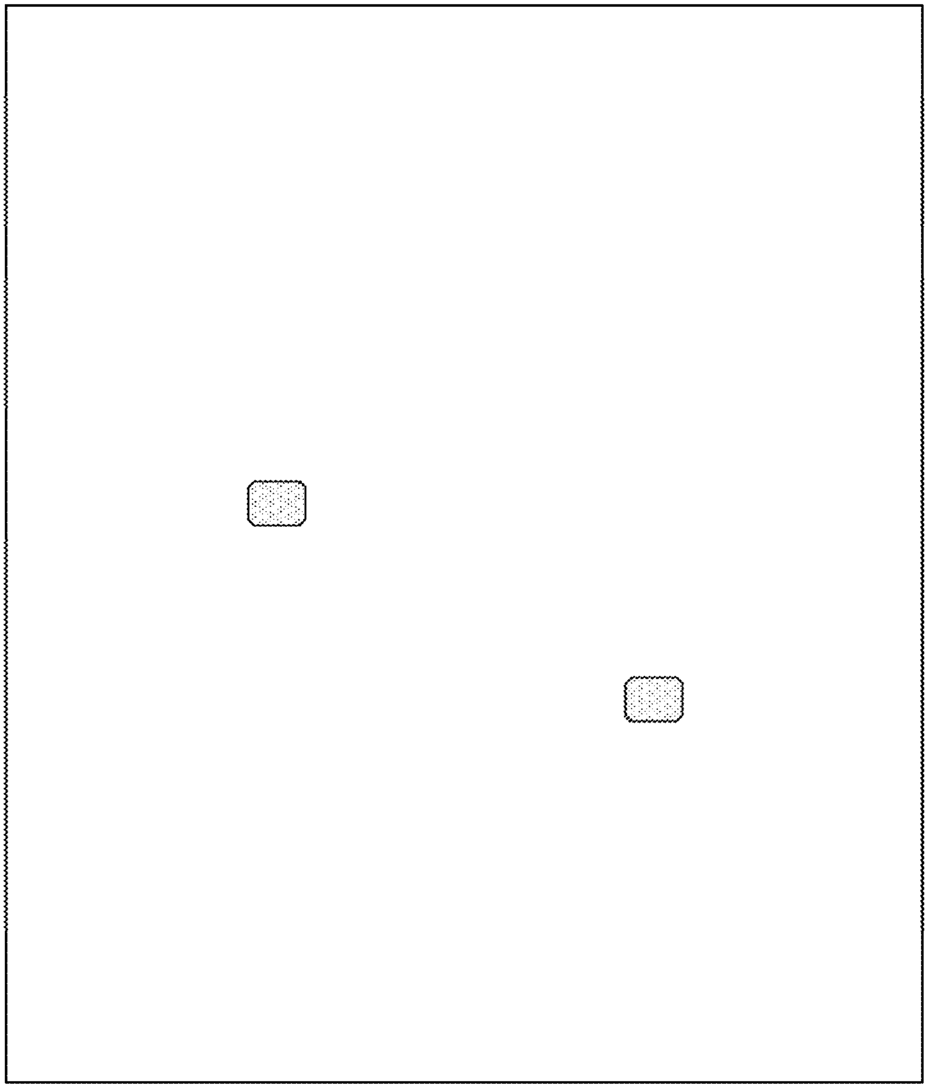
FIG. 23P is a diagram illustrating vias extending through a third planarization layer in the array substrate depicted in FIG. 23A.
Figure 23Q:
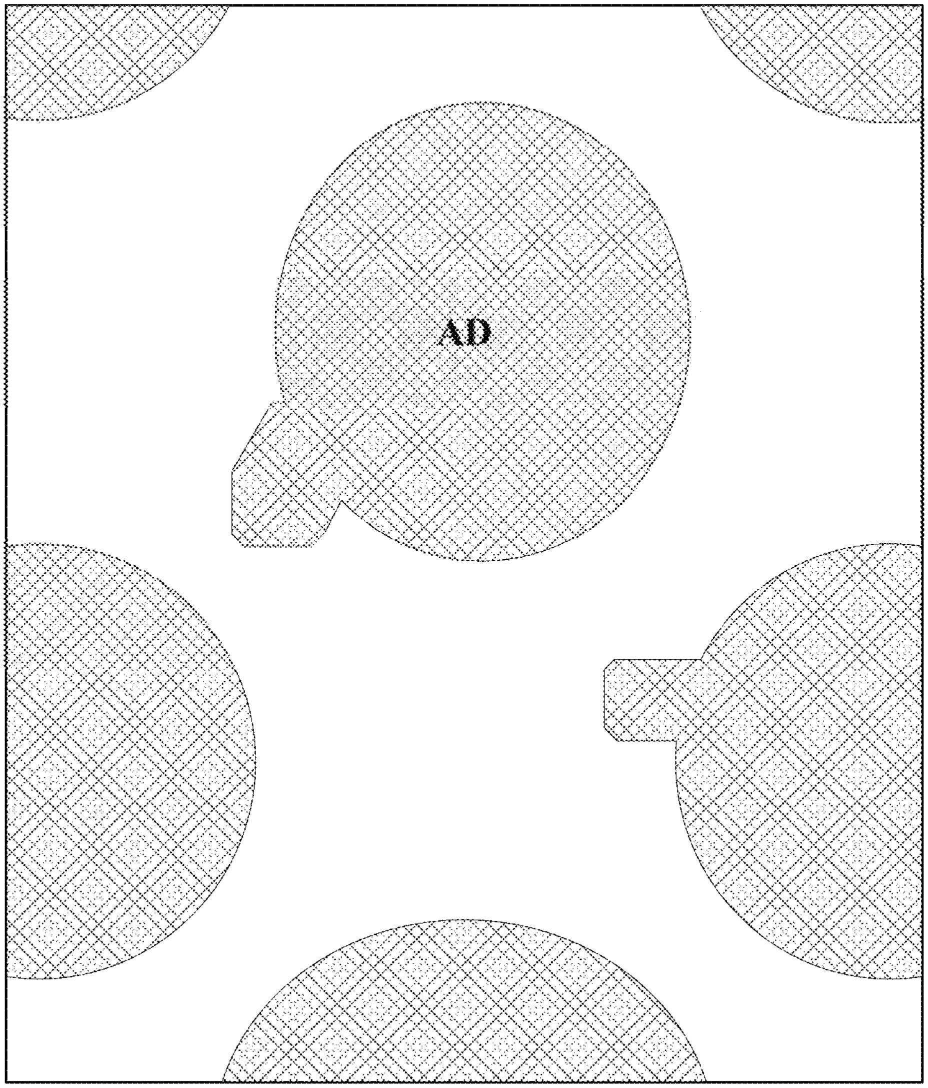
FIG. 23Q is a diagram illustrating the structure of an anode layer in the array substrate depicted in FIG. 23A.
Figure 24:
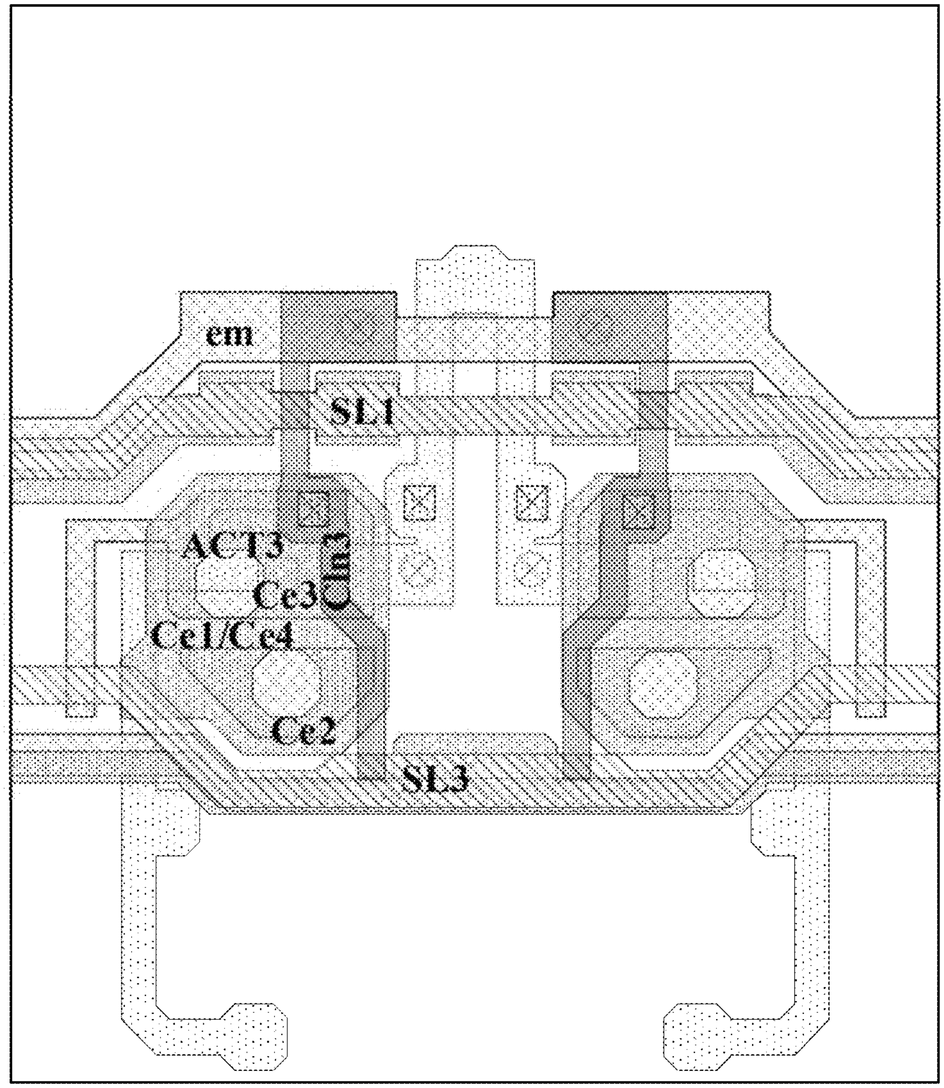
FIG. 24 is a diagram illustrating a layout of a third node connecting line with respect to underlying layers in the array substrate depicted in FIG. 23A.
Figure 25:
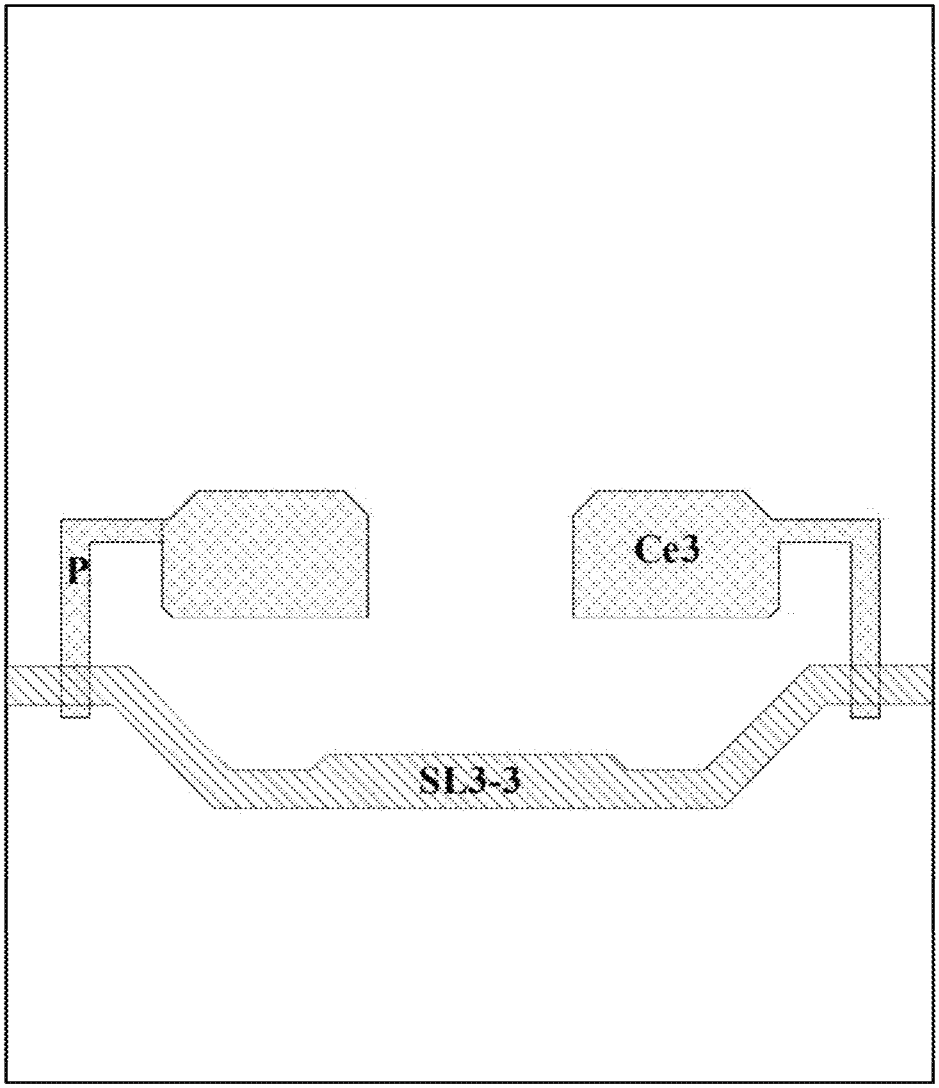
FIG. 25 is a diagram illustrating a layout of a third capacitor electrode with respect to a respective third control signal line third branch in the array substrate depicted in FIG. 23A.

FIG. 23A is a diagram illustrating the structure of pixel driving circuits in an array substrate in some embodiments according to the present disclosure. FIG. 23B is a schematic diagram illustrating an arrangement of pixel driving circuits in the array substrate depicted in FIG. 23A. FIG. 23C is a diagram illustrating the structure of a first semiconductor material layer in the array substrate depicted in FIG. 23A, FIG. 23D is a diagram illustrating the structure of a first gate metal layer in the array substrate depicted in FIG. 23A, FIG. 23E is a diagram illustrating the structure of a second gate metal layer in the array substrate depicted in FIG. 23A. FIG. 23F is a diagram illustrating vias extending through a first inter-layer dielectric layer in the array substrate depicted in FIG. 23A. FIG. 23G is a diagram illustrating the structure of a second semiconductor material layer in the array substrate depicted in FIG. 23A. FIG. 23H is a diagram illustrating vias extending through a second inter-layer dielectric layer in the array substrate depicted in FIG. 23A. FIG. 23I is a diagram illustrating the structure of a third gate metal layer in the array substrate depicted in FIG. 23A. FIG. 23J is a diagram illustrating vias extending through a passivation layer in the array substrate depicted in FIG. 23A. FIG. 23K is a diagram illustrating the structure of a first signal line layer in the array substrate depicted in FIG. 23A. FIG. 23L is a diagram illustrating vias extending through a first planarization layer in the array substrate depicted in FIG. 23A. FIG. 23M is a diagram illustrating the structure of a second signal line layer in the array substrate depicted in FIG. 23A. FIG. 23N is a diagram illustrating vias extending through a second planarization layer in the array substrate depicted in FIG. 23A. FIG. 23O is a diagram illustrating the structure of a third signal line layer in the array substrate depicted in FIG. 23A. FIG. 23P is a diagram illustrating vias extending through a third planarization layer in the array substrate depicted in FIG. 23A. FIG. 23Q is a diagram illustrating the structure of an anode layer in the array substrate depicted in FIG. 23A. FIG. 24 is a diagram illustrating a layout of a third node connecting line with respect to underlying layers in the array substrate depicted in FIG. 23A. FIG. 25 is a diagram illustrating a layout of a third capacitor electrode with respect to a respective third control signal line third branch in the array substrate depicted in FIG. 23A.

Referring to FIG. 23A to FIG. 23Q, FIG. 24, and FIG. 25, in some embodiments, the third capacitor electrode Ce3 includes a core portion CP and a protrusion P protruding away from the core portion CP. In some embodiments, an orthographic projection of the respective third control signal line third branch SL3-3 on a base substrate at least partially overlaps with an orthographic projection of the protrusion P of the third capacitor electrode Ce3 on the base substrate. The inventors of the present disclosure discover that, by having the orthographic projection of the respective third control signal line third branch SL3-3 on the base substrate at least partially overlaps with the orthographic projection of the protrusion P of the third capacitor electrode Ce3 on the base substrate, the parasitic capacitance between the node N1 and the respective third control signal line of the plurality of third control signal lines SL3 can be effectively increased, leading to a larger driving current and a display panel having higher luminance.

In another aspect, the present invention provides a display apparatus, including the array substrate described herein or fabricated by a method described herein, and one or more integrated circuits connected to the array substrate. Examples of appropriate display apparatuses include, but are not limited to, an electronic paper, a mobile phone, a tablet computer, a television, a monitor, a notebook computer, a digital album, a GPS, etc. Optionally, the display apparatus is an organic light emitting diode display apparatus. Optionally, the display apparatus is a micro light emitting diode display apparatus. Optionally, the display apparatus is a mini light emitting diode display apparatus.

In another aspect, the present disclosure provides a method of fabricating an array substrate. In some embodiments, the method includes forming a plurality of pixel driving circuits and forming a plurality of third control signal lines. Optionally, forming a respective pixel driving circuit of the plurality of pixel driving circuits comprises forming a driving transistor, forming a data write transistor, forming a compensating transistor, forming a third reset transistor, forming a first capacitor having a first capacitor electrode and a second capacitor electrode, forming a second capacitor having a third capacitor electrode and a fourth capacitor electrode, and forming a third node connecting line. Optionally, a respective third control signal line of the plurality of third control signal lines is configured to provide control signals to a gate electrode of the third reset transistor. Optionally, the third node connecting line is connected to second electrodes of the compensating transistor and the data write transistor, and is connected to the first capacitor electrode and the fourth capacitor electrode. Optionally, an orthographic projection of the third node connecting line on a base substrate at least partially overlaps with an orthographic projection of the respective third control signal line on the base substrate.

The foregoing description of the embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. An array substrate, comprising a plurality of pixel driving circuits and a plurality of third control signal lines;

wherein a respective pixel driving circuit of the plurality of pixel driving circuits comprises a driving transistor, a data write transistor, a compensating transistor, a third reset transistor, a first capacitor having a first capacitor electrode and a second capacitor electrode, a second capacitor having a third capacitor electrode and a fourth capacitor electrode, and a third node connecting line;

wherein a respective third control signal line of the plurality of third control signal lines is configured to provide control signals to a gate electrode of the third reset transistor;

wherein the third node connecting line is connected to second electrodes of the compensating transistor and the data write transistor, and is connected to the first capacitor electrode and the fourth capacitor electrode; and an orthographic projection of the third node connecting line on a base substrate at least partially overlaps with an orthographic projection of the respective third control signal line on the base substrate;

wherein the respective third control signal line comprises multiple branches including a respective third control signal line third branch in a third gate metal layer; and the orthographic projection of the third node connecting line on the base substrate at least partially overlaps with an orthographic projection of the respective third control signal line third branch on the base substrate.

2. The array substrate of claim 1, further comprising a plurality of gate lines, a plurality of light emitting control signal lines, and a plurality of first control signal lines;

wherein the respective pixel driving circuit further comprises a light emitting control transistor and a first reset transistor;

a respective gate line of the plurality of gate lines is configured to provide gate scanning signals to a gate electrode of the data write transistor;

a respective light emitting control signal line of the plurality of light emitting control signal lines is configured to provide light emitting control signals to a gate electrode of the light emitting control transistor;

a respective first control signal line of the plurality of first control signal lines is configured to provide control signals to a gate electrode of the first reset transistor;

wherein the orthographic projection of the third node connecting line on the base substrate at least partially overlaps with an orthographic projection of at least one of the respective light emitting control signal line, the respective first control signal line, an active layer of the driving transistor, the third capacitor electrode, or a unitary structure comprising the first capacitor electrode and the fourth capacitor electrode on the base substrate.

3. The array substrate of claim 2, wherein the orthographic projection of the third node connecting line on the base substrate at least partially overlaps with each of orthographic projections of the respective light emitting control signal line, the respective first control signal line, an active layer of the driving transistor, the third capacitor electrode, and a unitary structure comprising the first capacitor electrode and the fourth capacitor electrode on the base substrate.

4. The array substrate of claim 2, wherein the respective pixel driving circuit further comprises a first reset transistor;

a respective first control signal line of the plurality of first control signal lines is configured to provide control signals to a gate electrode of the first reset transistor;

the orthographic projection of the respective gate line on the base substrate and the orthographic projection of the second capacitor electrode on the base substrate are spaced apart by an orthographic projection of the respective first control signal line on the base substrate;

the orthographic projection of the respective first control signal line on the base substrate is substantially non-overlapping with the orthographic projection of the respective gate line on the base substrate, and is substantially non-overlapping with the orthographic projection of the second capacitor electrode on the base substrate; and an overlapping area between the orthographic projection of the third node connecting line on the base substrate and the orthographic projection of at least one of the respective light emitting control signal line, the respective first control signal line, the respective third control signal line, the respective gate line on the base substrate is no greater than a third of an area of the orthographic projection of the third node connecting line on the base substrate.

5. The array substrate of claim 1, further comprising a plurality of light emitting control signal lines;

wherein the respective pixel driving circuit further comprises a light emitting control transistor;

a respective light emitting control signal line of the plurality of light emitting control signal lines is configured to provide light emitting control signals to a gate electrode of the light emitting control transistor; and the orthographic projection of the third node connecting line on the base substrate at least partially overlaps with an orthographic projection of the respective light emitting control signal line on the base substrate.

6. The array substrate of claim 5, wherein the respective light emitting control signal line comprises a first portion and a second portion connected to each other;

the first portion has a first average line width;

the second portion has a second average line width;

the first average line width is greater than the second average line width;

an orthographic projection of the first portion on the base substrate at least partially overlaps with an orthographic projection of the third node connecting line on the base substrate;

an orthographic projection of the second portion on the base substrate is non-overlapping with the orthographic projection of the third node connecting line on the base substrate;

the second portion comprises a gate electrode of the light emitting control transistor; and the first portion does not comprise any portion of the gate electrode of the light emitting control transistor.

7. The array substrate of claim 1, further comprising a plurality of first control signal lines;

wherein the respective pixel driving circuit further comprises a first reset transistor;

a respective first control signal line of the plurality of first control signal lines is configured to provide control signals to a gate electrode of the first reset transistor; and the orthographic projection of the third node connecting line on the base substrate at least partially overlaps with an orthographic projection of the respective first control signal line on the base substrate.

8. The array substrate of claim 7, wherein the respective first control signal line comprises multiple branches in different layers;

a respective branch of the multiple branches comprises a third portion, a fourth portion, and a fifth portion;

the third portion has a third average line width;

the fourth portion has a fourth average line width;

the fifth portion has a fifth average line width;

the third average line width is greater than the fourth average line width;

the fifth average line width is greater than the fourth average line width;

an orthographic projection of the fourth portion on the base substrate at least partially overlaps with an orthographic projection of the third node connecting line on the base substrate;

an orthographic projection of the third portion on the base substrate is non-overlapping with the orthographic projection of the third node connecting line on the base substrate;

an orthographic projection of the fifth portion on the base substrate is non-overlapping with the orthographic projection of the third node connecting line on the base substrate;

the third portion comprises at least a portion of a gate electrode of the first reset transistor;

the fifth portion comprises at least a portion of a gate electrode of the compensating transistor; and the fourth portion does not comprise any portion of the gate electrode of the first reset transistor or the gate electrode of the compensating transistor.

9. The array substrate of claim 1, further comprising:

a plurality of first fanout connecting lines extending along a direction substantially parallel to a second direction;

a plurality of second fanout connecting lines extending along a direction substantially parallel to a first direction;

a plurality of second voltage supply lines extending along a direction substantially parallel to the first direction; and a plurality of data lines extending along a direction substantially parallel to the first direction;

wherein two adjacent second fanout connecting lines of the plurality of second fanout connecting lines are between two adjacent data lines of the plurality of data lines configured to provide data signals to two adjacent pixel driving circuits in a same row; and a respective data line of the plurality of data lines is between a second fanout connecting line and a second voltage supply line.

10. The array substrate of claim 9, wherein the respective data line is connected to a respective first fanout connecting line; an individual data line of the plurality of data lines is connected to a respective first fanout connecting line of the plurality of first fanout connecting lines through a first connecting via;

a respective second fanout connecting line of the plurality of second fanout connecting lines is connected to the respective first fanout connecting line through a second connecting via;

the respective first fanout connecting line connects the individual data line with the respective second fanout connecting line; and the plurality of second fanout connecting lines are connected to a data driving circuit.

11. The array substrate of claim 1, further comprising a plurality of gate lines;

wherein a respective gate line of the plurality of gate lines is configured to provide gate scanning signals to a gate electrode of the data write transistor;

the respective pixel driving circuit further comprises a first node connecting line; and an orthographic projection of the respective gate line on the base substrate is substantially non-overlapping with an orthographic projection of the first node connecting line on the base substrate.

12. The array substrate of claim 11, wherein the orthographic projection of the respective gate line on the base substrate and an orthographic projection of the second capacitor electrode on the base substrate are spaced apart by an orthographic projection of the third capacitor electrode on the base substrate; and the orthographic projection of the second capacitor electrode on the base substrate is substantially non-overlapping with the orthographic projection of the respective gate line on the base substrate, and is substantially non-overlapping with the orthographic projection of the third capacitor electrode on the base substrate.

13. The array substrate of claim 11, further comprising a plurality of light emitting control signal lines;

wherein the respective pixel driving circuit further comprises a light emitting control transistor;

a respective light emitting control signal line of the plurality of light emitting control signal lines is configured to provide light emitting control signals to a gate electrode of the light emitting control transistor;

the orthographic projection of the respective gate line on the base substrate and the orthographic projection of the second capacitor electrode on the base substrate are spaced apart by an orthographic projection of the respective light emitting control signal line on the base substrate; and the orthographic projection of the respective light emitting control signal line on the base substrate is substantially non-overlapping with the orthographic projection of the respective gate line on the base substrate, and is substantially non-overlapping with the orthographic projection of the second capacitor electrode on the base substrate.

14. The array substrate of claim 1, further comprising a plurality of first reset signal lines;

wherein a respective first reset signal line of the plurality of first reset signal lines comprises a plurality of loops arranged along a direction substantially parallel to first direction; and a respective loop of the plurality of loops is connected to first electrodes of two adjacent first reset transistors of two adjacent pixel driving circuits in a same row.

15. A display apparatus, comprising the array substrate of claim 1, and one or more integrated circuits connected to the array substrate.

16. An array substrate, comprising a plurality of pixel driving circuits and a plurality of third control signal lines;

wherein a respective pixel driving circuit of the plurality of pixel driving circuits comprises a driving transistor, a data write transistor, a compensating transistor, a third reset transistor, a first capacitor having a first capacitor electrode and a second capacitor electrode, a second capacitor having a third capacitor electrode and a fourth capacitor electrode, and a third node connecting line;

wherein a respective third control signal line of the plurality of third control signal lines is configured to provide control signals to a gate electrode of the third reset transistor;

wherein the third node connecting line is connected to second electrodes of the compensating transistor and the data write transistor, and is connected to the first capacitor electrode and the fourth capacitor electrode; and an orthographic projection of the third node connecting line on a base substrate at least partially overlaps with an orthographic projection of the respective third control signal line on the base substrate;

wherein an orthographic projection of any unitary structure comprising the first capacitor electrode and the fourth capacitor electrode on the base substrate at least partially overlaps with the orthographic projection of the respective third control signal line on the base substrate.

17. The array substrate of claim 16, wherein the unitary structure comprises a main body and an extension extending away from the main body; and the orthographic projection of the respective third control signal line on the base substrate at least partially overlaps with an orthographic projection of the extension on the base substrate, or at least partially overlaps with an orthographic projection of the main body on the base substrate.

18. An array substrate, comprising a plurality of pixel driving circuits and a plurality of third control signal lines;

wherein a respective pixel driving circuit of the plurality of pixel driving circuits comprises a driving transistor, a data write transistor, a compensating transistor, a third reset transistor, a first capacitor having a first capacitor electrode and a second capacitor electrode, a second capacitor having a third capacitor electrode and a fourth capacitor electrode, and a third node connecting line;

wherein a respective third control signal line of the plurality of third control signal lines is configured to provide control signals to a gate electrode of the third reset transistor;

wherein the third node connecting line is connected to second electrodes of the compensating transistor and the data write transistor, and is connected to the first capacitor electrode and the fourth capacitor electrode; and an orthographic projection of the third node connecting line on a base substrate at least partially overlaps with an orthographic projection of the respective third control signal line on the base substrate;

wherein the respective pixel driving circuit further comprises a light emitting control transistor and a second node connecting line;

a first electrode of the driving transistor and a second electrode of the light emitting control transistor are parts of a unitary structure;

a first electrode of the compensating transistor and a second electrode of the third reset transistor are parts of a unitary structure; and the second node connecting line is connected to the second electrode of the light emitting control transistor and the first electrode of the driving transistor through a third via, and connected to the second electrode of the third reset transistor and the first electrode of the compensating transistor through a fourth via.

19. The array substrate of claim 18, wherein a virtual extension of the third capacitor electrode along a second direction crosses over the second node connecting line;

a virtual extension of the second capacitor electrode does not cross over the second node connecting line; and at least a portion of the third node connecting line spaces apart the second node connecting line from the second capacitor electrode.

* * * * *